US009800050B2

(12) United States Patent
Clifton

(10) Patent No.: US 9,800,050 B2
(45) Date of Patent: Oct. 24, 2017

(54) BUILDING MANAGEMENT AND APPLIANCE CONTROL SYSTEM

(71) Applicant: Orison, Inc., San Marcos, CA (US)

(72) Inventor: Eric Douglass Clifton, San Marcos, CA (US)

(73) Assignee: Orison, San Marcos, CA (US)

( * ) Notice: Subject to any disclaimer, the term of this patent is extended or adjusted under 35 U.S.C. 154(b) by 0 days.

(21) Appl. No.: 15/201,139

(22) Filed: Jul. 1, 2016

(65) Prior Publication Data
US 2016/0329710 A1 Nov. 10, 2016

Related U.S. Application Data

(63) Continuation of application No. 14/341,499, filed on Jul. 25, 2014.
(Continued)

(51) Int. Cl.
*G05D 3/12* (2006.01)
*G05D 5/00* (2006.01)
(Continued)

(52) U.S. Cl.
CPC ............. *H02J 3/32* (2013.01); *G05F 1/66* (2013.01); *H02J 3/382* (2013.01); *H02J 7/0068* (2013.01); *H02J 13/0006* (2013.01); *H04L 12/2803* (2013.01); *H02J 3/14* (2013.01); *H02J 3/385* (2013.01); *H02J 3/386* (2013.01); *H02J 2003/143* (2013.01); *H02J 2003/146* (2013.01);
(Continued)

(58) Field of Classification Search
CPC .................................. H02J 3/32; H02J 7/0068

USPC ........................................................ 700/296
See application file for complete search history.

(56) References Cited

U.S. PATENT DOCUMENTS 6,538,414 B1    3/2003  Tsuruga et al.
7,206,670 B2 *  4/2007  Pimputkar ................ H02J 3/14
                                                              700/291
(Continued)

FOREIGN PATENT DOCUMENTS

CN    102244677 A    11/2011
CN    102354167 A    2/2012
(Continued)

OTHER PUBLICATIONS

Billion 5, Billion BEsmart Intelligent Energy Saving Cloud, Jan. 29, 2015.
(Continued)

*Primary Examiner* — Ziaul Karim
(74) *Attorney, Agent, or Firm* — Mintz Levin Cohn Ferris Glovsky and Popeo, P.C.

(57) ABSTRACT

The present disclosure is directed to energy storage and supply management system. The system may include one or more of a control unit, which is in communication with the power grid, and an energy storage unit that stores power for use at a later time. The system may be used with traditional utility provided power as well as locally generated solar, wind, and any other types of power generation technology. In some embodiments, the energy storage unit and the control unit are housed in the same chassis. In other embodiments, the energy storage unit and the control unit are separate. In another embodiment, the energy storage unit is integrated into the chassis of an appliance itself.

13 Claims, 5 Drawing Sheets

Related U.S. Application Data

(60) Provisional application No. 61/859,167, filed on Jul. 26, 2013.

(51) Int. Cl.

| | | |
|---|---|---|
| G05D 9/00 | (2006.01) | |
| G05D 11/00 | (2006.01) | |
| H02J 3/32 | (2006.01) | |
| G05F 1/66 | (2006.01) | |
| H04L 12/28 | (2006.01) | |
| H02J 3/38 | (2006.01) | |
| H02J 13/00 | (2006.01) | |
| H02J 7/00 | (2006.01) | |
| H04L 29/08 | (2006.01) | |
| H02J 3/14 | (2006.01) | |

(52) U.S. Cl.
CPC ............ *H04L 67/02* (2013.01); *H04L 67/10* (2013.01); *Y02B 10/14* (2013.01); *Y02B 70/3266* (2013.01); *Y02B 90/222* (2013.01); *Y02E 10/58* (2013.01); *Y02E 10/763* (2013.01); *Y02E 40/72* (2013.01); *Y02E 70/30* (2013.01); *Y04S 10/123* (2013.01); *Y04S 20/12* (2013.01); *Y04S 20/224* (2013.01); *Y04S 20/242* (2013.01); *Y10T 307/516* (2015.04)

(56) References Cited

U.S. PATENT DOCUMENTS

| | | | |
|---|---|---|---|
| 8,463,449 | B2 | 6/2013 | Sanders |
| 8,700,224 | B2 | 4/2014 | Mathiowetz |
| 9,063,525 | B2* | 6/2015 | Sanders ................ G05B 11/01 |
| 9,208,267 | B2 | 12/2015 | Miller |
| 2006/0029178 | A1 | 2/2006 | Tahan |
| 2006/0276938 | A1 | 12/2006 | Miller |
| 2007/0043478 | A1 | 2/2007 | Ehlers et al. |
| 2010/0017045 | A1* | 1/2010 | Nesler ................ B60L 11/1824 |
| | | | 700/296 |
| 2011/0004357 | A1 | 1/2011 | Mathiowetz |
| 2011/0013427 | A1 | 1/2011 | Weir et al. |
| 2011/0076542 | A1 | 3/2011 | Farmer |
| 2011/0148195 | A1* | 6/2011 | Lee ............................. H02J 7/35 |
| | | | 307/25 |
| 2011/0204720 | A1* | 8/2011 | Ruiz ................... B60L 11/1816 |
| | | | 307/66 |
| 2012/0083934 | A1 | 4/2012 | Jesudason et al. |
| 2012/0197449 | A1* | 8/2012 | Sanders ................ G05B 15/02 |
| | | | 700/291 |
| 2012/0311077 | A1 | 12/2012 | Charvet |
| 2013/0066477 | A1 | 3/2013 | Jiang |
| 2013/0076140 | A1* | 3/2013 | Darden .................... H02J 3/381 |
| | | | 307/64 |
| 2013/0079943 | A1* | 3/2013 | Darden, II ............. G06Q 50/06 |
| | | | 700/297 |
| 2013/0154570 | A1* | 6/2013 | Nomura .................... H02J 3/32 |
| | | | 320/128 |
| 2013/0241485 | A1* | 9/2013 | Snyder ................ B60L 11/1809 |
| | | | 320/109 |
| 2014/0148969 | A1 | 5/2014 | Graziano et al. |
| 2014/0159487 | A1 | 6/2014 | Han |
| 2014/0217983 | A1 | 8/2014 | McCalmont et al. |
| 2015/0026343 | A1 | 1/2015 | Borges et al. |
| 2015/0309521 | A1 | 10/2015 | Pan |
| 2015/0378383 | A1 | 12/2015 | Hsu |
| 2016/0033966 | A1 | 2/2016 | Farris et al. |
| 2016/0126783 | A1 | 5/2016 | Cheng et al. |

FOREIGN PATENT DOCUMENTS

| | | |
|---|---|---|
| CN | 102608973 A | 7/2012 |
| CN | 202586366 U | 12/2012 |
| CN | 103679304 A | 3/2014 |
| CN | 104243247 A | 12/2014 |
| CN | 104483838 A | 4/2015 |
| CN | 104715340 A | 6/2015 |
| EP | 2840545 A1 | 2/2015 |
| WO | WO-2011/106915 A1 | 9/2011 |
| WO | WO-2014/077774 A1 | 5/2014 |

OTHER PUBLICATIONS

Borse Bhagyashree, Energy Management Technology Based on Cloud Network, 2014.
Business Wire, Cloud-Based Building Energy Management Solutions, Feb. 22, 2016.
Indian Journal of Science and Technology, Smart Power Monitoring and Control System through Internet of things using Cloud Data Storage, Jun. 2015.
Prof. R. V. Dagade, Intelligent Cloud Home Energy Management System, 2015.
TCS, Cloud-based Energy Management Analytics (CBEMA) Solution, Aug. 1, 2013.

* cited by examiner

BUILDING MANAGEMENT AND APPLIANCE CONTROL SYSTEM

CROSS-REFERENCES TO RELATED APPLICATIONS

This application is a continuation in part of U.S. patent application Ser. No. 14/341,499, entitled "Building Management and Appliance Control System," filed Jul. 25, 2014 which in turn claims the benefit of U.S. Provisional Application Ser. No. 61/859,167, entitled "BUILDING MANAGEMENT AND APPLIANCE CONTROL SYSTEM," filed on Jul. 26, 2013. The disclosures of the above-identified patent applications are hereby incorporated by reference in their entirety.

FIELD OF THE DISCLOSURE

The following disclosure relates to the wide-scale distribution of intelligent energy storage units that may be positioned within the electric grid so as to make the electric grid smart.

BACKGROUND

The consumption of energy in the form of electricity is a modern facet of modern living. However, the production of energy often requires the activation of large turbine generators that convert mechanical energy into electrical energy. This mechanical energy is typically created by moving water, steam, and/or gas across the blades of the turbine thereby causing them to revolve, these revolutions then in turn cause a giant magnet to turn, which in turn creates a magnetic field that causes electrons in an associated electrical circuit to flow. Such flow is termed "electricity." The energy that creates the steam or gas that flows across the blades of the turbines is, from a historic perspective, usually generated by the burning of fossil fuels, such as coal, oil, and/or natural gas. Unfortunately, when a fossil fuel is used to run the turbines, such as coal, natural gas, oil or the like, pollution, in the form of carbon emissions, may be produced, which may cause deleterious environmental conditions. Accordingly, renewable resources are now beginning to be deployed on a more wide scale basis for the production of electricity.

For instance, electricity may be produced by the running of water over the blades of the turbine, such as at a hydroelectric plant, and/or may be produced by nuclear energy, solar power, or wind power. However, for wide scale use purposes, such energy producing facilities require large physical plants and/or farms of photovoltaic cells or fields of wind turbines. Because of the need for large physical facilities and the undesirable polluting side effects of producing energy, e.g., by the burning of fossil fuels, the power plants that generate such electricity are often located in places that are remote from the residential neighborhoods that ultimately use the produced electricity. Consequently, the energy produced by such power plants needs to be transferred, such as through a transmission network, from the remote locations of production to the site of usage by the ultimate consumer. This transmission of electricity is typically carried out across a network of thick wires that connect the power generation source to the consumer where such network is commonly referred to as the "electric grid".

The electric grid or "grid" is a network for transmitting electricity from a producer and/or supplier ultimately to a consumer. Hence, the grid is interconnected on the generation side with power suppliers, on the distribution side with centralized power distributers, and on the use side with consumers, the collection of which forms one or more "Macro Grids". Most consumers of electricity are grid tied, which simply put means being connected to the macro grid for electricity use. This is primarily due to the fact that the most stable power source to date, in modern cities is the electrical grid. However, with the rapid adoption of renewable resource generation, specifically on the consumer side of the grid, this may, with the right technological advancements, change drastically.

The macro grid, therefore, generally includes a plurality of centralized generation sources, a number of distribution centers, and the infrastructures necessary to provide electricity to the consumer including the various transmission lines necessary for such electricity transfer. The remote generation source is typically where electricity is produced and packaged into a usable form, such as in a form suitable for transmission. For instance, transmission from the remote areas of production, to the far away areas where it will finally be used.

For example, dependent on the type of generator employed and the generation process, the electricity produced will either be in the form of an alternating current (AC) or a direct current (DC). Yet, because DC does not travel well over long distances, in those instances where DC is produced, it is typically converted to a form of AC prior to transmission. More particularly, dependent on how the grid is constructed, the electricity produced will be transmitted at a given voltage having a specific frequency so as to deliver a certain electric current, such as to the distribution center. More particularly, when such electricity is travelling on the transmission side it may range from about 1,000 kV or about 800 kV or about 765 kV to about 300 kV or about 115 kV, etc. Accordingly, this side of the macro grid is generally referred to as the transmission grid.

The transmission infrastructure typically includes large capacity, high voltage power lines that act as an electricity super highway for transferring energy from the remote locations of its production to the populated areas of its usage; and/or may further include one or more transformers that step the electricity that passes through it up or down so as to be efficiently transmitted and/or used. For instance, once produced the voltage of the current may be stepped up so as to maximize the speed and quantity of energy transmission, while reducing the size of the wiring through which the electricity is transferred and/or reducing the thermal heat generated by such transmission.

Distribution Substations are typically where the electricity is received and stepped down via one or more transformers so as to decrease the voltage and frequency of the current to a level suitable for transmission to the consumer, which upon delivery to a local transformer servicing a given area of consumers may be stepped down once more to a final level that may be used. This side of the macro grid is usually referred to as the distribution grid. More particularly, when such electricity is travelling on the distribution side it may range from about 200 kV or about 132 kV or about 33 kV to about 25 kV or about 3.3 kV, etc. Once stepped down, local distribution lines deliver the electricity to the consumer where, as indicated, the electricity may be stepped down an additional time, such as to 110-240 volts (such as at about 50 or about 60 cycles) so as to be in a form usable by the consumer. On the consumer side of the grid, such electricity usually enters the consumer's place of use through a meter that measures the amount of electricity used, and in a manner such as this theoretically reliable, stable electricity may be generated and distributed to the end use customer via the electric grid.

The macro grid, therefore, is configured for producing, transmitting, and distributing electricity to the ultimate consumer and user, such as upon demand. Simply put, however, this macro grid is a legacy grid, and as such it is built on an archaic infrastructure, using outdated transmission lines, and with insufficient control mechanisms for handling the complex usage scenarios that result from its diverse local customers, thus severely limiting its ability to meet the ever-increasing demands of the consumer in a cost-effective and environmentally responsible manner. More specifically, this legacy macro grid is basically not configured so as to efficiently deal with the fluctuating usage demands of the consumer and has long been struggling with maintaining stability in the face of such fluctuating demand.

For instance, as consumer demand curves differ with the differing needs of the various customers served by a particular macro grid, the supply curves representing the ability of the respective power generators and/or distributors to meet those needs must also fluctuate. This difference between the demand and supply curves represents a huge problem for the power generators, distributors, and ultimately for the consumers, but also for the electrical utility investors and regulators.

For example, the response to increased energy demand appears on the grid as peaks, the greater the amplitude and frequencies of these peaks, the greater the potential for destabilization in the grid to occur, thus creating problems ranging from overloaded transformers to brown and/or blackouts, such as when overloaded transformers completely shut down. More particularly, once overloaded, transformers experience increased wear and reduced operational life, thereby requiring higher maintenance, and increasing their likely hood of shutting down during the next period of inordinately increased demand, thereby causing a brown and/or blackout condition. Decreased demand can also be problematic. For instance, low demand appears on the grid as valleys. For example, in a low demand scenario, power suppliers are faced with having too much energy flowing across the grid, requiring the power suppliers to have to dump the excess power to keep from crashing the system.

Accordingly, any fluctuation in the legacy grid may cause general instability for the grid operator(s) thereby potentially causing problems with the power generators, such as not running at optimal usage levels, and/or problems with the transformers, which in turn may result in one or more of flow inefficiencies; transformation inefficiencies (such as where energy undergoes too many or too few conversions); waste, such as through leakage, radiant heating, or being converted from one form to another; inefficient coupling; overproduction; under production; and the like. And when these instabilities increase, entire grid shutdown may be threatened.

Hence, in view of the multiplicity of problems constantly threatening to shut one or more portions of the macro grid down, a central regulator is needed to facilitate communication and develop protocols to maintain a more stable grid. For instance, a typical distribution center includes a governor that monitors an electronic representation of the grid with respect to the present demand and supply curves. For example, in a typical scenario, where demand outweighs supply, the monitor must balance the need for producing more power, with the risk of both producing too much power, and therefore creating waste, and not producing enough power, and thus risking a brown and/or black out. In such an instance, where the monitor determines more energy should be supplied to the grid, it may be determined that an auxiliary production facility, such as a peaker plant, need be brought on line.

A peaker plant is an energy production facility, e.g., a sub-station, which houses one or more generators. These generators are simply waiting to go live, so they can be ramped up, be quickly brought on line to meet the increased supply demand, and thereby prevent potential brownout situations caused by under capacity. Peaker plants, however, can be problematic in their own right. For instance, a typical peaker plant costs an exorbitant amount of money to produce, must be built in accordance with strict regulations, and once up and running is always running, e.g., at a basal level, thus, generating waste when not online. More particularly, peaker plants sit idle in anticipation of the next energy peak caused by consumer usage demand, and while sitting idle produce unnecessary emissions due to this "always on" scenario wherein fossil fuel is constantly being burned and its emissions released into the atmosphere.

As indicated, peaker plants require a high installation cost, and must undergo a lengthy regulatory process before a new facility may be approved, built, and brought online. Further, even when approved such plants often become obsolete prematurely due to changes in regulatory mandates. Thus, a huge problem for the energy supplier and/or investor is the fact that the cost of this asset is largely never recouped. There is a constant battle, therefore, between supplying too much energy to the grid and not enough energy.

In order to better manage the issues of grid instabilities caused by inconsistent and fluctuating user demand, as well as minimize the need for wide scale usage of peaker plants, energy supply companies have developed a number of different schemes directed at changing the electricity use patterns of the consumer, a main component of which is through various different pricing modalities. However, there a several problems inherent with the various pricing modalities proposed, not the least of which is the fact that the existing electrical grid is only configured for transmitting electricity as if it were a commodity rather than a renewable resource. More specifically, grid operators have the difficult task of determining how to charge consumers for the product, e.g., electricity, and/or services they provide.

To date, the electricity distributor typically charges the electricity consumer based on the over all usage patterns of the collective of consumers. Hence, the individual consumer is charged a higher rate at peak times of demand, than the rate they are charged during off peak times, thus, making the electricity product more of a commodity, having a limited supply, rather than a service, such as cable or internet. As mentioned above, historically, electricity generation has been produced from fossil fuel sources such as coal and natural gas, thus to a limited extent justifying the treatment of electricity like a commodity. However, with the shift to electricity production from renewable energy resources, such as photovoltaic and/or wind farms, as well as the development of hydroelectricity, the correlation of electricity to a limited resources, e.g., a commodity, is becoming more and more of a stretch.

The problem with this commodity-type of pricing is even more exacerbated when the electricity distribution company attempts to change the use patterns of their customers by adopting various different pricing modalities for the sole purpose of changing the consumer's usage behaviors. For instance, as a means of changing the consumer's behavior various utility companies have proposed a range of different pricing models, such as "Time of Use Pricing", "Dynamic Pricing", and/or "Demand Response Pricing." These and other such pricing models are in concept designed to give the consumers various use options in hopes of creating a behavioral change that will mainly benefit the electricity distributor.

For example, "Time of Use" pricing was initially designed to incentivize commercial energy customers to reduce peak-time usage by increasing utility rates during peak-demand periods, and reducing pricing outside normal, non-peak-demand usage, in an effort to help smooth out grid fluctuation cycles. Time of Use pricing, however, is confusing to the customer, in part because their various different associated rates now have several different pricing categories for the same commodity being purchased, where price fluctuation depends simply on what time of day that commodity is being consumed and/or for what the commodity is being used and/or who it is that is doing the consuming.

More particularly, if the consumer is a commercial user or a residential user having solar power or owning an electric car, such consumers will have different "peak demand" pricing windows than the typical residential user, even though they are consuming the same energy at the same time. For instance, those who have solar power connections have a "peak demand" pricing period that begins in the evening, rather than during the day, merely because they have a solar generator connected to the grid, despite the fact that they are using the same electricity provided to them at the same time period as any other residential user with the only difference being that during daylight hours, the residential user with solar power does not typically need to use power from the grid. Nevertheless, in order to maintain a certain level of return on investment, the utility provider shifts the "peak demand" pricing period for such users to the non-daylight hours thereby charging them more at night than during the day, in contravention to the rate being charged to the typical residential consumer who does not have solar power.

With respect to "demand response" pricing, this pricing model is a grid management technique where retail or wholesale customers are requested either electronically or manually to reduce their load. Currently, transmission grid operators, e.g., power distribution companies, use demand response to request load reduction from major energy users such as industrial plants. More particularly, demand response pricing involves energy pricing that follows the intermittent consumer demand on the electrical grid, which requires consumers to follow energy pricing, prior to use. Essentially the Distributed Services Organization, e.g., the Utility, will monitor usage and at various times of the day when demand begins to peak above supply, they will make an announcement in real time to warn consumers of a hike in the pricing of use. They expect such pricing events to occur daily, where each day there could be several such events.

Unfortunately, these complex pricing programs have proven to not be as effective as hoped. For instance, the desired outcome was to reduce peak time use in order to help stabilize grid operation. However, in order to be successful, these programs depended on the consumers understanding and/or caring about grid issues enough to ultimately change their behaviors at the arbitrary use-times demanded from the utility providers; and further these programs were based on punishing the "bad behavior" of the consumer by making them pay more for electricity usage if they did not adhere to the usage periods arbitrarily determined by the Utilities.

More particularly, these pricing models are founded on the expectation that consumers will change their routines or suffer the consequences of higher energy pricing if they don't. Further, the reward for giving in to the demands of the utility providers is not being able to access the grid at times when most needed, e.g., during days of high temperatures, or nights of low temperatures. Consumers simply do not want to deal with these inconveniences.

Furthermore, for the commercial consumer, such as product manufacturers, these consumers were expected to shift their production efforts to "off-peak" times that typically do not coincide with regular hours of operation, simply to move energy usage times to suit the energy supplier's, e.g., DSO's, needs. This is especially problematic for those manufactures that need to operate their equipment consistently 24/7 with no ability to shift loads to off peak times. Hence, for the commercial consumer, these programs require them to pay attention to their usage times and to make some very difficult decisions as to how and when to use their equipment.

Other programs that have been developed and implemented by the grid operators to better manage the electricity use patterns of the consumer involve communications media. For instance, the utility provider as a further means for changing the user's behaviors employs communications media. Such media have included the use of in home displays (IHD) or grid-tied I demand response thermostats, coupled with energy monitoring devices. These IHDs are consumer facing energy display/monitors that connect either in a wired or wireless configuration with a smart meter to show electricity usage to the consumer. The principle behind the use of such IHDs is to change the consumer's behavior by making the interaction with usage easy and commonplace. More particularly, the idea was to help consumers better understand and relate usage costs to peak times of demand where such peaks are determined by historic usage models.

For instance, one such monitoring device is a grid tied demand response thermostat. In use, a customer will opt in to the program, the utility company will install the demand response thermostat, then the utility company will control the thermostat, and in times of peak demand will set it back thereby preventing its use. These and other types of electrical load curtailment devices on the customer side of the meter increases the Distributed Services Organization's ability to stabilize the grid. However, these devices offer complicated options to an already complicated issue and have yet to offer any significant long-term value, plus customers don't like having the Distributed Services Organization turn off their appliances, e.g., air conditioning, without any way to override this decision.

Other options, beyond the mere implementation of price regulations and/or transmission of media communications, have been proposed for solving the problems of fluctuations caused by peak time usage demand. For instance, the production of grid-side solar farms and wind farms, as well as consumer side solar energy generation, have been developed to help assuage the problem of fluctuating consumer side electricity use of their local portion of their macro grid. However, although these renewable energy modalities were expected to help stabilize the grid by generating power that would offset peak demand, in actuality, there are several problems inherent to these proposed means of energy production that renders their effectiveness de minimis.

For instance, an issue with renewable resource power generation, regardless of the side of the grid they reside upon, is due to the non-linear and intermittent nature of the natural environment. For example, when the sun is shining solar energy is capable of being produced. But, when clouds cover the sun, or the sun is otherwise not shining, solar energy is not readily producible. The same can be said for the production of energy from wind. When it is windy out, energy is capable of being produced, but when it is not windy out, energy cannot be produced from a wind farm. The problem with such intermittent energy production is that it is always in a state of flux. This is a significant issue for both the power generator and the Distributed Services Organization.

Currently, energy produced by renewable resources, such as on the utility side of the grid, may be added on to the grid in a particular, predetermined quantum and at a predetermined time. In instances where too much power is being generated and/or at times when the grid cannot accommodate that energy, such as without becoming destabilized, the renewable resource power generator will be required to disconnect from the grid and/or otherwise discharge the generated energy, thereby creating waste. Simply put, the grid is just not configured for efficiently dealing with the excessive generational spikes, such as above the established median line (manageable standard set by the operator), which occurs from renewable resource energy production and/or energy production on the consumer side of the grid.

Additionally, distributed energy production resources, such as rooftop solar and/or wind turbine generation on the customer side of the meter, and/or other sources of local generation, have proven problematic for the legacy grid to handle. For instance, on the consumer side of the grid, the grid operator currently does not have a way to track, direct, and/or otherwise control the electricity being produced and shoved back onto the grid from the consumer side of renewable resource power production. More particularly, the traditional grid was not designed to accommodate a bidirectional flow of electricity. With the growing number of renewable resource power generation systems, such as being installed on the consumer side of the grid, ever increasing amounts of power is now being attempted to be supplied to the grid from the consumer, where such over generation of power instead of helping to smooth out the demand curve is actually destabilizing the grid.

Such destabilization makes the grid unmanageable by Distributed Services Organizations that other than price regulation lack proper controls beyond the meter to handle the fluctuations due to consumer side power production. This is largely due to the fact that the legacy grid does not allow for real time information related to consumer side power production to be relayed to and from the grid, which is made even more problematic in view of the uptrend and adoption of consumer side generation. Consequently, on the customer side, local meter-side energy production creates its own problems in that any excess energy produced on the consumer side usually has to be shoved back on to the grid and stored thereon thus utilizing the grid as a large battery, yet the grid was never designed to function in this manner.

For example, Distributed Energy Resources (DERs), such as distributed energy generators, smart meters, and the like) requires the electrical grid to act as a battery storage facility by which the customer can call on that power when needed. In some areas, the Distributed Services Organization (DSO) cannot accept any more generation, having to refuse customers that want to install grid tied, personal use solar panels. This is problematic for everyone involved, especially in those instances where the utility company has to pay consumers "not" to install solar panels and/or wind turbines. Hence, consumer side power generation has created a new problem of bidirectional flow.

Centralized battery storage has been introduced on the utility side of the grid, to help compensate for the intermittent nature of commercial renewable resource energy production, as well as in those instances where energy production, such as during non-peak time energy generation at a peaker plant exceeds that used by the consumer. For instance, commonly, where the over production of energy occurs, that energy is typically wasted. Centralized, grid-size battery storage has been advanced as a possible solution to this problem. More particularly, grid side, centralized battery storage is an attempt to mimic traditional gas fired peaker plants.

However, this model is very inefficient for batteries, due to the fact that the battery storage resides on the utility side of the meter. Such centralized battery storage only allows the DSO to react to demand events, it does nothing to address the bidirectional flow from customer side Distributed Energy Resources. Further, such batteries store electricity at an overall loss due to conversion from AC (transmission) to DC (storage) and back again. This loss is increased when transmission is also part of the equation.

In view of the above, it is clear that a major problem with the macro grid, to date, is that it remains largely unintelligent, and thus, the modern changes in both usage and generation are causing the grid to become more and more unstable, resulting in an increased risk of grid outages. These problems become even more complicated as the macro grid is expected to grow and grow into a super grid. For instance, with the realization of long distance power transmission, such as from the power producer to the power distributer, on the transmission grid, and/or from the power distributor to the consumer, on the distribution grid, it has become possible, at least theoretically, to interconnect different centralized distribution centers with far ranging power generation stations in the hope of being able to more effectively balance loads and improve load factors and/or create a nation wide grid.

However, in order to implement a nation wide grid, power production and transmission needs to be synchronous. For instance, power generation and distribution centers on a city, county, state, and/or nationwide basis may be configured so as to form a synchronous group of production and distribution areas, which if configured correctly may all operate with synchronized alternating current frequencies so that the peaks and troughs of the electricity flows occur at the same time). This allows transmission of AC electricity throughout the area, connecting a large number of electricity generators and/or distribution centers and/or consumers and potentially enabling more efficient electricity markets and redundant generation. For instance, a typical synchronized AC grid, can be configured so as to be running at 132 kilovolts and 50 Hertz.

It was hoped that such networked interconnectivity would convert the macro grid into larger and larger versions of the grid that would be state, nation, or even continent wide. There have been several proposals for how such larger grids could be implemented, however, according to the proposed plans, to do so would expectedly require a dramatic increase in transmission capacity, fine tuned internal control, as well as a synchronized global communications protocol. All of these would require a huge outlay of financial resources possibly escalating into the billions of dollars range.

The benefits of such a nation or even continent wide grid are compelling and include enabling the energy production industry to sell electricity to distant markets, thereby increasing competition, the ability to increase usage of intermittent energy sources by balancing them across vast geological regions, and the removal of congestion and commodity like billing structures that prevents electricity markets from flourishing. However, in order for such large-scale grids to be implemented, some major hurdles must be overcome. For instance, its implementation faces local opposition to the siting of new lines and building out the necessary physical infrastructure, there are significant upfront cost to these projects, and there are major difficulties inherent in managing the energy flow and communications necessary for enabling a true county, state, or even nationwide grid.

Further, a necessary component of such a large grid that is yet to be developed and adopted, therefore, is a sufficient management system that is capable of multi-county, multi-state, nationwide and/or continent wide communication as well as grid management on all of the power generation, distribution, and consumer consumption sides of the grid. A macro grid management system is the subsystem of the electric grid that provides management and control services to the macro grid. It requires a huge infrastructure that is controlled and run by massive computer banks, in response to a multiplicity of grid related monitors and sensors, as well as in response to the totality of individual usage scenarios.

Typically, these management systems are run in isolation of one another on a county by county, state by state basis making inter connectivity and overall grid management extremely difficult, if not impossible. For instance, as the macro grid expands into becoming a mega grid, such as by attempting to provide service to ever increasing areas of demand, the various different, respective electric macro grids will need to be configured so as to run synchronously, and consequently, they will need to be able to communicate and interact with one another. More particularly, in a large-scale, maximally efficient synchronous super grid, various different power generators should be configured to run not only at the same frequency but also in the same phase, such as where each generator is maintained by a local governor that regulates the driving torque, for instance, by controlling the steam supply to the turbine driving it.

However, maintaining such synchronicity can be problematic. For instance, in an efficient grid energy should be consumed almost instantaneously as it is produced, generation and consumption, therefore, should be balanced across the entire macro, mega, and/or super grid. Consequently, the grid management system needs to be closely controlled to mirror the demand curve with the supply curve.

For example, demand is the usage of electricity, e.g., the drawing of electricity from the grid by the consumer, where the demand curve is due to the ever-fluctuating usage by the collective of serviced consumers at any given point in time. Thus, demand curves differ from location to location, and from time to time. Supply, on the other hand, is the provision of electricity to the grid, where the supply curve is due to the throttling up or down of power generation, e.g., of fossil fuel or renewable resource power generation, in a manner to meet the fluctuating usage of the demand curve. This becomes problematic as the size of the grid servicing a multiplicity of communities increases, because the task of matching the supply curve to the demand curve becomes increasingly more complicated and difficult. In such situations, the management system is under constant pressure as it tries to find and maintain a balance that is equal between generation and need.

More specifically, over capacity (excessive generation) as well as under capacity (greater demand than supply) creates an unstable electrical grid. And both situations can lead to power outages. Particularly, a large failure in one part of the grid, unless quickly compensated for, can cause current to re-route itself to flow from the remaining generators to consumers over transmission lines of insufficient capacity to handle the extent of the travel, causing further failures, which failures if left unchecked can lead to a cascading shutdown. Hence, a huge downside to a widely connected and/or synchronous macro grid is thus the increased possibility of cascading failure and widespread power outage.

More particularly, the more complex the grid becomes the greater the potential for brown and/or black outs. Accordingly, in order to be fully operational on an international, national, state, or even on a county wide basis, electronic circuitry required for running, managing, and controlling the electric grid, e.g., a universal grid management system, must be constructed, which requires extensive research and development.

Additionally, such an international and/or nation wide gird would require enormous upfront costs for the land, generators, computers, and equipment, as well as demanding a large amount of manpower to build and run the necessary infrastructure. More particularly, in order for such a universal management system to be run efficiently it would need to be smart. So being, in order to be smart, it would also need to be energy efficient, and all of its supply and demand profiles, utility configurations, cost models, and emission standards would need to be improved, such as by optimizing and building out the local infrastructures and control mechanisms.

For instance, within the advanced infrastructure framework of a smart grid, more and more new management services and software applications are needed to emerge so as to eventually revolutionize the macro grid and enhance the consumers' daily lives. However, to date, the legacy grid does not have a management system or the physical infrastructure that is capable of adequately dealing with the ever-increasing demand fluctuations of a consumer base that is rapidly growing. Further, the current macro grid is simply not set up to deal with the inconsistencies of solar and/or wind supply, in addition to the vulgarities of intermittent usage. Accordingly, the present macro grid needs to be updated, e.g., it needs to become intelligent or smart, so that it can deal with an increasing amount of inconsistent demand as well as generation.

What is needed, and presented herein, therefore is a bottom up solution that can revolutionize the way the legacy grid functions, without necessarily having to completely rebuild the entirety of existing local, regional, and/or macro grid networks.

SUMMARY

Accordingly, presented herein are apparatuses, systems, and methods for storing energy from and supplying energy to the electric grid in a manner that can function to make the legacy grid smart at the same time as stabilizing the electric grid as well as making it resilient enough to handle the fluctuations caused by intermittent peak use demand as well as intermittent power generation, such as caused by renewable resource power production.

Hence, in a first aspect, the present disclosure is directed to an energy storage unit such as for storing energy to an electric grid, such as during a time period of low cost power generation, and further for supplying energy to the electric grid, e.g., a super, mega, macro, micro, nano, pico, and/or fento electric grid, such as during a time period of high cost power generation. In such an instance, the energy storage unit may include one or more of an electrical inlet and/or input, an energy storage cell, an electrical outlet and/or output, and/or a control unit.

More particularly, the energy storage unit may include an electrical inlet and/or input for being electrically coupled to the electric grid, where the electrical inlet is configured for receiving electricity from the electric grid. The energy storage cell may be electrically coupled to the electrical inlet, and may be configured for receiving and storing the electricity received from the electric grid by the electrical inlet. The energy storage unit may further include an electrical outlet and/or output where the electrical outlet may be electrically coupled between the energy storage cell and the electric grid, and configured to receive at least some of the electricity stored by the storage cell, such as to supply that electricity to the electric grid, for instance, when the electrical outlet is electrically coupled to the electric grid.

Additionally, the energy storage unit may include a control unit that may be coupled to one or more of the electrical input, the storage cell, and the electrical output. In various instances, the control unit may be configured for determining and/or controlling a first time when the electricity will be received by the electrical inlet, such as from the electric grid, and/or other source of power generation, so as to be stored within the storage cell, and further for determining and controlling a second time when the electricity will be output from the storage cell and supplied to the electric grid and/or appliance associated therewith, such as via the electrical outlet. Further, in various embodiments, the control unit may be configured for controlling the energy storage unit with respect to storing a first amount of electricity received from a source of electricity generation, e.g., received by the inlet, such as within the energy storage cell, and releasing a second amount of electricity from the energy storage cell, e.g., post storage.

In various embodiments, the energy storage unit may include a housing, such as a housing that includes at least one extended member or wall, such as a mounting wall that is configured for retaining one or both of the energy storage cell and/or a control unit. In certain embodiments, the housing may be of any shape and/or any size so as to accommodate the number of energy storage cells sufficient to achieve the storage capacity desired. In various instances, the housing may have a plurality of extended members that are configured as one or more sets of opposed side walls, which side walls can be positioned so as to form an opening between the walls. In such an instance, the housing may house one or more energy storage cells, such as a storage cell that may be coupled to at least one of the walls of the housing.

The energy storage cell may include a top bounding member, a bottom bounding member, and an extended body separating the top bounding member from the bottom bounding member, such as where the top bounding member, bottom bounding member, and extended body together can be formed so as to bound a reservoir. The reservoir may be configured so as to contain a chemical medium therein, such as a chemical medium that is configured for storing a first amount of electricity, such as in the form of chemical energy, and may further be configured for converting the stored chemical energy into a second amount of electricity. Hence, in various embodiments, the energy storage unit may be configured for controllably charging and/or discharging the energy within the storage cell.

In such an instance, the energy storage cell may additionally include a plurality of electrodes, such as a plurality of electrodes that have been configured so as to receive the first and second amounts of electricity. Each of the plurality of electrodes may have a proximal portion, an extended body, and a distal portion, where at least the distal portion of the electrodes extends into the reservoir and is in contact with the chemical medium. The electrodes may function by converting the first amount of electricity into chemical energy, and further for converting the chemical energy into the second amount of electricity.

Both the electrical inlet and the electrical outlet may at least be partially contained within the housing, where the electrical inlet may be configured for receiving the first amount of electricity from the source of power generation, and/or configured for transmitting that electricity to the control unit. Additionally, the electrical outlet may be electrically connected to the control unit, such as for receiving the second amount of electricity from the control unit and may further be configured for emitting the received second amount of electricity such as from the energy storage unit, e.g., upon command of the control unit. In various instances, the electrical inlet and outlet may be part of an electrical inlet system, and/or an electrical outlet system.

The control unit may be electrically connected to the electrical inlet and the plurality of electrodes, and configured for controlling one or more of the receipt of the first amount of electricity from the electrical inlet, the conversion of the first amount of electricity into chemical energy, the conversion of the chemical energy into the second amount of electricity, and the emitting of the second amount of electricity by the electrical outlet. Furthermore, in various embodiments, the control unit may be configured for controlling the conversion of the first amount of electricity to chemical energy for storage within the storage cell, for controlling the conversion of the chemical energy to the second amount of electricity, and for directing the second amount of electricity to the electrical output system for release thereby.

Accordingly, in various instances, the energy storage unit along with its component parts, such as the control unit, the energy storage cell, and/or one or more suitably configured inlet and/or outlet systems, may be configured for receiving a first alternating current, such as via the inlet, converting the first alternating current into a first direct current, converting the first direct current into chemical energy, such as within the chemical media of the energy storage cell, converting the chemical energy into a second direct current, converting the second direct current into a second alternating current, and disbursing the second alternating current, such as via the outlet. In such an instance, the control unit may be configured for receiving the first alternating current and converting the first alternating current into the first direct current, transmitting the first direct current to the energy storage cell, and further configured for receiving the second direct current from the energy storage cell, converting the second direct current to the second alternating current, and transmitting the second direct current to the electrical output system.

In another aspect, an energy flow augmenting system may be provided, such as for storing and supplying energy to the electric grid. In various embodiments, the energy flow augmenting system may include an electric grid, and an energy storage unit, such as described above, where the energy storage unit may include or otherwise be coupled to a control unit, for instance, for controlling a first time when the electricity will be received by an electrical input from the electric grid, and for controlling a second time, such as when the electricity will be output from the storage cell and supplied to the electric grid, for instance via the electrical output. In various instances, the energy flow augmenting system may include a command center, such as a remote command system having a communications module, where the communications module may be configured for sending control commands to the control unit of the energy storage unit, such as via a communications network. In such an instance, the control commands may be directed toward augmenting energy flow across the electric grid such as by commanding the control unit to control the energy storage unit to withdraw energy from the electrical grid based on a storage need, and to control the energy storage unit to release energy to the electrical grid based on a supply need. In one particular instance, the electric grid is configured for transmitting electricity from the electricity generation source to at least one electricity consumer.

For instance, in one embodiment, a system is provided wherein the system may include a power generator, such as a traditional fossil fuel or renewable resource source of power generation, which power generator is configured to generate an amount of electricity, such as a first amount of electricity. The system may further include at least one energy storage unit, which storage unit may be electrically coupled with the power generator, and may include an energy storage cell that contains a chemical medium for receiving a first amount of electricity, e.g., generated by the power generator, and storing it as chemical energy, and further configured for converting the chemical energy into a second amount of electricity. The system may additionally include a control unit for controlling the transmitting of the first electricity to the energy storage cell, and for controlling the transmitting of the second electricity from the energy storage unit to one or more consumption devices remote from the energy storage unit.

In another aspect a method for augmenting an electrical grid that distributes electricity to a geographical region is provided. The method may include one or more of the following steps. For instance, the method may include deploying one or more energy storage units, as described herein, to the geographical region, where each energy storage unit is configured for receiving and storing the electricity received from the electric grid, and further configured for releasing at least some of the electricity stored to the grid so as to supply energy to the grid as needed. For example, the energy storage unit may include a control unit for controlling a first time when the electricity will be received and stored by the energy storage unit, and controlling a second time when the at least some of the electricity will be output from the storage unit and supplied to the electric grid. In various instances, the control unit includes a user interface to receive user commands to program the control unit to withdraw energy from the electric grid and to supply energy to the electric grid.

The method may additionally include determining a peak demand time period for electricity demand in the geographical region, and a non-peak demand time period for the electricity demand in the geographical region; and the method may further include controlling at least one control unit that is connected to the energy storage unit(s). In certain instances, the controlling of the control unit may include one or more of: enabling selected energy storage units to withdraw electricity from the electric grid, such as during the non-peak demand time period for electricity demand in the region, and store the withdrawn electricity as energy; and additionally enabling the selected energy storage units to supply the energy to the electric grid as electricity during the peak demand time period for electricity demand within the geographical region.

In a particular instance, the enabling may include enabling the selected energy storage units to supply the energy to the electric grid as electricity on or near the peak demand time of the time period for electricity demand within the geographical region, and the method may further include supplying at least some of the electricity to the grid or an electric appliance from the energy storage unit on or near the peak demand time of the time period for electricity demand within the geographical region. Hence, in some instances, the energy storage unit may be coupled to an electric appliance, and/or may further be configured for supplying electricity to the electric appliance. Additionally, in certain instances, the control unit of the energy storage unit may include a processor for controlling a plurality of functions of the control unit, and the enabling controlled by the controller may be performed by a processor of the control unit. In various embodiments, the control unit may include a memory, e.g., for storing the user commands and the program, and may include a communication interface for communicating with a remote server via a communications network. In certain particular embodiments, the energy storage unit(s) may include a battery, which battery may be integrated into an electric appliance.

BRIEF DESCRIPTION OF THE DRAWINGS

The nature, objects, and advantages of the present invention will become more apparent to those skilled in the art after considering the following detailed description in connection with the accompanying drawings, in which like reference numerals designate like parts throughout, and wherein.

DETAILED DESCRIPTION

Figure 1:
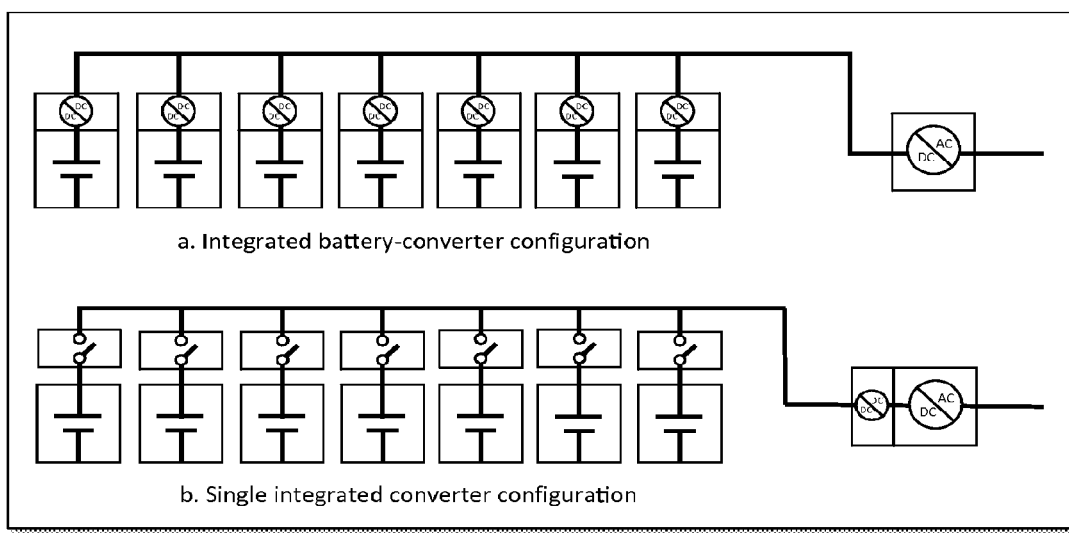
FIG. 1 is a diagram of an architecture of an energy storage unit having a converter associated therewith for DC to DC conversion.

In view of the above, it can be seen that the current electrical grid, e.g., the legacy grid, does not necessarily refer to any particular physical layout of any particular breadth. However, the electrical grid, as commonly understood, denotes a series of local community networks that includes one or a number of power generation facilities and/or one or more distribution centers, all of which run in sync to provide electricity to the local consumers served by the network, where such a network on a region wide basis is often referred to as a macro grid.

More particularly, such wide-scale dispersed, networked regional grids are typically built upon a series of local or regional utilities' electrical transmission and/or distribution networks that service one or more local communities. As these various local community networks begin to become more far reaching and synchronized with one another so as to service one or more cities within a region in conjunction with one another, these local grid networks begin to take on the characteristics of a macro grid, capable of servicing a plurality of cities within a region, or even a plurality of regions within one or a plurality of states. Further, as these micro grids begin to become synchronized with one another across state lines, such as into a nationwide electrical network, they are referred to herein as mega grids, and finally, as such mega grids begin to cross international boundaries they can become super grids, as herein described.

However, as explained above, there are many problems that regularly threaten to shut down any given grid network, such as by causing destabilizations therein. These destabilizations make the synchronicity required to build and/or maintain all the various macro grids in alignment and/or to form several macro girds into one or more mega grids, and/or a super grid, very difficult to create. For instance, these problems are compounded exponentially when several mega grids are needed to run synchronously, such as in the formation of a nationwide mega grid and/or an international super grid.

For example, as indicated above, current macro grids are comprised of outdated generators and generation facilities, archaic transmission lines, as well as outmoded distribution centers and/or distribution lines. As such, as referred to herein, such macro grids comprised of these archaic infrastructures are termed generally as the legacy grid. The main problem with the legacy grid is that it is designed to be simple and linear. As such it does not typically support complex usage and/or generation patterns that result in fluctuations within the grid, such as that which occurs with intense regularity during peak time usage. Peak time energy usage causes spikes in the grid floor on the use side, such as during the part of the day when use is greatest, e.g., when the ambient temperature is the hottest or coldest, such as when the most people are at home and consuming large quantities of electricity. However, as the consumer and their needs are fickle, there is presently no way of determining how much demand will be hitting the grid from day to day at any given moment in time. Simply put, with its archaic infrastructure and lack of comprehensive control mechanisms, the legacy grid is just not configured for dealing with the fluctuations caused by intermittent usage, such as times of peak demand, and this is made even more complicated when fluctuating consumer side generation is added to the equation, such as during times of collective peak generation. The legacy grid was not designed with the bidirectional flow of electricity in mind.

Although there have been several solutions proposed for dealing with the problems that lead to grid destabilizations, for instance, such as those caused by peak time usage and/or peak time consumer side generation, in the pursuit of building a mega or even a nationwide or international super grid, these proposals have largely focused on various top down solutions often based on the need for significant investments of capital, sizably dispersed super-computer networking facilities, and a large amount of human resources so as to rebuild the entire infrastructure from the top down. What is needed, and presented herein however, is a bottom up solution that can revolutionize the way the legacy grid functions, without necessarily having to completely rebuild the entirety of existing local, regional, and/or macro grid networks.

Accordingly, what is presented herein are novel apparatuses, methods of using these apparatuses, and systems built on such uses, which when implemented on a large scale will revolutionize the current power generation and electrical distribution networks both locally and regionally as well as on a nationwide and/or international scale, without requiring large scale dismantling and rebuilding of the various legacy electrical networks.

More specifically, it has been determined that a top down, complete overhaul of the current electrical grid, requiring the entire dismantling of large portions of the legacy grid, so as to build large mega and even super grids, such as to form an enormous, synchronous national and/or international super grid, is an unworkable solution to the nation's need for universal, stable energy production. Such a solution is unworkable in view of the enormous amount of money, time, and resources it would require to dismantle the old network and build an entirely new network, not to mention the wide spread inconveniences it would cause to the individual consumers being serviced by these networks.

The solution presented herein, on the other hand, centers around a ground-up solution starting from the consumer side of the grid, e.g., in the homes and businesses of the local electricity customers. What is proposed is a wide network of smart grid assets, which may include and be founded upon a number of distributive energy storage units, which smart grid assets can be placed on the distribution and/or consumer side of the grid, and can be controlled synchronously by national, regional, and/or even local grid operators.

In particular, where the smart grid asset is one or more energy storage units, these storage units can be formed of one or more configurable energy storage cells along with one or more control units, so as to form a smart energy storage unit that can be placed intentionally throughout the grid network in a manner sufficient to become an integral part of electricity storage and distribution so as to thereby become instrumental to overall grid management. Where the smart grid asset is a smart power generator, distribution mechanism, transformer, and/or one or more transmission and/or distribution lines, these smart grid assets can be configured to include and/or be controlled by one or more smart asset control units, herein described, so as to form a smart electricity supply grid that can be coupled with one or more of the smart energy storage units so as to provide fine-tuned control to the smart assets placed intentionally throughout the grid network and thereby finely control the amount of energy being supplied to the grid and enhancing overall grid management.

More particularly, in particular embodiments, provided herein are "smart energy storage cells" that make up one or more "smart energy storage units," which in some embodiments may be configured as one or more "smart batteries." These smart energy storage units can be strategically distributed throughout the gird, such as in the homes and businesses of the end users of electricity, wherein each of the smart energy storage units is designed so as to withdraw and store energy from the grid, and further may be configured to release and push stored energy on to the grid. Hence, in such instances, the smart energy storage units may be made smart by including a smart control unit that is operably coupled to one or more of the energy storage cells of the smart unit, and may be configured for directing the individual and/or collective of storage cells to store or supply energy from or to the grid.

In order to perform such functions, the smart energy storage unit may include one or more of a current rectifier, inverter, and/or a converter, such as to invert and/or convert one form of current into another form of current, such as an AC to DC rectifier, and/or a DC to AC inverter and/or a DC to DC and/or AC to AC converter. This may be useful where the electricity to be stored enters the system as one form of current, such as AC off of the grid, and needs to be converted into a different form of current, such as DC, in order to be stored within the storage cells, such as chemical potential energy. Accordingly, the smart energy storage control unit may include a control mechanism that is configured to allow two-way transmission with the grid, and may further be configured so as to be operated by one or more of a power generator, grid operator, electricity service provider, electricity consumer, or third party regulator or monitor to control the smart asset, e.g., energy storage unit, in a manner that will allow the grid itself to become "smart," such as without requiring the massive rebuilding of grid infrastructure.

More particularly, in various instances, the individual energy storage cells and/or the storage units themselves may be coupled with a one, two, or three-way or more power converter (e.g., an AC to DC, and/or a DC to AC, and/or an AC to DC to AC power converter) which power converter may be a separate device from the control mechanism, or may be circuitry operation therewith, such that the power converter is configured to function to convert the electricity to be stored, e.g., in one or more forms of AC or DC power, into a form whereby the electricity may be received within the energy storage unit and converted to a from appropriate for storage within the one or more energy storage cells, such as in DC form.

For instance, an energy storage unit and/or the energy storage cells associated therewith may be coupled to a power converter, such as an converter that is capable of changing AC power to DC power, such as for energy storage, and the same convert or a separate inverter may further be capable of changing DC power into AC power, such as for energy supply. Additionally, in various instances, the individual energy storage cells and/or the storage units themselves may be coupled with a power converter, such as a power converter that is configured for converting one form of DC or AC to another form of DC or AC, such as, for instance, converting DC or AC power at one voltage into DC or AC power at another, e.g., higher or lower, voltage, such as in a process of stepping up or stepping down to a particular voltage.

In general, one or more power conversion and/or inversion and/or rectifier units may be included so as to create parody between power sources. For instance, in various particular instances, an energy storage unit may include one or more of a power converter and/or a power inverter and/or a rectifier, such as a one or two-way power converter that is capable of converting AC power to DC power and/or DC power to AC power, and/or a power converter capable of stepping up or down the particular voltage of power, so as to create parody between power sources and/or the grid.

Further, as indicated, one or more, e.g., each individual energy storage cell, and/or one or more individual storage units may include one or more control mechanisms that are configured for controlling one or more functions of the energy storage cells, one or more storage units, one or more conversion and/or inversion units, such as with respect to the charging, e.g., withdrawing energy from the grid, and storage of that energy within the one or more storage cells within one or more storage units, and/or with respect to the discharging of energy therefrom, such as in supplying energy to the grid, such as in time of need. For instance, any suitable mechanism capable of controlling the charging and/or discharging of one or more of the energy storage cells of one or more energy storage units either individually or corporately may be used. For example, each energy storage cell of an energy storage unit may include a media configured for receiving a current, e.g., an electrical current, and storing a portion of the energy inherent therein in an alternative, e.g., chemical, form.

In general, any suitable energy storage media may be used as the storage medium for the energy to be stored. Accordingly, in various instances, the energy storage unit may be any unit having one or more energy storage cells having a storage media, e.g., a chemical composition, that is capable of storing energy, e.g., electric energy, within its composition, e.g., within its chemical composition, which energy may be withdrawn therefrom, such as upon command, e.g., of the control mechanism. Further, where the energy is to be stored within a chemical composition, the energy storage cell and/or storage unit may include one or more electrodes, such as one or more positive and/or one or more negative electrodes, e.g., one or more cathodes and anodes, respectively.

Any suitable control mechanism may be employed. However, in one embodiment, a DRMS control platform may be included, such as where the DRMS is configured for gathering information and acting as a coordinator between the service provider and/or user and the energy storage unit itself. Additionally, in various embodiments, a Smart Asset Management System (SAMS) may be provided, such as where the SAMS may be an integrated, multilevel electricity monitoring and control application that may be configured for enabling the electric grid control organizations, such as Utilities and DSO's, to fully manage conventional and distributed energy resources throughout the grid so as to ensure grid stability and reliable power delivery, maximize renewable energy employment, optimize efficiency of transmission and distribution resources, improve grid infrastructure reliability, and enhance the consumer's overall energy experience. Such SAMS software may be implemented at all levels of the grid segmentation, e.g., supaer grid, mega grid, macro grid, micro grid, nano grid, pico grid, and fento grid, with each level capable of and/or configured for communicating with one or more, e.g., all, of the others. The Smart macro grid does not yet exist so, the apparatuses and methods disclosed herein, along with the SAMS control functionality is an enabler to make it a reality using a bottom-up approach that will effectively evolve the current, legacy grid into a true smart grid.

SAMS functionality may include the collection of energy information, such as where energy information is collected at the lowest level and communicated upward so as to be aggregated. Such collected information may include energy storage cell charge level, storage unit health and operability, and electricity flow and direction. At each level SAMS may conduct an analysis and provide decision support services that enable the DSO to optimize energy employment. Control of the distributed smart energy resources, hence, may be accomplished at each grid level (e.g., micro grid, nano grid, pico grid, etc.) through assessment of ability to meet prioritized requirements.

In various instances, a suitable control mechanism, such as those described herein, may include and be configured to control one or more of the smart grid assets described herein such as a power generator, distribution mechanism, transformer, and/or one or more transmission and/or distribution lines. For instance, in such an instance, a suitable control mechanism may include an embedded controller, such as for power generation, transmission and distribution components of the grid. Additionally, being configurable, such smart energy storage cells may vary in size and capacity dependent on the needs and desires of the consumer and/or electricity service provider. For instance, the typical size of a smart storage unit, such as for in-home or business consumer use, may include one or more individual storage cells, which collection of storage cells form the storage unit. More specifically, an energy storage unit may be composed of a number of storage cells, where each storage cell is stackable so as to provide a storage unit that can vary with respect to its configuration and storage capacity.

Accordingly, each energy storage cell may have any shape, size, and/or capacity dependent on the overall capacity of the storage unit to be deployed. Hence, the storage unit may include one, two, three, four, five, six, seven, eight, nine, ten, fifteen, twenty, twenty-five, fifty, one hundred, two-hundred and fifty, five hundred, or even one thousand or more (or any number there between) storage cells. Further, a suitable energy storage cell may have a shape that may be one or more of a circle, triangle, square, rectangle, rhomboid, and a round, pyramidal, cube shape, and the like. But in one particular embodiment, the smart energy storage unit may have a capacity of 2 KWh, and may include 10 energy storage cells. In various embodiments, the energy storage cells are configured for taking the energy transmitted in an electrical current and storing it as chemical potential energy, and therefore a typical storage cell may be configured to retain one or more chemical compositions.

As indicated above, in certain instances, each individual energy storage cell, and/or the energy storage unit itself, may include an individual control mechanism, or the collection of storage cells that form a storage unit may share a common control mechanism(s), whereby each individual storage cell and/or the storage unit itself may be made smart. As such, the overall storage unit may include a number of individual storage cells, which storage cells may be configured to be controlled individually and/or collectively, such as by one or more control mechanisms thereby making the overall storage unit smart. As each energy storage unit may vary with respect to the number, size, shape, and/or capacity of the energy storage cells it includes, the size, shape, and/or capacity of each individual storage unit may likewise vary.

Further, in various instances, one or more, e.g., each, smart asset, such as each energy storage cell and/or each storage unit, may include a wired or wireless gateway such as for communications, monitoring, and/or controlling of the respective energy storage cell and/or unit. For instance, one or more of the energy storage cells and/or units thereof may be equipped with one or more communications apparatuses allowing for one or more of the receipt and/or the transmission of communications, such as for the controlling of one or more characteristics of that cell(s) and/or unit(s), such as with respect to the charging and/or discharging of energy.

Accordingly, in various instances, the smart energy storage cells and/or unit may include a communications mechanism capable of receiving a remote signal, such as from a remote controller, such as a power generator, supplier, consumer, and/or third party regulator or monitor desirous of controlling, regulating, or monitoring the storage unit, where the control signal may be capable of controlling the charge and/or discharge of the one or more smart energy storage cells included in the one or more smart energy storage units. Additionally, the communications mechanism of the smart storage cell and/or unit may be capable of sending a signal, such as a signal characterizing one or more usage parameters or related data to the remote controller, e.g., a power generator, utility service provider, consumer, and/or third party regulator or monitor which controller can then act on the received data so as to process and send control commands back to the communications module of the smart unit, such as where the receiving controller entity is located in a processing and/or control center located at a centralized service and/or management facility. In various instances, the control signal may be sent from and/or the data signal may be sent to a third party electronic control device, such as a desktop or mobile computer, tablet, smart phone, PDA, and the like, such as that operated by the user of the smart energy storage unit.

A typical communications protocol may be implemented in a wired or wireless configuration. Such wired or wireless communications may be carried out for a number of reasons such as for monitoring and/or controlling the smart grid asset, such as for controlling the charge and/or discharge of the smart energy unit, as well as for reporting various usage parameters with respect thereto. For instance, each individual smart asset, e.g., each energy storage cell and/or unit may include one or more communications apparatuses so as to be capable of being networked together, such as in a wired or wireless configuration, so as to form a network of smart grid assets, e.g., energy storage cells and/or units. For example, a smart grid asset such as an energy storage unit as presented herein may include one or several layers of communication connections for receiving and/or transmitting inputs and/or outputs, such as in a highly modular form. These inputs and/or output connections may include, but are not limited to one or more of a computer based communications mechanism such as a USB, Ethernet, Power Line Control (PLC), API, and the like, and/or a wireless communications protocol such as Zigbee, WiFi, Bluetooth, Low Energy Bluetooth, Cellular, Dash7, RS232, and the like.

Accordingly, where each smart energy storage cell and/or unit includes a control mechanism that includes one or more communications modules, a plurality of such storage units, or the individual cells included therein, may be connected, e.g., in a wired or wireless configuration, so as to communicate with one another and/or with one or more grid controllers, e.g., a power generator, and/or electricity service provider, and/or energy consumer, and/or third party controller or monitor, which communications may be performed such that during certain events, such as during times of under or over energy production, stored power can be pooled for critical loads so as to push power back to the grid, e.g., during peak time events, and/or excess energy can be pulled from the grid and stored in the energy storage cell(s), e.g., during off peak time events. For instance, via the included communications modules, one or more of the smart assets, e.g., the smart energy storage cells and/or units, may be networked together, e.g., to form a circuit, and may be configured to receive inputs from and/or send data to a large variety of different types of users, including consumers, on the use side; utility provides on distribution side; and/or generators on the generation side; which smart grid assets may further change their activity status based on the received and/or sent communications.

For example, the electric grid is often a very complex system requiring constant interaction in order to maintain stable operation. Having a remote and/or virtual communications platform included in the smart grid asset, e.g., in the energy storage cells and/or units herein disclosed, allows grid operators to more effectively manage the remote gird assets, such as the instant storage units, power generators, peaker plants, and/or transmission and distribution lines, and to be proactively alerted when changes in the grid occur. Accordingly, the apparatuses, networks and systems disclosed herein provide the electricity generators, service providers, users, and/or third parties with a much greater ability to have clear and effective communications as to grid and/or asset status, thereby helping to manage customer sited assets, e.g., smart energy storage units positioned on the consumer side of the grid.

More particularly, the control mechanism in addition to the communications module may be configured so as to receive one or more commands and/or otherwise transmit data, such as via a cloud interface, such as through a web based interface. For instance, the control unit may include a plurality of controllers, such as one on the control or service side and one on the implementation or consumer side of the grid, where the communications between the two may be provided through a wired or wireless connection via the World Wide Web. For example, the control unit of the smart asset may include a service side operated control mechanism that is capable of receiving, compiling, and processing inputs from one or a plurality of smart energy storage cells and/or units, e.g., on the consumer side of the grid, such as data related to individual and/or collective use profiles; and may further be configured for receiving inputs from one or more smart assets on the service side of the gird, and in response to the received and/or compiled, and/or processed data, the control unit may send instructions to the corresponding control mechanisms of the smart assets, such as the one or more smart energy storage units, on the consumer side of the grid, with which the grid side controller is networked, which network may be through a web-based and/or cellular portal.

Consequently, the use and/or control of the smart assets, e.g., smart energy storage units, networks, and systems presented herein may be through a web based and/or cellular communications protocol, and may include transmitting and/or receiving data, information, and/or instructions, e.g., regarding unit and/or system control functions, which control functions may be determined and/or operated through a web based interface, such as a graphical user interface. In such a manner as this, a remote controller, such as a utility provider, can send control instructions or directions to one or more of the smart assets and/or energy storage units with which it is networked, such as via a web based interface, and thereby control the functioning of the smart asset, e.g., storage units, such as with respect to charging and discharging of one or more, e.g., a fraction or all of the cell(s) of the storage unit.

As indicated above, the energy storage cells and/or units may be designed to be modular, such as by being configured so as to be expanded or retracted in size, shape, and/or capacity; and in such an instance, the individual energy storage units may be configured to be adapted to the shape and/or size of the storage facility wherein the energy storage units are to be positioned, e.g., where the energy is to be stored. As such, the energy storage cells and units disclosed herein, in various embodiments, may be sized and positioned so as to be stored locally, such as at the site of usage by the consumer, e.g., on the consumer side of the grid, and can be electrically connected to the grid in various suitable manners, such as by being plugged into an outlet, and/or directly wired to the electricity control panel, and/or meter or the like.

For instance, in one particular embodiment, as implemented in an exemplary system, a suitably smart energy storage unit can be connected to the grid, e.g., simply by plugging the storage unit into an electric grid interface, such as to a standard or customized outlet, e.g., via the male end of a two or three prong plug, or it may be connected to the grid by actually hardwiring the storage unit into the service panel, or even directly to the electronic circuitry of an appliance.

In other instances, the connection of the smart energy storage unit with the grid can be made directly by connecting the storage unit to the electrical panel, which can yield either a specific, e.g., external, circuit connection; or can yield a multi-circuit connection, such as where it may be desired to be able to switch between being electrically connected to the external grid, or to be partially or completely removed from the grid, and rather service a given internal circuit, e.g., a micro or nano grid, etc. that is separated from the external, e.g., macro grid, thereby islanding the internal network, as described in greater detail herein below.

Further, in various instances, the control mechanism and the communications module of the smart asset, e.g., of the energy storage units and/or the energy storage cells included therein, may be communicably and/or operably coupled together, so as to further make the smart asset, e.g., the storage unit, smart. In such an instance, the control mechanism of the smart asset, e.g., energy storage cell and/or unit, may be configured so as to be operated remotely. For instance, where the smart asset is an energy storage unit, the storage unit may include one or both of a control mechanism and a communications module, such as where the control mechanism is operably coupled to the communications module in a manner such that the control mechanism can be controlled by instructions received by the communications module, as described in greater detail herein below. Further, as described below, the smart asset, e.g., the energy storage unit, may include a sensor and/or monitor for sensing one or more conditions of one or more of the grid assets disclosed herein.

In various instances, the control mechanism may be configured so as to be able to receive command instructions, such as from one or more of: a centralized controller, such as controlled by a grid operator or energy service provider; a remote controller, such as controlled by the electricity consumer and/or a third party regulator or monitor; and/or directly, such as being controlled by a user interface that is electrically coupled to the control mechanism. More particularly, the control mechanism of the smart asset, e.g., energy storage unit, may be controlled by one or more central processing units (CPUs), such as a core of CPUs that may be positioned remotely from the storage units which they are in communications with, such as at a centralized processing facility, for instance, located at a power supply plant, a service provider center, a third party regulator complex, or the like.

In various instances, the local control mechanism of the energy storage unit, which may be operated and/or controlled remotely from the local storage units, may be configured so as to control when, where, and/or how one or more of the collective of energy storage units and/or storage cells is charging and/or discharging and for how long, e.g., the duration and rate of charge and/or discharge. More specifically, the control units can be controlled remotely, e.g., by a grid operator, energy service provider, user, and/or third party regulator or monitor, in a manner sufficient to instruct each of the smart grid assets how and when to operate, such as to control each individual energy storage unit(s), or one or more, e.g., each, energy storage cell included therein, to independently or collectively charge, thereby receiving and storing energy from the grid; and/or to discharge, thereby supplying energy to the grid. Where these energy storage cells and/or units are positioned at one or more, e.g., a plurality, of positions along the grid, a network of distributed smart energy storage may be formed, such as in a manner so as to form a smart grid covering those portions of the network where the distributed storage units are positioned.

Accordingly, this network of distributed smart assets, e.g., energy storage cells and units, therefore, may then be used to supply energy to the grid when needed, e.g., during times of peak usage; and where smart energy storage units are included, to withdraw and store energy from the grid, such as in off peak times and/or times of over energy production. In a manner such as this, the grid may be stabilized, such as during times of peak demand, for instance, by the grid operator communicating a control command to supply energy to the grid, e.g., locally, by controlling and instructing the control unit(s) of one or more of the distributed storage units or other smart asset, such as, in the local proximity of increased demand, e.g., to discharge all or a portion of the energy stored in one or more of the energy storage cells of the storage units, so as to quickly, and smoothly deal with the enhanced demand by supplying needed energy to the grid, such as by bringing a power generation source online or by pulling that energy from the distributed storage units. And, alternatively, during times of over production and/or declining use, the grid operator may stabilize the grid by pushing excess energy off of the grid and into the energy storage cells of the network of distributed energy storage units.

Hence, the deployment of the smart assets, such as the energy storage units disclosed herein, throughout the local, county, regional, state, national, and/or international grid can be used so as to make the grid itself smart and thereby better obviate the problems of fluctuating usage, especially at times of high intermittent usage and/or at times of peak demand. Further, because the energy to be supplied to or removed from the grid can be controlled remotely so as to be distributed locally, e.g., at or near the site of fluctuating usage and/or peak demand, the supply of energy to the grid and/or the withdrawal of energy from the grid can be performed in such a manner and/or at such a rate so as to minimize the use of the transmission and/or distribution lines thereby minimizing the strain, wear and tear, and overall adverse effects typically caused by such transmission resulting in the prolonged life of grid components including transmission and distribution lines, transformers, power generators, and the like.

Furthermore, as the stored energy to be released is converted locally to the required voltage and/or current flow characteristics, the number of step ups and/or step downs can be kept to a minimum thereby reducing the energy waste caused by such conversions and/or further reducing the strain on the local transformers. Further still, as individual cells of individual energy storage units and/or individual units themselves may be controlled in series or parallel, a more exact amount of energy can be supplied to or removed from the grid, such as in a more curvilinear pattern than could be supplied to the grid by firing up a peaker plant that can only provide energy to the grid in a step-function manner. Hence, in this way, the electricity service provider can more closely match the supply curve to the demand curve thereby better preventing waste caused by the over production, or under usage, of energy to be supplied to the grid.

Moreover, possible brown and/or blackout conditions caused by supplying too much energy to the grid at any given time, which may result from being required to purchase energy in bulk quantities, e.g., from peaker plants, may be avoided. Additionally, the instability caused during times of non-peak demand, or over power generation, can be avoided by the grid operator removing energy from the grid, e.g., locally, by controlling and instructing the control unit(s) of one or more of the distributed storage units, e.g., in the local proximity of decreased demand or over production, to charge all or a portion of the energy storage cells of the one or more storage units, so as to quickly, and smoothly deal with the instabilities caused by decreased demand or over production, e.g., by storing excess energy in the distributed storage units.

Accordingly, the distributed energy storage units disclosed herein along with their control mechanisms and their methods of use can be deployed so as to form one or a system of networked smart storage units that can be positioned throughout an electric grid, such as in circuit, so as to modulate energy transmission and stabilize the grid, thereby enhancing grid performance, such as by removing energy from the grid and storing it, e.g., during times of off peak usage, and supplying energy to the grid, e.g., during times of peak demand. As these functions can be performed rapidly and locally, the problems typically caused due to the archaic infrastructure of the legacy grid and by power transmission generally, e.g., overloading of transmission and/or distribution wires, transformers, and the like, may be largely avoided if not obviated altogether.

As such, the distributed energy storage units disclosed herein may be deployed in a manner so as to enhance the performance efficiencies of transmission of electricity across the electric network. Therefore, in various instances, a control mechanism, as herein disclosed, may be coupled with any suitable grid component, e.g., grid asset, so as to regulate, monitor, and/or control their operation in a manner so as to make the asset smart. For instance, in various embodiments, herein provided are smart grid assets, such as smart generators, distribution mechanisms, transmission and distribution lines, transformers, and energy storage units that may be configured into networks and systems in a manner so as to make the whole network and/or system of networks smart. In various particular instances, these networks and systems are founded on the distribution, e.g., the far and/or wide distribution, of controllable smart energy assets, e.g., smart energy storage units, throughout the system and/or network so as to allow for the controlled storage and supply of energy from and to the grid.

In certain instances, the smart grid assets, e.g., energy storage units and/or cells thereof, and the networks and systems founded thereon, may include a control mechanism, for controlling the asset(s), a communications module, for communicating between assets, and/or a monitor or sensor for monitoring the functioning of each and/or the collective of assets. For instance, in certain instances, one or more smart grid assets can be formed in to a network and/or a system of networks, which grid assets may or may not be in circuit, and if in circuit may be configured to be in parallel and/or series. The smart grid assets may include a control mechanism, such as a control mechanism that may be operably coupled to a communications module, so as to enable the direct and/or remote controlling of the asset. For example, in various embodiments, the smart grid asset, e.g., energy storage units and/or the storage cells therein, may include an interactive communications module, which communications module is configured for receiving a control instruction, such as from a remote control device or attached user interface, e.g., graphical user interface, and relaying the same to the control mechanism of the smart asset such as for controlling the operation of that asset with respect to how, when, and/or where that asset will be engaged, e.g., how and when the energy storage unit will be charged and/or discharged.

In certain particular instances, the control unit may include a communications module that is configured for receiving and acting on the instructions received by one or more users, such as a user located remotely from the asset, and communicating the same to the control unit. More particularly, the control unit may be operatively coupled through a suitably configured communications module to a direct and/or a remote controller of the asset such as via a communications module that may be in a wired or wireless configuration. For example, the control unit may be configured for receiving instructions from a communications module whereby the communications module may be operably connected to a user control interface, e.g., a graphical user interface or control code, and/or to a remote controller of the asset, such as through a cellular and/or internet interface. Any suitable communications module may be used, such as in a wired or wireless configuration. For instance, in a hardwired configuration, the communications can take place via a USB, Ethernet, CAT6, RJ45 connection, or the like; and/or in a wireless network configuration, the communications can take place via a cellular network connection, Wi-Fi, Bluetooth, Low Energy Bluetooth, or the like.

Additionally, any graphical user interface may be employed for ease of selecting, inputting, and communicating control parameters to the device and/or system, such as that formatted for display on a mobile computing device, a desktop computer, and/or other form of display and/or device having a monitor. For instance, a smart asset of the disclosure may include a control mechanism that is in operable connection with a display device, such as a touch screen display, whereby the touch display may be configured to display a selection of configurable command instructions that can be displayed to a user such that the user can select the desired operational parameters, such as by touching the displayed representation(s), and thereby configuring the operation of the unit and/or system. Any suitable display may be included, such as a non-touch or touch operated flat panel display, e.g., a resistive or capacitive or other form of touch display, such as a low, medium, or high definition, LCD (Liquid Chromatography Display), LED (Light Emitting Diode), OLED (Organic LED), AMOLED (Active Matrix OLED), Retina display, tactile display, an alkali-aluminosilicate glass shield display, and the like. In various instances, the display may be the display of a mobile, smart computing device, such as a mobile or tablet style computer, which may be connected directly to the smart asset, e.g., in a wired configuration such as via a USB or lightning connection or hardwired therewith, and/or may be connected wirelessly to the smart asset via complimentary wireless communications modules.

Additionally, in certain embodiments, one or more of the smart assets herein disclosed may include one or more monitors and/or sensors that may be configured for sensing, monitoring, and/or determining a condition of a network component or the network itself, and when a particular condition occurs the sensor and/or monitor may be configured for communicating the sensed condition(s), such as via an operationally coupled communications module. The sensed condition(s) may be communicated to the control unit of the smart asset and/or to a central control facility or to another third party, whereby once communicated, the control unit or central control facility, etc. may take one or more actions in response thereto, such as changing an operations parameter e.g., of the asset, network, and/or system, for instance, with respect to whether to bring the asset online or take it offline, e.g., charge or discharge the asset, which assets to activate, and/or where, and/or for how long, etc., so as to better control the network and/or system.

The sensor may sense, and the monitor may monitor a condition of the grid, or a component thereof, such as a condition pertaining to the state of needing more or less energy, and the sensor and/or monitor may communicate that data to the control unit of the smart asset, e.g., energy storage unit, or a central control facility, etc., which control unit may then instruct one or more of the smart assets, e.g., energy storage unit(s), to change its operational parameters, e.g., to charge or discharge thereby withdrawing energy from or supplying energy to the grid. For example, in various instances, the control unit may instruct the communications module to send a communication, e.g., with respect to the sensed condition, from the control unit of the smart asset to a remote location, such as to a remote user, e.g., a grid operator, service provider, consumer, and/or $3^{rd}$ party regulator or monitor of the system condition, so as to notify the user of the sensed condition, which notification may be presented to the user via a graphical user interface that is displayed upon an associated display, and where appropriate may present the user with one or more options as to how to configure or reconfigure the system, network, and/or its components to respond to the identified condition.

In such an instance, the user may then perform one or more operations, e.g., select an option so as to reconfigure the smart asset, network, or system which operations may be communicated back to the control unit, e.g., via a suitably connected communications module, upon receipt of which the control unit of the smart asset may then direct the operating conditions of the asset, network, and/or system, and/or the components thereof, such as by directing the energy storage unit(s) to charge or discharge their energy storage cells. Hence, in such instances, a user of the system may be sent a notification, e.g., an alert, and given the ability to make one or more active changes to the distributed smart asset and/or a grid component associated and/or serviced thereby.

Accordingly, along with a smart control unit, including a control mechanism, and a communications module, the smart grid asset, e.g., one or more smart energy storage units, and/or their component parts, may additionally include one or more configurable smart monitoring devices, so as to enable one or more users, e.g., a grid operator, service provider, consumer, and/or $3^{rd}$ party regulator or monitor of the system to monitor the grid system, network, and/or their component parts. For instance, a monitor may sense a condition of the grid and/or a condition of one or a number of smart energy assets, e.g., storage units, such as with respect to the need to supply or withdraw energy to or from a determined location of the grid and/or the location and charge or discharge capacity of the determined smart energy storage units servicing that determined location of the grid. In such an instance, the monitor in conjunction with the communications module may communicate the sensed and/or processed data to the control unit of the storage units and/or directly to a user, in response to which an operational parameter of the network and/or system may be changed, such as by the user or automatically without intervention of the user.

A number of grid conditions may be monitored, such as those with respect to grid efficiency, grid load, and/or grid traffic, and the like, and/or the monitor may monitor a number of conditions pertaining to the one or more of the networked smart assets, e.g., energy storage units, including location, charge capacity, discharge ability, rate of charge or discharge, and the like, so as to better allow the user, e.g., grid controller or smart unit user, to modulate the unit(s), network, and/or system operations, such as to allow the user to schedule overall and/or permanent load shifting, such as while supporting advanced Demand Response capabilities.

For instance, as described above, one or more, e.g., all, of the individual storage units may include a communications module, such as a cellular or WIFI gateway, along with one or more sensors, which sensors may be configured for detecting one or more conditions of the individual and/or collective of storage units and/or grid such as for determining when and which storage units should be charged and/or discharged and to what extent and/or which ones should remain idle. More particularly, the control unit(s) of one or more of the smart asset(s), e.g., of a network or system of networks including the smart asset(s), can be configured to include associated hardware and/or imbedded software for running the system, network, or associated smart asset(s), such as for sensing, monitoring, communicating, and/or controlling the functions of the same.

For example, the system, network, and/or smart system hardware and/or software may be configured to control the communications module and/or smart asset itself in a manner such that the control unit may communicate with one or more other devices throughout the system, which communications module may include one or more of an application programming interface (API), a cloud platform, and/or a wired or wireless communication protocol, such as PLC, Ethernet, RJ45, RS232, and USB; a cellular communications protocol; and/or a Wifi, Bluetooth, Low Energy Bluetooth, or other wireless communications protocol, such as Zigbee (SE and HA), Dash7, and the like, so as to effectuate such communications. In a manner such as this, through the control system of the network and control unit of the individual smart asset(s) thereof, various of the grid assets can be configured for communicating with one another remotely, e.g., in a wired or wireless configuration, such as where the grid network includes a centralized control system or controller, e.g., at a centralized processing center, which control system may be in communication with a distributed network of smart assets, such as energy storage units, so as to allow the distributed network, e.g., of energy storage units, to communicate with the system control, such as with regard to one or more conditions of the grid and/or its individual units, and to allow the system controller to communicate, e.g., commands, to the individual or collective of smart grid assets, e.g., energy storage units, such as in response to communications received thereby.

Further, as the control system is capable of being in communications with a plurality, e.g., all, of the smart grid assets, and further capable of receiving sensed and/or communicated data therefrom, which data may then be collated, processed, and converted into one or more command codes, instructions, and/or warnings, the command system is capable of controlling each of the associated grid assets either collectively or individually so as to respond to the sensed and processed condition data. For instance, the entire electric grid or a sub-portion thereof may be controlled, such as from a large nationwide or international scale to a small, minute, e.g., individual asset scale, by the centralized control system running a management system such as a demand response management system. Hence, in a manner such as this, each of the one or more, e.g., the entire collective, of smart assets, e.g., energy storage units, and the entire grid itself may communicate with one another and/or be controlled, e.g., remotely, such as via one or more of the demand response management system(s) and/or a party controlling the same.

For example, a user, e.g., a power generator, grid operator, energy service provider, consumer, and/or $3^{rd}$ party regulator or monitor of the overall system condition can access one or more, e.g., the entirety, of the system assets, for example, the controller of the centralized processing center and/or one or more of the smart assets, e.g., the energy storage unit, remotely, such as via a web based interface, and through the demand response management system configure the individual asset(s) and/or entire system run parameters. More particularly, in various such instances, the centralized control system can be accessed via the web accessible demand response management system, such as by the remote utility service provider, who can thereby receive data as to the condition or status of one or more of the grid assets, e.g., a remote energy storage cell or unit, a collection of energy storage cells or units, and/or a grid or a collection of girds, can collate and process the condition and/or status data, and in response thereto instruct one or more of the individual control units of the smart asset, e.g., energy storage cells or units, networked therewith to change its operational parameters, e.g., charge and/or to discharge, so as to remove energy, e.g., excess energy, away from the grid, and/or supply energy, e.g., stored energy, to the gird. In various instances, the system can be configured to run autonomously, e.g., via the demand response system hardware and/or software, such as within a predetermined and/or preselected series of run parameters in such a manner that the system self adjusts based on the received conditions of the individual and/or collective of networked assets.

Additionally, to better effectuate the control exerted by the control system, the one or more individual control units of the individual smart grid asset, such as an energy storage unit, may include a geo-location device, or other positioning and/or locating mechanism, e.g., a GPS, cellular triangulation system, or the like, whereby the centralized control system can determine the location of each smart grid asset, e.g., energy storage unit or storage cell positioned therein, and can thereby determine how that grid asset should function, such as where and when each particular energy storage cell and/or each particular storage unit should be charged and/or discharged. Hence, the centralized management control system provided herein can be configured so as to enable a remote controller, e.g., a management operating system and/or a remote operator of such a system, such as a utility provider or user of an asset of the system, to access and control one or more of the distributed storage units networked therewith, such as through a web based interface, and thereby instruct the one or more control units to charge and store energy and/or to discharge the stored energy.

More particularly, the distributed energy storage units, systems, and methods of employing the same, as herein described, can be controlled autonomously and/or by one or more remote users, for one or more of a multiplicity of purposes, such as for charging the energy storage units, e.g., during low utility pricing times, and discharging the units, e.g., during peak energy demand spikes, such as in a manner sufficient to shift peak demand to off-peak times, e.g., without inconveniencing the consumer; transitioning from one power generation source to another power generation source; and proximity detection, such as for non critical power shutdown and startup as well as for security.

Accordingly, in various instances, one or more of the electric grid components, such as a power generator, a distribution mechanism, a transformer, an energy storage unit, and/or the transmission and/or distribution lines, e.g., smart grid assets, may include a control mechanism, as described herein, wherein the control mechanism may be configured to control the operation of one or more of the grid assets such as with respect to its function in producing, transferring, storing, and/or supplying electricity throughout the electric grid, which control mechanism may be configured so as to allow remote communications with a user, e.g., via a communications portal, through which communications portal the remote user may then configure and/or control the system and/or component operational configurations.

For example, in one particular example, the operation of one or more smart grid assets, e.g., a power generator(s) may be controlled, such as by a suitable control mechanism, and further may be networked into a system, e.g., so as to be controlled remotely, such as via inclusion of a wired or wireless communications module, which may include a web based interface therewith, whereby the operation of the power generator may be controlled, e.g., remotely, such as by interfacing with the web based interface in a manner sufficient to control the control mechanism of the generator and thereby control the power generator. Hence, in such a manner, the functioning of the power generator, e.g., with respect to rate, frequency, amount, voltage, current, etc. may be regulated and/or actively changed so as to better modulate the grid and consumer side power supply, such as in an effort to more finely match power supply with consumer use. More specifically, such changes can be implemented by instructing the control mechanism of the power generator to direct the power generator to produce, speed up, slow down, or cease the production of power being supplied to the grid.

For instance, where the power generator is a source of steam based and/or renewable power generation, the control mechanism may be configured to automatically control the amount of power, e.g., excess power, being supplied to the grid regardless of which side of the grid the power is being generated, e.g., the service and/or consumer side of the grid. Further, where the smart source of power generation is electronically connected to a smart source of energy distribution and/or storage, the control mechanism may be employed so as to control the one or more power generators, e.g., to increase or decrease power generation, to direct the transmission, flow, and/or distribution of power, and/or when useful to push excess energy into one or more of the energy storage units, e.g., distributed storage units described herein, or withdraw stored power from the storage units so as to supply energy back to the grid. Accordingly, in various instances, one or more of the distribution servers, transformers, and/or transmission and/or distribution lines of the electric grid may include one or more control mechanisms and may likewise be controlled so as to regulate the functioning of the grid and its components, such as with respect to the production, transmission, and/or storage and/or supplying of electricity to the grid.

In another example, the operation of one or more energy storage units may be controlled, such as by a suitable control mechanism, and further may be networked into a system, e.g., so as to be controlled remotely, such as via inclusion of a wired or wireless communications module, which may include a web based interface therewith, whereby the operation of the energy storage unit may be controlled, e.g., remotely, such as by interfacing with the web based or cellular interface in a manner sufficient to control the control mechanism of the storage unit and/or a storage cell thereof, and may thereby control the energy storage unit, such as with respect to the charging and/or discharging of the storage cells therein. Hence, in such a manner, the functioning, e.g., charging and/or discharging, of the energy storage unit, e.g., with respect to when, how, rate, amount, frequency, etc., may be regulated and/or actively changed so as to better modulate the grid and consumer side power supply, such as in an effort to more finely match power supply with consumer use.

Accordingly, as indicated, in various instances, one or more of the control mechanisms of one or more of the smart assets of the grid may be controlled in any suitable manner, such as via a corresponding web based and/or cellular user interface and/or directly, e.g., via a graphical user interface included on a display, such as a touchscreen display of the smart asset. Furthermore, a user, e.g., a grid operator, energy service provider, consumer, third party, or the like can be alerted by the control system as to when a specific event occurs and/or be given various control options, e.g., when such an event occurs, in response to which the user can configure the operation of the grid asset, e.g., their individual energy storage units according to their preferred use profile.

For instance, where the smart grid asset is an energy storage unit having a control mechanism as disclosed herein, such as a personal energy storage unit capable of being controlled directly or remotely, e.g., via one or more user control functions, the individual user can engage the user control functions, e.g., via a graphical user interface, so as to control the storage unit, e.g., to schedule how and when they want the individual unit and/or local grid system collectively to perform certain functions such as charge time, discharge time, rate, and times of sitting idle, etc. Such interactions can bring about energy budgeting awareness by helping the individual or collective of consumers develop usage strategies that can reduce their overall maintenance and operations costs, thereby reducing the overall cost for energy usage. Additionally, different scenarios to help divert power to critical loads during specified events may be set up. In such instances, such changes can range from scheduling to shutting down or islanding the Distributed Energy Resource (DER).

As described above, the legacy electric grid is typically comprised of power generation sources, electricity distribution centers, and the transmission lines, transformers, and meters that are used to transfer energy from the site of its generation to the facility of the consumer where that energy will be used. As commonly used the term grid refers to the local macro grid that services a large, multi-state region of users. When referencing a localized community of users and/or facilities that are serviced by a particular, common portion of the macro grid, such localized grid network may be referred to herein as a micro grid. Hence, the communities serviced by the grid, e.g., the macro grid, can be small or large, such as being as large as needed to serve a few states, but typically have not been capable of being large enough to serve an entire nation, e.g., so as to form a national mega grid, and certainly not as large as being able to form an international super grid. In order for such large-scale service areas to be provided for, such as by a single (or collective of) service providers, the collection of legacy macro grids (on a national or international basis) would have to be operated synchronously. In order for this to happen the various grid networks involved, as well as their component parts and systems, would have to be made smart.

As indicated above, however, making the grid smart, as currently proposed, means dismantling and replacing the current, legacy infrastructure with new intelligent devices as well as more heavy duty transmission lines. The cost of implementing such a proposal is astronomical both monetarily and in human resources, not to mention the wide scale chaos and discomfort it would cause to the daily lives of the electricity consumers involved. What is needed is a system of control mechanisms and/or structures that can easily be inserted into and/or throughout the existing legacy grid, and/or its component parts, and can be used to perform one or more of the tasks of controlling energy production, transmission, service, distribution, and/or use, in such a manner that is energy efficient, minimizes waste, does not destabilize the grid, and ideally does not require the consumer to drastically change their use habits.

Further, as indicated above, the legacy grid typically refers to larger scale energy transmission, such as on a regional, multi-state, macro level. However, as presented herein, as the grid is made intelligent the areas to be serviced can be much larger so as to from a nationwide mega grid and/or international super grid, such as where a single grid network is capable of servicing all of the networked regions, states, and/or provinces, on a nationwide and/or international wide scale. Likewise, just as the devices, systems, and methods disclosed herein are capable of making the various grid components synchronous so as to form grid networks larger than the current legacy macro grid, so too can they be employed, as described herein, to form smart grid networks that are smaller than the macro grid, and capable of servicing areas smaller than a local city or plurality of communities, such as to form smart micro grids, e.g., servicing a single community or group of facilities at a given location, or to form smart nano grids, e.g., servicing a single facility, or a pico grid, e.g., servicing a particular portion of a facility, or even a fento grid, e.g., servicing a single or a group of appliances within a room of a facility.

The evolution of such sub-grids is important for many reasons, such as with the growth of renewable resource energy production, and/or the increasing adoption of consumer side power generators, it is becoming more and more feasible to remove a given community, facility or group of facilities from the macro grid, so as to form an isolatable micro, nano, pico, or even a fento grid, wherein the energy to be transferred throughout the network may be supplied entirely internally to the given network. More particularly, with the increasingly wide scale adoption of consumer side renewable resource energy production, energy consumers are increasingly attempting to be able to separate themselves from the local macro grid.

To date this has not been readily possible because of the communications problems existent between the source of renewable resource power generation and the legacy grid. More specifically, the legacy grid was not constructed with the idea of two-way power transfer in mind. Nor have the renewable resource power generators been configured so as to be able to communicate effectively with the legacy grid. Consequently, as the individual or collective consumers produce energy through their own power generation source(s), whatever energy is not consumed by the consumer(s), so as to meet their daily demands, will need to be discharged. Typically, the discharging of such energy means shoving the excess energy back on to the grid. The grid, however, was not set up to store such energy, and consequently the grid operator has no means of determining, monitoring, and/or controlling how much energy will be received onto the grid and/or directing that energy flow, and thus, the problem of intermittent, peak time energy production is created, whereby consumer side energy is being randomly shoved back on to the grid without regard for how that energy is to be effectively utilized by the grid operator. And since the legacy grid infrastructure was not created to handle energy transference in this manner, a new source of instability is now constantly threatening to overwhelm the grid and cause a wide scale shutdown.

What is needed in this regard, therefore, are devices, systems, and methods of using the same in a manner that can be deployed throughout a grid system, e.g., a legacy macro grid, that will be functional despite the large or small size of the grid, e.g., regardless of the grid being as large as an international super grid, or being as small as a fento grid within an individual appliance; and will further be capable of being networked together so as to make the grid smart so as to be controllable, with respect to the supplying and withdrawing of energy to and from the grid, either through a direct interface therewith or remotely, such as through a cloud based or cellular network connection. Accordingly, presented herein, are control mechanisms, including associated hardware and/or software, that can be associated with a grid asset and deployed individually and/or collectively in a system throughout a grid network so as to modulate and control that grid asset in a manner sufficient to thereby control the functioning of the serviced grid area, such as with respect to the amount, rate, frequency, current, voltage, direction, etc. of energy being supplied to or withdrawn from the grid. The controllable grid asset may be any suitably configured grid asset, such as a power generator, a distribution mechanism, a transformer, a smart meter, and/or the transmission and/or distribution lines there between, but in some instances, may be one or more, e.g., a plurality, of distributed energy storage cells and the units that contain them.

For instance, in certain embodiments, a network of energy storage systems may be provided, such as throughout a grid area to be set up and/or serviced, wherein each of the energy storage units, and/or the energy storage cells thereof, may include one or more of: a control mechanism, a communications module, a sensor, a monitor, a gps, and/or a display, such as where the control mechanism is capable of controlling the characteristics of the charging and/or discharging of the energy storage cell(s) of the storage unit, such as with respect to time and duration of charge or discharge, rate of charge or discharge, conversion of the current to be charged, e.g., from AC to DC, conversion of the current to be discharged, e.g., from DC to AC, voltage, and the like. In certain instances, the communications module may be configured for communicating with one or more of the other networked energy storage units and/or cells thereof, as well as with one or more smart asset operators, e.g., a user; the sensor and/or monitor may be configured for sensing and monitoring a condition of the storage unit and/or grid serviced, such as with respect to the amount of energy supplied thereto or contained therein; the GPS unit may be configured for determining the location of the energy storage unit and/or cells thereof, e.g., with respect to the grid services; and the display may be capable of displaying and/or receiving information, e.g., directly such as through a displayed user interface, or remotely through the communications module, such as information related to one or more sensed conditions and/or an operational command, such as in response thereto.

Accordingly, in various instances, as indicated above, the control mechanisms of each of these individual smart energy storage units may be configured so as to be in communication with one another and/or with one or more centralized control system(s) so as to be controlled individually and/or together in concert, such as in a synchronous or sequential manner so as to make the grid they are coupled to smart. For instance, each of the individual smart energy units within a system may be configured to form a network of smart energy storage units, such as where the network may form a fento, pico, nano, micro, macro, mega, and/or a super grid, for example, where these plurality of grids may be layered one on top of the other such as where one or more fento grids can be coupled electrically and/or communicably, so as to form one or more pico grids, and/or one or more pico grids can be coupled, e.g., electrically and/or communicably, so as to form one or more nano grids, and/or one or more nano grids can be coupled in the same manner so as to form one or more micro grids, which in turn can be coupled in like manner so as to form one or more macro grids, which may likewise be coupled to form one or more mega grids, which in turn can be coupled so as to form one or more super grids, such as in a nationwide or international super grid. In a layered manner such as this, the electric grid may be made smart, incrementally, by building one controllable grid on top of the other, such as by interconnecting increasing numbers of individualized storage units together over ever increasing service areas, and thereby controlling them so as to function in concert, such as via a cloud based interface, in a synchronous or sequential manner and thereby creating a very stable environment where energy can be supplied to the end user consistently, and locally without fear of overloading the network.

For instance, each smart energy storage unit and/or the cells thereof can be configured for storing a predetermined quantum of energy, and may be further configured for one or both of being charged, such as by drawing energy from the grid and storing it within its respective energy storage cells, and/or being discharged, such as by supplying energy back to the grid or to the end user's site of usage, e.g., home or business, such as where such charging and/or discharging can be controlled either onsite or remotely such as by the electricity provider and/or end user and/or other third party. More particularly, each smart energy storage unit may include a control mechanism and therefore be individually configured to receive a charge instruction, such as from a remote party, e.g., a power generator, supplier, user, or other $3^{rd}$ party, and will be able to store a determined quantum of energy in response thereto, such as at a time when energy supply is cheap, e.g., during a time of excess power generation or a non-peak generation time; and may further be configured for releasing that energy either back on to the grid or to the site of usage, such as in response to another control signal such as during a threatened brown out or black out condition.

Additionally, one or a plurality of the smart storage units may be controlled collectively, such as by a grid operator or energy service provider, to either store or supply higher quantums of energy from or to the grid, such as to smooth out energy consumption fluctuations and thereby stabilize the grid. More specifically, energy may be stored on the collective of networked energy storage units that have been widely distributed locally, e.g., on the service and/or consumer side of the grid, such as at times of low consumption, e.g., late at night or early morning, or times of excess production, thereby ameliorating the waste that would typically occur by the service provider having to dump the excess electricity due to an unexpected drop in usage or over production.

Further such energy may be supplied back to the grid from the networked smart energy units, such as at times of peak usage, and/or at times where grid stability is threatened, e.g., due to under production or inefficient (or non-existent) transmission, so as to provide needed energy to the local grid user and thereby stabilize the grid. More particularly, each individual smart energy unit and each network of units has the ability to store precise levels of amounts of energy, such as in individual storage cells of the energy storage units of the one or more networks and/or systems of units, which can be individually and/or collectively controlled so as to release precise amounts of energy back to the grid or to the site of usage, such as at times of peak demand or when grid interruptions occur, such as to run a local environment for a given amount of time. In a manner such as this, the collective of smart energy storage units, or other smart assets, may be networked together and controlled so as to withdraw and store excess energy from the grid, and/or to supply energy to the grid at times of need so as to smooth out the grid and minimize the adverse effects of intermittent and fluctuating usage.

Additionally, because each smart energy storage unit may be individually controlled, so as to store and release designated quantums of energy, e.g., based on the size and number of energy storage cells each individual smart unit includes, a more precise amount of energy may be supplied to the grid, so as to more finely attune the power being supplied to the grid with the power being demanded by the consumer and thereby being withdrawn from the grid. For instance, the grid operator or other party may determine the amount of energy needing to be supplied to the grid, such as by analyzing the current or predicted demand curve, and based on that determination may activate a more exact portion of a more exact number of energy storage cells of a more exact number of storage units so as to more precisely supply energy to the grid in a manner that more closely aligns the supply curve to the predetermined demand curve. Consequently, in a manner such as this, the demand and supply curves can be more closely aligned, and rather than having to purchase a large quantity of energy, supplied in a step-function manner by bringing a peaker plant on line, a more precise amount of energy can be supplied to the grid, in a curvilinear fashion, by instructing a number of fuel cells, containing a small predetermined quantum of energy, in a number of storage units to release that more precise amount of energy to the grid at close to the precise time it is need. And as the energy to be used can be supplied more locally to the site of its consumption, the wear and tear on the transformation and distribution lines, as well as the transformers serving them may be minimized.

Hence, in a manner such as this, the outdated peaker plants, that are largely only capable of providing energy to the grid in predefined quantums of energy in a step function manner, and have to constantly be sitting idle waiting for the times when they will need to be fired up and brought on line, can be done away with, thereby obviating the high cost of their production, the land required for their installation, the regulatory hassle involved in their building, running, and maintenance, as well as the pollution they produce, thus saving the utility companies hundreds of million's of dollars in wasted money and resources. More particularly, as each storage unit includes a number of energy storage cells of a given capacity that are positioned over a widespread network of users, small quantums of stored energy can be supplied to the grid from a multiplicity of units in such a manner as to closely align the supply curve to the demand curve, thus, ameliorating the tension caused by the energy supplier when deciding whether or not to bring one or more additional peaker plant on line, thereby necessitating the purchase of a large quantity of energy in bulk that may not in the end be needed and may therefore result in being wasted. For instance, spinning reserve sites, e.g., peaker plants, remain constantly on in an idle mode until the need arises wherein the peaker plant can be ramped up fast and linearly to ensure consistent, even power flow through the grid. Hence, for the majority of the time these plants remain idle, e.g., for most of the year, waiting to be fired up so as to accommodate the few peak time events. Because they are always "on" they can be ramped up fast so as to respond rapidly to increased demand needs.

There are several problems, however, with the peaker plant always being on, but rarely being used. For instance, when they are sitting idle, they are simply wasting energy, while at the same time releasing a constant stream of $CO_2$ and other polluting emissions into the environment, as well as creating a high cost for maintenance, and generating extra stress on the grid and its machinery. For example, existent peaker plants need to constantly be refurbished so as to capture the latest innovations. Additionally, because the peaker plant can still only supply energy to the grid at single step-function level, it is simply not configured to match the energy that it is pushing on to the grid in a manner that more precisely matches the grids electricity needs, and hence even when supplying energy to the gird peaker plants create huge flux.

A further problem with peaker plants is that during production and after they remain highly governmentally regulated. For instance, the amount of investment required to build past generators have required a 50 plus year payback period in order for the Distributed Services Organization to receive a return on its investment. And yet government regulations mandate the DSO to incur such a cost to build the peaker plant so as to ensure the utility provider can meet the increasing demand needs of its customers, such as at peak times. Yet, due to changing carbon regulations many of these plants are now regulated to be decommissioned, leaving the DSOs without a way to recover their investments. Consequently, peaker plants require a huge initial investment to be brought online, and yet are constantly being rendered obsolete prior to any value being returned. Hence, the pushing of power to the grid via centralized peaker plants is not ideal and does little to reduce transformer loads that leads to grid failures and increased maintenance.

However, as the devices, systems, and the methods of their use, as herein described, e.g., individual storage units, are capable of being networked together and/or individually or collectively controlled and operated, such as by the utility provider, and because each individual unit can be networked together so as to be controlled in concert remotely, at any given time a small or large quantity of energy is available to be supplied to the grid at the command of the utility thereby obviating the need to have and/or fire up a peaker plant in the first place. Accordingly, the solutions provided herein may be configured so as to do away with all the waste caused by the utility having to buy power in bulk amounts, e.g., from spinning reserves, and then having to discharge unused portions thereof. Further, these solutions will also do away with all the pollution caused by these plants as they remain in a steady "on" state of preparedness waiting to be brought on line. More importantly, as the need for building peaker plants is obviated, the utility can save the hundreds of millions of dollars required to build such plants, and assuage the potential loss of that investment due to the ever-changing regulatory climate.

Additionally, as the individual energy storage cells that make up the storage units can be configured so as to be modular, each individual storage unit can be shaped and sized to accommodate the needs and/or desires of the individual user, and thus can be made to be stored in a place and in a manner at the site of usage so as to not be intrusive to the user. As these energy storage units may be stored at the site of usage, there is less waste do to having to transport energy over long distances, such as at peak times, thereby reducing the transference inefficiencies and waste caused by stepping up and down. Further, having a local, distributive storage solution allows the individual user to make use of the stored energy such as at those times when the grid actually does go down.

Accordingly, as the collection of networked smart energy storage units can be controlled by the grid operator or other electricity service provider to store and additionally supply energy to the grid, and further such grid operator can control the precise amount of energy to be stored and/or supplied as well as where and when those functions shall be performed, the macro grid can be as a whole made smart, such as without the need for a substantial investment of refurbishing the legacy infrastructure. Hence, by distributively storing electricity and/or delivering it locally, or even to more remote locations and/or markets, stable power may be supplied in a smart manner to the grid, e.g., during times of destabilization or threatened disruption, so as to smooth out the effects of fluctuating usage and minimize times of disruption and/or reduce or obviating the usage of peaker plants for energy production.

Further, wide spread installation of the disclosed smart energy storage units along with the control mechanisms included for the purpose of controlling their use can make the local macro grid smart, which in turn allows for the control and functioning of various macro grids collectively to be smart, thereby further allowing their functioning to be synchronous resulting in the configuring of a plurality of smart macro grids into a smart mega grid. Likewise, as the supply of these smart storage units reaches a level so as to be widely distributed city, county, state, nationwide, and/or even internationally each various macro and/or mega grid may be controlled and operated synchronously thereby forming a smart super grid. Hence, the control mechanisms and smart energy storage units disclosed herein and the systems that they provide for allow for the outward expansion of smart macro grids into smart mega and/or super grids or larger. Likewise, the control mechanisms and smart energy storage units disclosed herein and the systems that they provide for allow for the reduction of smart macro grids into smart micro and/or smart nano and/or smart pico as well as smart fento grids or smaller.

More particularly, the control mechanisms and smart energy storage units disclosed herein and the systems that they provide for can convert the inefficient and dumb legacy micro grid into a smart micro grid, whereby the energy being supplied to and/or withdrawn from the grid can be finely controlled and regulated, such as by regulating the power being generated and/or distributed and/or transmitted and/or transformed and/or stored or released into the grid, such as at the precise level, rate, and location of need. Further, the control mechanisms and smart energy storage units disclosed herein and the systems employing them can be configured to be distributed throughout ever increasing regions of use so as to make the serviced individual macro grid regions synchronous with respect to the energy being supplied thereto, or withdrawn there from, so as to allow the various independent macro grids to be controlled and operated synchronously so as to form a single mega grid, such as where the various smart micro grids are configured to operate synchronously so as to be capable of being combined and controlled together as one or more mega grid network(s). Furthermore, as the control mechanisms and/or energy storage units disclosed herein are widely distributed, such as on a nationwide basis over one or more national mega grids, the various national mega grids may be configured so to operate synchronously so as to be capable of being combined and controlled together as one or more international super grid network(s).

Additionally, in various instances, instead of making the macro grid not only smart but larger, it may be useful to make the macro grid not only smart, but smaller, such as where it may be desirable to isolate a community or facility, or a group of communities or facilities from the macro grid. For instance, in various embodiments, it may be desirable to form a sub-grid network that is capable of both connecting to and disconnecting from the macro grid so as to form a micro grid, a nano grid, a pico grid, a fento grid, and the like, such as where, in certain embodiments, the sub-grid network is capable of storing energy from the macro grid, or from another power supply source, so as to later supply that energy from its energy store to the sub-grid as needed, e.g., without necessarily having to pull or supply additional energy from or to the macro grid. In such an instance, a micro grid may be formed such as where the micro grid may basically be comprised of a smaller version of the macro grid, such as where the micro grid is capable of sustaining itself and, therefore, may have a mix of one or more of a power generation source, e.g., a source of renewable power generation, an energy storage apparatus, a control mechanism, e.g., having a communications module, power inverter and/or converter, and/or a GPS and/or other sensor, and may include its own transmission lines.

Additionally, as needed, the micro grid may be operationally, e.g., substantially completely, removable from the associated macro grid, and may thus be self sustaining such that when reconnectably dissociated from the macro grid, the micro grid is capable of supplying the internal energy needs of its various networked components, e.g., supplying the energy needs of the networked communities and/or facilities of a community, such as when the macro-grid is unavailable. In a manner such as this, the suitably configured micro grid may be replaceably islanded from the macro grid, such as by being able to removably associate and disassociate from the macro grid and/or having an internal energy supply that does not need to be constantly drawing energy from the macro grid, such as by having an alternative non-macro grid tied power supply source and/or distributed energy storage source.

For instance, a smart micro grid may be configured for controllably supplying energy to a set of communities or facilities within a community, and in various instances, may have one or more, e.g., a plurality, of smart energy storage units that are distributed throughout the community and networked together and configured to supply energy to the micro grid and it's component parts in a manner controllable by a user, so as to determine what parts of the micro grid will be supplying and/or what parts will be withdrawing energy to and from the grid and at what time and for how long, etc.

Further, where a micro grid may service a group of communities or facilities within a community, it may at times be desirable to island an entire community or facility individually from the macro and/or micro grid itself. In such an instance, a nano grid may be formed such as where the nano grid may have its own control mechanism and/or power supply, such as a source of power generation or storage, and may therefore be capable of supplying its own energy needs, e.g., for the community and/or facility, for an amount of time, such as when the macro grid may be shut down, and the micro grid may not be capable of supplying enough energy to the entire community and/or collective of facilities. In such an instance, as needed, the nano grid may be operationally, e.g., substantially completely, removable from the associated macro and/or micro grid, and may thus be self sustaining such that when removably associated and dissociated from the macro and/or micro grid, the nano grid is capable of supplying the energy needs of its various networked components, e.g., the various facilities of the community and/or larger portions of the facility, such as when the macro-grid and/or micro grids are unavailable.

In a manner such as this, the suitably configured nano grid may be replaceably islanded from the macro and/or micro grid, such as by being able to associate and be disassociated from the larger grid and/or by having an internal energy supply that does not need to be constantly drawing energy from or supplying energy to the larger grid, such as by having an alternative, non-micro grid tied power supply source and/or distributed energy storage source. For instance, a smart nano grid may be configured for controllably supplying energy to a particular community or a particular facility within a community, and in various instances, may have one or more, e.g., a plurality, of smart energy storage units that are distributed throughout the community or facility and networked together and configured to supply energy to the nano grid and it's component parts, e.g., the actual facility or larger portions thereof, in a manner controllable by a user, so as to determine what parts of the nano grid will be supplying and/or what parts will be withdrawing energy to and from the grid and at what time and for how long, etc.

Furthermore, where a nano grid may service an entire community or facility, it may at times be desirable to island one or more portions of the community or facility individually from the nano grid itself, such as by dividing the nano grid into separate serviceable sections, so as to form one or more pico grids. In such an instance, as needed, the pico grid may be operationally, e.g., substantially completely, removable from the associated nano, micro, and/or macro grid, and may thus be self sustaining such that when removably dissociated from the larger grid, the pico grid is capable of supplying the energy needs of its various networked components, e.g., the various rooms of the facility, such as when the larger grids are unavailable. In a manner such as this, the suitably configured pico grid may be replaceably islanded from the nano, micro, and/or macro grid, such as by being able to be associated and removably disassociated from the larger grid and/or by having an internal energy supply that does not need to be constantly drawing energy from or supplying energy to the larger grid, such as by having an alternative, non-nano grid tied power supply source or distributed energy storage source.

For instance, a smart pico grid may be configured for controllably supplying energy to a particular wing, e.g., a smaller portion of the facility or a particular room within the facility, and in various instances, may have one or more, e.g., a plurality, of smart energy storage units that are networked together and configured to supply energy to the pico grid and it's component parts, e.g., the rooms of a house, in a manner controllable by a user, so as to determine what parts of the pico grid will be supplying and/or what parts will be withdrawing energy to and from the grid and at what time and for how long, etc.

Further still, where a pico grid may service an entire wing or room of a facility, it may at times be desirable to island one or more portions of the facility or room individually from the pico grid itself, such as by providing an energy storage unit and/or cell within the actual energy drawing appliance being serviced by the pico grid, so as to form one or more fento grids. In such an instance, as needed, the fento grid may be operationally, e.g., substantially completely, removable from the associated pico, nano, micro, and/or macro grid, and may thus be self sustaining such that when removably dissociated from the larger grid, the fento grid is capable of supplying the energy needs of its various networked components, e.g., its associated appliance, or portions thereof, such as when the larger grids are unavailable. In a manner such as this, the suitably configured pico grid may be replaceably islanded from the nano, micro, and/or macro grid, such as by being able to be removably associated and/or disassociated from the larger grid and/or by having an internal energy supply that does not need to be constantly drawing energy from the larger grid, such as by having an alternative, non-nano grid tied power supply source or distributed energy storage source.

For instance, where a smart pico grid may be configured for controllably supplying energy to a particular wing, e.g., a set of rooms, or a particular room within a facility, e.g., a house, in various instances, the fento grid may be configured to supply energy to a particular appliance (or portion thereof) or set of appliances within a portion of the pico grid, e.g., within a particular room. Accordingly, in various instances, a fento grid may have one or more, e.g., a plurality, of smart energy storage units that are networked together and configured to supply energy to the fento grid and it's component parts, e.g., to various networked appliances, or portions thereof, within a room, in a manner controllable by a user, so as to determine what parts of the fento grid will be supplying and/or what parts will be withdrawing energy to and from the grid and at what time and for how long, etc.

Accordingly, as herein described, a stackable system of smart grid networks may be provided whereby one or more, e.g., all, of power generation, transmission, distribution, and/or energy storage may be controlled such as for grids as large as international super grids to grids as small as one or more smart fuel cells positioned in a single appliance or portion thereof. Hence, in certain embodiments, individual appliances can be hardwired with one or more smart rechargeable energy storage units, such as to form a fento grid, where the appliance, or group of appliances, may be configured for one or more of withdrawing energy from the grid, so as to store it within its energy storage cell(s); supplying energy to the grid, e.g., the pico, nano, micro, and/or macro grid, etc.; and supplying energy to the appliance, such as in instances where access to the larger grid by the appliance has been rendered inoperative, such as during times of larger grid shutdown. In such instances, when an internal circuit is configured, such as to form an internal fento, pico, nano, micro grid, and/or a macro, mega, or super grid, all of the smart energy storage units included therein may be used to supply energy to the particular grid network, including appliances, to which they are coupled, or generally to the larger network so as to be used by the collection of smart assets, including appliances, attached to the general network.

Accordingly, in a manner such as this, a community or a series of communities, a facility or a collection of facilities, a single room or a number of rooms, or one or more power using appliance(s) within a facility or room may be islanded and thereby separated from a connection with the larger, external, e.g., macro grid, and still be able to supply energy to its associated electronics. Hence, where a system is islanded, one or more, e.g., all, energy storage, including stand alone plug in smart energy storage units, as well as those contained within individual smart energy appliances can be controlled so as to contribute to supplying the overall facility electrical needs. This will allow a grid operator, e.g., a utility provider, user, or third party controller, to aggregate any and all sources of distributed storage, e.g., either direct plug in models and/or those included in the actual appliance, thereby allowing the whole network of energy storage units to act as one system, e.g., one huge energy reserve, and/or to separate critical loads so as to operate as individual fento, pico grids within the internal nano or micro grid, or as individual and or micro grids within the micro and mega and/or super grids.

In such instances, communication between the individual and/or collective of smart energy storage units may take place between them, such as on a local level, where individual systems communicate e.g., via WiFi, Bluetooth, Low Energy Bluetooth, Dash7, Zigbee, or even PLC, so as to create a local storage network that is capable of aggregating all storage and/or discharge into one system. Additionally, this networked communication system can have one coordinator that connects to and controls all of the individual energy storage units, and may further be connected to the internet, e.g., the world wide web, such as via cellular, WIFI, LAN connection, or the like. In such an instance, the coordinator, e.g., via the internet, may be configured to connect a secure cloud server (DRMS), which cloud server can further be connected to the Distributed Services Organization or other grid operator or third party may then control any and all of the interconnected storage units so as to control them individually or collectively such as with respect to charging and discharging.

Accordingly, as can be seen with respect to the above, the smart energy storage units disclosed herein are highly stackable, expandable, and configurable so to be able to form various different types of internal and/or external networks, such as to form one or more of a fento, a pico, a nano, a micro, a macro, a mega, and/or a super smart grid. Further, as each individual smart asset, e.g., smart energy storage unit, includes a control unit, the control unit may be configured to learn based on usage of each individual storage unit, e.g., with respect to times of charge and discharge, rate, time of day, and the like, and/or the collection of storage units, such as via the associated software and/or hardware, so as to better perform its function and/or functions, such as in concert. This modular design allows grid operators and/or end users, e.g., electricity customers, to build a networked system in small pieces. This will further help with determining the most effective system configuration prior to making large upfront investment therein.

Further, as grid operators and/or customers expand the network to include more and more smart assets, e.g., smart energy storage units, the system software can be configured to recognize the new units in the expanded network, and those units can be added into the collective networked system milieu, such as by asking the customer to opt in and thereby all the new units to be joined the grid. In a manner such as this, the networked grid can be built organically unit by unit and a system map of the distributed storage platform can be determined and/or otherwise implemented. In various instances, the hardware may also be configured so as to be physically stackable, such as in instances where multiple physical storage units are desired to be co-located.

For instance, the individual units can be configured so as to snap into place such as side to side, back to front, one on top of the other, such as like LEGOs®, so as to accommodate the dimensions of the available space in which the unit(s) will be positioned for use. In this modular manner, the user does not have to be stuck with a one "size fits all" model, but rather can configure the individual storage cells within the units, and the individual units within the system, as desired thereby making integration of storage easy, even in very compact spaces like individual appliances, cars, boats, garages, apartments, and the like.

Accordingly, in various instances, as appropriate, a micro, nano, pico, and/or fento grid may be a networked smart grid system that stabilizes the grid by enabling one or more of a community, a facility, e.g., a house or building, or a room thereof, or an appliance therein, to run even when a larger grid connection is unavailable, such as when the larger grid is shut-down or when for whatever reason the smaller grid has been replaceably islanded from the larger grid network. In such instances, the smaller grid network may include one or more of a smart power generation source, such as a renewable resource power generator, e.g., a source of photovoltaic or wind generated power, and/or a smart energy storage unit, wherein the smart power generator and/or smart energy storage unit may each or collectively have a control mechanism, e.g., power electronics, capable of controlling its operation and/or its connectivity with the larger grid, such that the power generator and/or storage unit may reversibly switch, e.g., automatically, between being connected and disconnected from the larger grid. In such a manner, energy can switchably be supplied to and/or withdrawn from the particular grid, e.g., on the distribution side, the consumer side, such as via a consumer side power generation source, and/or by the grid associated energy storage cells, as herein described, distributed throughout the distribution and/or consumer side of the grid, such that energy can controllably be supplied to the grid by a portion or all of the available networked power supply sources, and/or removed from the grid by being stored in a portion or all of the available networked energy storage cells and/or units of the particular grid. Alternatively, any sub portion of the grid may be replaceably islanded from the larger grid in a manner such that energy does not flow to or from one portion to the other portion of the grid, e.g., to or from a parent grid. In such an instance, any power supply, either by generation or via stored energy storage units, does not flow back on to the grid.

Accordingly, in a manner such as this, the legacy macro grid can be built up into mega and/or even super grid networks, broken down into micro grid networks, including nano, pico, or even fento grid networks, whereby the flow and/or storage of electricity can be closely monitored, finely tuned, and minutely regulated. More particularly, given the devices, systems, networks, and methods of using the same herein presented, the flow of electricity through one or more of these grid networks can be closely monitored as to usage from as wide as a nationwide or international scale to as small as a room by room or an appliance by appliance basis. From the widely distributed sources of energy storage, as herein presented, energy can be supplied to the grid, locally as needed by the DSO communicating with and activating the relevant control mechanisms of the networked and active storage units that is nearest to the needed event and instructing them to release a predetermined amount of stored energy in a manner such that the energy released closely matches the demand of energy needed thereby reducing transmission costs and stabilizing the grid.

A further advantage the proposed devices, systems, networks, and the methods of using the same, as herein presented, is that they can also be coupled to various different sources of renewable power generation so as to allow for the close monitoring, finely tuning, and minutely regulation of the flow of energy from these alternative sources of power production. Presently, the energy produced by solar and/or wind farms is typically being produced and released on to the grid substantially immediately after production in an intermittent and fluctuating manner. This is problematic because the legacy macro-grid was designed to deliver power consistently from source to use. Such grids can only run efficiently when the power being produced and supplied to the grid is stable, non-fluctuating, and predictable. As such, the legacy grid is unidirectional and cannot readily accommodate let alone control energy flowing from alternative power generation sources and/or flowing from the consumer side toward the distribution side of the grid. For instance, with the introduction of renewable energy, Utilities often need to actually stop the bidirectional flow of energy back onto the grid from these power generation sources at peak time energy use and generation due to the uncontrollable and inconsistent power coming from renewables. In many instances, these generators need to be taken offline entirely during peak time demand. The DSO currently has no way to monitor, account for, tune, or otherwise control the flow of electricity from these renewable sources of power generation. This is largely true for alternative power production on the commercial side as it is for on the consumer side.

More particularly, distributed energy production resources, e.g., DERs, such as rooftop solar and/or wind turbine generation on either the commercial and/or customer side of the meter has proven problematic for the legacy grid to handle. For instance, regardless of being on the commercial or consumer side of the grid, the grid operator currently does not have a way to track, direct, and/or otherwise control the electricity being produced and shoved back onto the grid from the side of renewable resource power production. As indicated, the traditional grid was not designed to accommodate a bidirectional flow of electricity. However, with the growing number of renewable resource power generation systems, such as being installed on the commercial and consumer side of the grid, ever increasing amounts of power is now being supplied to the grid from these sources, causing large, intermittent fluctuations, and wide scale grid destabilizations. A huge problem, therefore, with these set ups is that they do not place any control mechanisms for the Utilities to help manage these distributed assets. And will not allow for usage during blackouts or brownouts Hence, instead of helping to smooth out the supply curve by meeting demand and making the grid more stable, such power generation is actually destabilizing the grid. Such destabilization makes the grid unmanageable by DSOs' that other than price regulation lack proper controls beyond the meter to handle the fluctuations due to commercial and/or consumer side power production. This is due in part because the legacy grid does not allow for real time information related to alternative power production, e.g., on the consumer side, to be relayed to and from the grid, which is made even more problematic in view of the uptrend and adoption of commercial and consumer side generation.

However, the smart energy storage units and/or the smart energy control units disclosed herein can be coupled to these sources of power generation so as to give a user of the same the ability to closely monitor, finely tune, and minutely regulate the flow of electricity back on to the grid at a time, place, amount, rate, form, and quality determined by the user, such as a power generation controller, an electricity service provider, an electricity consumer, and/or a third party regulator or monitor. More particularly, given the devices, systems, networks, and methods of using the same herein presented, the bi-directional flow of electricity into and/or out of one or more of these grid networks can be established, closely monitored, regulated and controlled so as to obviated the destabilizations that often occur due to their intermittent production and fluctuating dumping of electricity on to the grid, for instance, as it is produced.

Accordingly, a unique feature of the smart devices, systems, networks, circuits, and methods disclosed herein is that they are configured such that they can be run off of any source of power generation, including solar, wind, hydroelectric, generator, or energy storage cell in addition to the traditional grid power, despite the fact that the legacy grid was designed to deliver stable energy from very linearly operating and predictable fossil fueled power plants to consumers. However, the smart energy storage units and/or the smart energy control units disclosed herein can allow for the bi-directional flow of energy throughout the grid and its component parts such that the energy flow may be monitored, controlled and/or maintained, for instance, during peak time demand and/or generation so as to reduce the loads thereof and thereby produce and/or maintain a very stable grid, without having to replace the current grid infrastructure. This will, in turn, help create better customer satisfaction and enables Distributed Services Organizations to increase the renewable energy production and stop unwanted bidirectional flow from DER's onto the grid when desired or needed.

The energy storage units herein provided are useful on the commercial side of the grid as well as on the consumer side of the grid. For example, large capacity, industrial sized energy storage units along with suitably configured control units, as described herein, may be provided so as to act as an interface between the grid and power production, e.g., from a traditional fossil fuel power generator and/or a renewable resource power generator. In such an instance, the power generated from these sources may be stored in one or more energy storage units that can then be called on by the grid operator as needed such as in a closely monitored, finely tuned, and easily controlled and regulated manner. Such energy storage has been proposed for the commercial side of the grid, such as for the use of centralized, large industrial batteries for the storage of excess energy produced by fossil fuel or renewable resource power generation, but has only been proposed to be implemented as a means for storing excess energy during times of over production which energy is to be immediately discharged completely to the grid in an uncontrollable, non-regulated manner, not allowing for the energy stored to be discharged at designated times, during a predetermined time period or event, at a predetermined amount of power, at a location, level, and in a character of which the grid can make use.

More particularly, in order to be efficient, these industrial scale batteries need to be able to quickly discharge the power stored therein to the grid and ultimately to the consumer as rapidly as possible to make room for the storage of newly generated energy. Unfortunately, the macro grid is simply not set up to be able to receive such amounts of stored power without becoming destabilized. Consequently, current battery configurations for these proposed uses are only designed and/or sized to be a rapid transfer mechanism, and are not configured for long-term or even mid-term storage solutions. Further, given the size of the batteries, e.g., the large amount of space they occupy, and their need to be located close to where the power to be stored is generated, they are not located where they would be most effective, such as close to where the consumer will actually use the stored energy. Hence, because they are not located where power is needed, they become even more highly inefficient as a result of the power lost over the transmission lines through which the generated power is transmitted from the production side through the distributor to the consumer side.

Despite these inefficiencies, by implementing the systems and methods herein disclosed, traditional power generators as well as the large scale, commercial photovoltaic panels, wind turbines, and/or hydroelectric generators can generate power at a time most suitable to their form of power generation, can store the generated power into one or more of the energy storage units disclosed herein that have been sized and located as best suited to the need for energy storage, and via the suitably configured control units, release that energy to the grid as needed, in a quantity, at a time, and over a duration that will allow the grid operator to make use of that energy as needed and in a manner that will not cause destabilizations to occur within the grid net work. For instance, the energy storage units herein disclosed may be constructed so as to be industrial sized, and can further be configured to store a large amount of energy at any given time, but may further be configured for releasing that energy in quantities small enough and in a manner sufficient to equalize times of energy generation, e.g., by a renewable resource (when the sun is up or it is windy out), with demand side use (which typically happens at different times from such renewable generation).

Further, with the addition of distributed renewable energy generation on the consumer side of the meter, such as via the widespread use of solar panels and/or wind turbines, it was hoped that access to such sources of alternative power generation would allow the consumer to be capable of removing themselves completely from the macro electric grid. However, having such power generation such as solar and/or wind power generators have not been capable of allowing the consumer to be self-sufficient. This is largely due to the fact that such sources of power generation have not been designed so as to direct the power they produce to the residence wherein they reside. Rather, the power they produce is simply shoved back on to the grid causing the meter to run backwards. Hence, instead of allowing the consumer to be able to remove themselves from the grid, all that they gain is simply an offset between what energy they have used and the energy they have produced, the best possible outcome being a net zero amount being owed to the electricity service provider, such as in instances where their power generation equals or exceeds their power consumption.

Additionally, local meter-side energy production creates other problems in that typically all of the excess energy produced on the consumer side of the meter by these DERs has to be pushed back on to the grid and stored thereon thus utilizing the grid as a large battery storage facility, yet the grid was never designed to function in this manner, and hence, the more power being pushed on to the grid by the consumer side of the meter, the more the grid becomes destabilized. The more DERs there are, the more consumer side power generated, the more problems faced by the legacy grid. Hence, in some areas, the Distributed Services Organization cannot accept any more generation, and thus have to refuse grid tied DER installation to customers that want to install them. In some instances, the DSO is even required to pay customers not to install one or more DER. The mechanisms and/or system disclosed herein, either on the commercial side or the consumer side of the meter allow the DSO to control the various distributed, grid tied DERs in a manner such that the grid can more fully accept and/or make use of such intermittently generated power and more finely control that use so as to equate access and utilization of such power with consumer side demand. In a manner such as this, the use of DERs can be implemented in a manner so as to make the grid smart such as by configuring the DER, associated energy storage units, and/or control units for the smae so as to operate in a fashion that can make use of the fluctuating highs and lows of renewable power generation in a manner that corresponds to the fluctuating usage of the consumer.

Accordingly, as discussed above, the traditional electrical network, e.g., the legacy grid, typically includes a centralized source of energy production and/or distribution that together function in a simple and linear manner. The apparatuses, systems, and methods of using the same, as herein provided, however, are configured to be able to transform the legacy grid into a smart grid that is much more resilient, non-linearly adaptable, interconnected, and interactive, while at the same time being simple to understand, easy to connect with, use, and secure, without substantially compromising the lifestyle of the user.

In its simplest form, provided herein are intelligent control units, and their associated hardware and software, that can be inserted into the current legacy grid in a variety of different manners so as to convert the unintelligent legacy grid into an intelligent smart grid, capable of finely controlling the flow characteristics of electricity throughout the grid system, such as with respect to the quality, quantity, rate, timing, direction, location, etc. of the flow of electricity. The control units, herein provided, may be configured so as to be coupled to any suitable grid asset so as to be able to both control the operation of that asset, and to communicate with other such assets having corresponding control units. In this manner, the unintelligent, legacy grid assets, such as the power generators, distribution servers, transmission and distribution lines, as well as the transformers and/or other components of the present grid architecture may be enabled to be intelligent and capable of communicating with one another in order so as to be controllable, e.g., individually and/or collectively, with respect to their operation, by one or more users, such as a user positioned at a centralized control facility, such as a Distributed Service Organization (DSO).

In such an instance, the control unit may include a central processing unit for running the internal system, a memory having one or more programs for running the system in accordance with one or more run profiles, a sensor and/or a monitor for sensing and/or monitoring a sensed condition, a communications module for sending and receiving data, e.g., user configurable instructions, a geo location device, e.g., a GPS, for determining the location of the asset, and a control mechanism capable of controlling the operation of the smart grid asset, such as in correspondence to one or more of the stored run profiles and/or received communication instructions.

For instance, where the smart asset is a source of power generation, a suitably coupled control unit may be configured for sensing one or more transmission grid related conditions, communicating the same to a centralized command center, receiving one or more commands in response to the transmitted communications of the sensed data, and further may be configured for changing the operational parameters of the power generator in correspondence with the operational change command instructions received from the centralized command center. For example, where the amount of energy being supplied to the grid is not sufficient to meet user demand, e.g., threatening a brown and/or a blackout condition, a command instruction may be delivered to the control unit, e.g., from a grid operator at a centralized energy production and/or management center, instructing the control unit to fire up its associated generator so as to bring more electricity on line.

Further, where too much energy is being produced above and beyond the current and/or predicted demand curves, thus requiring the energy to be discharged before destabilization of the grid occurs, thereby being wasted, the grid operator may instruct the control unit of the smart generator to cool down and take the generator off line, thereby ameliorating such waste. Likewise, where the smart asset is a distribution server, a suitably coupled control unit may be configured for sensing one or more distribution grid related conditions, communicating the same to a centralized command center, receiving one or more commands in response to the transmitted communications of the sensed data, and further may be configured for changing the operational parameters of the distribution server in correspondence with the operational change command instructions received from the centralized command center. In these manners, a centralized controller can modulate grid transmissions by ramping up or ramping down grid assets and/or by bringing more assets online or taking more assets offline.

Such changes to the control paradigms of the electronically coupled smart assets can be made remotely to the systems being controlled such as by accessing a cloud based smart asset management system (SAMS). In such a system, the control unit of each individual smart asset may be configured to include a communications module that provides a wired or wireless connection to a network allowing access, e.g., cloud or cellular based access, to the centralized smart asset management system. For instance, one or more, e.g., each, of the smart assets herein described can be networked together, in any suitable manner, and may further be in communication with an "energy cloud", through which communications, information, and/or command instructions may flow bi-directionally, such as where the one or more smart grid assets sends information pertaining to the status of its operations and/or quality and/or amount of grid power flow generally, and in response thereto receives information about the status of the system and/or its component parts along with command instructions from the SAMS directing the smart asset in the performance of its operations.

Accordingly, a controller, such as a grid operator, service provider, electricity consumer, or third party regulator or monitor may be capable of accessing, e.g., via the cloud or suitable cellular interface, the centralized SAMS, and through this interface, e.g., the cloud based command center interface, the controller will be able to access relevant grid operation status data and in response thereto may remotely control the run parameters of one or more of the widely distributed smart assets so as to modulate and control their functioning, and thereby to largely control the generation and/or flow of electricity and its characteristics across the grid.

A problem however revolves around the fact that even though the smart control units disclosed herein are capable of both being operationally coupled with and controlling the legacy grid assets as well as communicating with one another, e.g., via the cloud or cellular network, so as to thereby be controlled, such as by a centrally located, remote controller, e.g., a grid operator; the archaic infrastructure of the legacy grid, such as with respect to its power generators, peaker plants, and outdated transmission and distribution lines, not to mention the decaying and overloaded transformers, is simply not capable of being controlled in a manner that is agile enough to respond rapidly to the intermittent and fluctuating demands of the fickle consumer.

As such, simply providing a universal communications, centralized data processing, and operational command center, does not fully alleviate the problems with the legacy grid nor provide the fine tuned control the system actually needs if it is to be run efficiently, without destabilization, and without inconveniencing the consumer's daily routines. What is further needed, therefore, is a nimble system for providing or withdrawing more precise amounts of energy in smaller packets, e.g., more finely tuned quantums of energy, quickly to or from the grid, more accurately located to the area of increased or decreased need, so as to be better able to swiftly and precisely match the energy supply curve to the energy demand curve in a manner that is more exactly targeted to where that energy is needed so as to thereby rapidly stabilize the grid, thus, obviating the threat of brown and/or black out conditions.

Consequently, provided herein are smart energy storage units that can be networked together and distributed widely across the grid, which units can be configured for being controlled individually and/or collectively so as to quickly and quantifiably supply energy to the grid, such as at times of increased need, e.g., times of peak energy demand, and remove energy from the grid, such as at times of overproduction or decreased demand. As described in great detail herein, the smart energy storage units include a control unit having a communications module and a control mechanism whereby the individual storage units may be controlled, such as remotely, by receiving command instructions from a centralized smart asset management system networked therewith, e.g., via the cloud or cellular network, so as to independently or collectively be charged or discharged as needed to stabilize the grid. Further, because each energy storage unit and/or each storage cell therein has a known storage capacity and may have a position location identifier, e.g., GPS, the SAMS may be capable of instructing each individual storage cell of each individual unit, e.g., individually or collectively, to release or withdraw a more precise amount of energy to or from the grid at a position determined to be close to where the positive or negative energy spike is occurring so as to more immediately stabilize the grid.

Hence, presented herein, in various embodiments are networked, distributed energy storage systems (NDESS) comprising individual smart energy storage units that are capable of being interconnected with each other and/or the electrical grid, such as on the service and/or consumer side of the meter, in a manner to provide grid energy storage and supply that may be distributed widely and positioned all over the grid, such as at each particular end users location. Each smart energy storage unit may be configured so as to easily connect to the grid, such as via a standard electrical outlet, and/or may be connected directly into the grid such as by being wired into the electricity control panel and/or meter. Further, each storage unit may include high bandwidth, wireless network and/or cellular capabilities so as to be able to communicate with one another and/or with a centralized smart asset management system (SAMS) and/or a controller(s) thereof, and/or with other remote networked device(s), such as via the cloud and/or via cellular communication technology.

For instance, in various instances, the DSO, Distributed Service Organizations, electricity consumer, and/or third party may connect with the smart energy unit; and the smart energy unit may connect with the DSO, consumer, third party, and/or other networked smart energy devices to effectively coordinate energy storage and supply. More particularly, the DSO, electricity consumer, and/or third party may employ their computing technology of choice, e.g., their mobile, handheld or desktop computer, such as their mobile smart phone, tablet, and/or laptop computing device, so as to connect with and configure the smart energy storage unit. Likewise, the smart energy unit may wirelessly connect with other networked smart energy units, such as in local proximity there with, e.g., by issuing a coded pulse on the electrical circuit and measuring the time for a responses so as to determine relative distance, and in a manner such as this, the smart units within a defined local proximity of one another may be defined and may communicate with each other, and/or a central controller, e.g., via a cloud based or cellular network system, so as to coordinate their activities.

Accordingly, in various embodiments, the smart energy storage unit may be self-contained and may include a smart networking capability so as to enable rapid storage and deployment of energy, such as by withdrawing energy from the grid automatically and/or upon command, e.g., upon command from the local Utility companies (sometimes referred to herein as Distributed Service Organizations or DSO), electricity user, or third party, so as to generate a reserve of stored energy; which store of energy the Utility or other end user may readily access, aggregate, and deploy so as to supply energy to the grid so as to thereby stabilize the grid during times of risked instability. More particularly, in various embodiments, the smart energy storage units may be operated by one or both of the DSO (or other third party) or the direct electricity consumer, e.g., homeowner, office manager, business owner, or the like, such that either party may have the ability to level the electric load (peak shaving) and reduce the overall electric bill, while providing significant local energy stability and security, such as during times of grid disruption.

In general, each energy storage unit may include one or more energy storage cells, wherein each energy storage cell contains a storage media capable of receiving the energy within an electrical current, e.g., a DC current, and storing it, such as in a chemical form. As the number of cells included within the storage unit may differ, the amount of energy capable of being stored within and provided by the storage unit may vary, such as in accordance with user needs, for instance, so as to provide from one or two to several gigawatt-hours of energy storage.

However, in various particular embodiments, a typical energy storage unit, such as those to be deployed on the consumer side of the grid, may include two, or four, or six, or eight, or ten or more energy storage cells, which storage cells may be configured to include an energy storage medium, such as Zinc Manganese Oxide (ZMO), so as to provide a total nominal capacity of about one or two or about ten or fifteen, or about twenty or twenty five or about fifty or one-hundred, or about two-hundred or three hundred, or even about five hundred or a thousand or more kilowatts per hour of use. For instance, in some particular embodiments, the size, shape, and number of smart energy storage cells to be included within the unit are sized so as to give the unit a storage capacity of about 2 or about 2.2 kWh, 5 kWh, 10 kWh, 20 kWh, 25 kWh, 50 kWH, 100 kWh, 500 kWh, 1,000 kWh, or any combination thereof and/or there between. For instance, in various instances, the smart energy units may be capable of being interconnected, e.g., stacked together, so as to function in concert as one complete unit. Such interconnection can be physically, such as by plugging one unit into the other so as to provide a combined storage capacity, and/or it can be electronically, such as by being wired or connected such as through a cellular, wife, or web based network. In various instances, each smart unit may be configured so as to have a nominal voltage of about 1 to about 10 VDC, such as about 24 or 25 VDC to about 50 to about 100 VDC, for instance, about 200 or about 300 VDC to about 400 or about 500 VDC, or more. It is to be noted that although ZMO is referenced herein as an exemplary storage medium, other suitable storage mediums may also be employed such as Lithium Ion, Nickel Metal Hydride, and the like. Hence, in various instances, the smart energy storage unit may include and/or be configured as a ZMO battery, lead-acid battery, Lithium Ion battery, Nickel Metal Hydride battery, and/or other energy storage technologies may be used, such as fuel cells.

Further, as indicated above, each smart energy unit, and/or the energy storage cells thereof, may include a control unit, including a system control mechanism, which system control mechanism may further include or be operably connected with a smart cell management system, e.g., a battery management system, collectively: SC/BMS, which system may be configured to measure and report the charge status and other critical parameters for each energy storage cell and/or the unit as a whole, and may further direct the charging and discharging of the cells of the storage unit.

For instance, the SC/BMS may be designed and configured so as to provide both overarching and fine detail direction to the other components of the system both within and without of the energy storage unit(s). In various instances, the one or more system components may include one or more displays or other user communication interface(s), whereby the user can interact with the SC/BMS, and the SC/BMS may present the user with various operational control options, such as via a graphical user interface. For example, the energy storage unit may include a sensor and/or monitor capable of sensing and/or monitoring one or more conditions in the system, and may be configured for communicating the one or more conditions to the BMS. The BMS, in turn, may be configured for receiving the data communicated by the sensor and/or monitor, and or other associated data, including user input data, and may be configured for compiling and processing that data, and then presenting that data to a user, such as in one or more menu options and/or system updates, and/or warnings or alerts. Accordingly, the energy storage unit may include a communications module that includes a user interface, such as for the inputting and/or displaying of data, which inputting of data may be through a keyboard, a mouse, a touch screen, or via an operable connection with another control device, and the BMS may include information processing capabilities so as to process the input data and/or to change the operations of the system in response thereto.

More particularly, the SC/BMS can be coupled with a sensor and/or monitor system such that the sensor and/or monitor may sense and/or monitor one or more system condition parameters and communicate the same back the BMS. For example, the sensor and/or monitor may be configured for monitoring the voltage level within each of the individual energy storage cells of the energy storage unit, which may be indicative of charge level, as well as monitoring for cell temperature, current level, and flow direction (which may be indicative of charging and discharging and/or the rate and volume associated therewith). Additionally, the monitor and/or sensor may be configured for sensing and monitoring key performance and reliability metrics within each module, and may further be configured for communicating the same to the SC/BMS, such as for maximizing module life and providing a warning of degraded operations so as to inform the user of potential maintenance requirements.

In various embodiments, the BMS may typically be configured so as to interface with two sets of users, such as through being coupled with internal wired or wireless networking capabilities. For instance, in a first instance, the BMS may be configured so as to communicate, e.g., through an appropriately configured communications module, with the applicable DSO, and in a second instance, the BMS may be configured so as to communicate with the immediate electricity consumer housing the energy storage unit.

In such instances, the Distributed Services Organization may communicate with one or the entire network of energy storage units and/or the storage cells thereof, so as to monitor, aggregate, and/or control the massive distributed energy storage supply represented by the grid-wide deployed smart energy storage units, e.g., collectively and/or individually. For example, the DSO may access the proprietary smart asset management system (SAMS) control system, such as via the cloud or via a cellular network, which control system may then be configured by the DSO for controlling each individual energy storage cell within each energy storage unit, both individually and collectively, such as with respect to the charging and/or discharging of the individual storage cells within the individual storage units, either collectively or sequentially, as determined by the Distributed Services Organization. Accordingly, in a manner such as this, the DSO is capable of directing which energy storage cell and/or units are to withdraw energy from the grid and store it, such as for later use; and which energy storage cell and units are going to discharge and thereby supply energy to the grid, such as for immediate, e.g., local use, as well as directing when and where the charging and/or discharging will occur along with the rate and quantity of the same.

In other instances, the individual user may communicate with a single unit and/or with a plurality of units that have been networked and configured into a system, such as into a sub-grid network of energy storage units, so as to monitor, aggregate, and/or control the distributed energy storage supply represented by the one or more deployed smart energy storage units of the sub-grid. For example, the user may access the proprietary smart asset management system (SAMS) control system, such as via the cloud or via a cellular network, which control system may then be configured by the user for controlling each individual energy storage cell within each energy storage unit, both individually and collectively, such as with respect to the charging and/or discharging of the individual storage cells within the individual storage units, either collectively or sequentially, as determined by the user. Accordingly, in a manner such as this, the user is capable of directing which energy storage cell and/or units are to withdraw energy from the grid and store it, such as for later use; and which energy storage cell and units are going to discharge and thereby supply energy to the grid, such as for immediate, e.g., local use, as well as directing when and where the charging and/or discharging will occur along with the rate and quantity of the same.

Additionally, with respect to the individual user control functionalities, the individual user may instruct the BMS as to one or more of their personal status updates, so as to inform the unit of their individual power requirements, such as by informing the control units that they will need less energy over a given time period, e.g., "they are going on vacation;" or that they will need more energy over a given time period, e.g., "they are having a party on a given date," and the like. Such information can be communicated to the DSO and will enable greater use of the local storage capacity for grid stabilization, such as while the user is away and not in need of using the system; and further would prioritize more capacity to local use to ensure there is energy availability, such as during the times of increased need, such as during an event important to the consumer. As indicated above, the user may interface with the BMS through a communications module, such as where the communications module includes a wireless or cellular based interface, thereby allowing the user to configure the system via a smart devices e.g. smart phone, tablet computer, laptop computer, or the like.

Further, while the Distributed Services Organization may be given overarching control of the networked, e.g., far ranging and/or local, energy storage units; in various other instances, the individual consumer may also have the ability to configure the smart energy unit's operational parameters, such as with respect to charging and/or discharging, such as by choosing to "opt out" of the macro grid and/or by islanding their associated unit or system of units from the macro grid, and configuring the same so as to supply energy internally, e.g., to only supply energy internally, such as to an internal micro, nano, pico, and/or fento grid, and/or may further configure the unit, or system of units, to not supply energy externally of said grids, such as to not supply energy to a more wide spread macro grid.

Accordingly, as indicated herein, some unique features of the energy storage units disclosed herein are not only their ease of installation, such as in some instances by simply plugging them into an electrical outlet; but also their ability to be connected and disconnected from the grid with ease. More particularly, a unique feature of the energy storage units disclosed herein is that they may be inserted into or otherwise coupled with a larger grid, such as a macro gird servicing a community and/or facility, may be networked together, and may collectively be configured to remove the associated community and/or facility, or portions thereof, from the larger, macro grid network.

Specifically, as described in greater detail herein below, the smart energy storage units herein disclosed may be distributed throughout one or more appliances, one or more rooms, one or more portions of one or more facilities of one or more communities, and can then be inserted into the grid, and networked together in such a manner that once charged, the network of distributed energy units can be configured and deployed in such a manner so as to completely remove, e.g., island, that appliance or group of appliances, the room or group of rooms, the facility or group of facilities, the community or group of communities completely from the grid, so as to form one or more of a smart fento grid, a smart pico grid, a smart nano grid, and/or a smart micro grid respectively, where the interconnection of the smaller islanded sub-grid with the larger grid may be easily switched between being connected therewith and being disconnected therefrom.

In such a manner, the distributed storage units may be configured so as to supply energy to the immediate grid with which they are coupled, and may further be configured to not supply energy to the larger grid or networks of grids, such as in a reversible fashion. Hence, in various embodiments, the various, e.g., collective, of smart control units may be configured to individually and/or collectively be switched from being associated with the larger grid, e.g., the larger macro grid, so as to receive energy therefrom and/or to supply energy thereto, and may be configured for being disassociated therefrom, so as to not receive energy therefrom or supply energy thereto, as needed and/or desired.

Accordingly, depending on the configuration of the units as well as the configuration of their respective control mechanisms, there are several levels of islanding capabilities of the systems disclosed herein. For example, in one such instance, one or more single units may be isolated, and in other instances, an entire circuit or collection of circuits containing a plurality of energy storage units may be isolated. More particularly, where a single unit isolation configuration is desired, such an isolation may be effectuated by simply eliminating the flow of electricity through the electric plug of the isolated unit(s), such as upon sensing that the grid is unstable, e.g., by flipping an electronic and/or physical gating source switch.

In such an instance, whether islanded or not, the energy storage unit may provide power to the local circuit with which it is connected, thereby supplying power to any and all appliances coupled with the circuit, and/or a user may directly plug one or more appliances to be run off the energy storage unit directly into the unit. Hence, in various instances, the unit itself can be used directly to supply electricity to one or more appliances that are coupled therewith, such as by the appliance being electrically coupled with the unit, such as by being "plugged" into it. For instance, the unit may include a receiving end of an electrical outlet, e.g., the female portion of a two or three pronged connector, a USB port, an HDMI port, an optical port, a receiving end of a multi pin connector, a receiving end of a lightning port, an SD I/O port, and/or other associated input port that is configured for conveying data and/or stored energy from the storage cells of the unit to the device with which the unit is connected.

Typically, the transference of electricity from the smart energy storage device will be via a wired connection, but in some instances, the transfer of energy may be configured so as to be wireless, such as through induction. In such an instance, the energy storage unit may include an appropriate inductive coil, and/or other antenna, and/or control circuitry for producing an inductive charge that can be used to charge and/or supply energy to a suitably configured appliance, e.g., having a corresponding inductive coil, power transfer interface, and control circuitry therein.

Additionally, in various instances, the one or more energy storage units may include an electricity transfer interface that will allow the unit to be charged either from the grid itself, or to be charged on the consumer side of the grid, such as from a non-grid tied energy generation source. For instance, in certain embodiments, the energy storage unit may be charged by being coupled to an auxiliary power generator and/or a source of renewable power generation, such as a photovoltaic panel and/or a wind turbine, or the like. In such a manner, the smart storage unit(s) may be charged directly by being electrically coupled to the independent source of power generation, such as in a manner that is not tied to the grid. Further, as indicated above, this power transfer from the source of generation to the energy storage unit is typically performed through a wired configuration, but may at times be done wirelessly, such as where the energy storage unit may include an appropriate inductive coil, and/or other antenna or receiver, and/or control circuitry for receiving an inductive charge that can be used to charge and/or supply energy to the one or more energy storage cells electrically coupled therein. In such an instance, the control system of the smart unit may be configured in such a manner that the inductive charging is performed in accordance with the appropriate interface standard, such as one or more of WPC "Qi", A4WP, PMA, WiPower, Near Field Communication, and the like.

As indicated above, in various instances, an entire circuit or collection of circuits, e.g., containing a plurality of energy storage units, may be isolated, e.g., collectively. More particularly, where one or more entire circuits or energy storage units are desired to be islanded, such isolation may be performed by inserting a suitably configured control mechanism, as disclosed herein, directly into the grid, such as on the service and/or consumer side of the meter. For instance, a networked power coordination unit may be provided and physically connected to the residential or commercial power distribution box. In such an instance, the networked power coordination unit may be configured and positioned so as to interconnect between the grid feed line and the master switch on the distribution panel, so as to provide a single islanding point, to measure, and/or to control grid connectivity and thereby control flows from and back into the grid.

Accordingly, where the islanding of one or more circuits within a sub-portion of a larger grid circuit is desired, the networked power coordination unit may be provided so as to electrically and/or or operationally be connected with the larger grid network at a position that will enable the sub-portion of the grid to be islanded from the larger grid portion, such as via operation of the networked power coordination unit, and thereby to create an isolated sub-grid network, such as an islanded micro, nano, pico, and/or islanded fento grid. Hence, in various embodiments, the present disclosure is directed to a networked power coordination unit that can be configured to be coupled to a grid network so as to effectively create an islanded sub-portion thereof and consequently to create a smaller grid system such as a micro, a nano, a pico, and/or a fento grid system that may be operational within the larger grid network, e.g., the macro grid, regardless of being operably connected therewith or not.

More specifically, the control circuitry of the networked power coordination unit may be configured so as to control, dynamically allocate, and/or isolate or join the individual circuits within a sub-grid, e.g., a micro, nano, pico, and/or fento grid (e.g., at residence, office building, and/or a portion thereof) to form and prioritize the sub-grid, and/or its component parts, so as to more effectively organize and use the smart grid assets, such as the distributed energy storage units disclosed herein. Specifically, in various instances, the networked power coordination unit may be configured so as to control, at least in part, the created sub-portion of the network, e.g., to at least partly control and enable the operations of the created micro, nano, pico, and/or fento grid systems, whether or not they have been completely islanded from the larger grid network.

Additionally, in various instances, the networked power coordination unit can be coupled to a consumer side source of power generation, such as at the grid side interface, so as to control and direct the supply of power from the consumer side source of power generation, such as for instance externally to the larger macro grid or internally such as to a local micro, nano, pico, and/or fento grid. In such a manner, the networked power coordination unit can be configured as the grid interconnection for local renewable energy, so as to best capture a larger portion, e.g., all, of the renewable power generated, minimize or eliminate backward power flows and/or leakage, and ensure that local generation is employed and used to power a localized sub-grid, such as an islanded sub grid, such as whenever the macro grid in disrupted.

For example, the source of local and/or consumer side renewable energy generation, whether rooftop solar, wind turbines, fuel cells, or other generator types, may be electrically and/or operably connected, e.g., directly, with the networked power coordination unit in such a manner so as to enable the control unit to convert these inputs into high quality AC at the appropriate voltage, in accordance with the methods and systems disclosed herein with reference to control units generally, so as to controllably convert and/or supply the generated energy to the grid, such as upon command of the grid operator, electricity service provider, electricity consumer and/or a third party. Alternatively, the control unit may direct the locally generated power into a sub-network circuit so as to supply power to one or more smart grid assets associated and/or networked with the sub-grid circuit.

More particularly, the networked power coordination unit interface can control the amount of energy, if any, to be pushed back on to the grid, such as when the consumer side power generator produces too much power to be used by the consumer and/or locally networked community. Thus, in such a manner, any excess energy produced above the current load demand, may be directed back on to the grid, such as by and through the networked power coordination unit. Further, in accordance with all of the control units disclosed herein, the networked power coordination unit may be configured to have full network communication capability, as disclosed herein, and may be configured to sense, monitor, and report usage, storage, and local power generation to the user, e.g., DSO, consumer, or third party, and/or to receive information and direction from the DSO to best utilize its distributed energy resources, e.g., the smart power generators and/or associated smart energy storage and/or control units associated therewith.

In various instances, individual unit and/or circuit isolation may take place intentionally, such as at the command of the grid operator, electricity service provider, consumer, or third party. In other instances, such isolation may take place automatically, such as where the system senses a perceived threat to the power supply and makes an operational adjustment so as to automatically island the individual unit(s) and/or a circuit including the same, such as in an automatic response to macro or larger sub grid outage. The effectuation of such isolating may take place in any suitable manner, such as when a single or circuit isolation protocol intentionally "pops" the circuit breaker so as to thereby intentionally island the individual energy storage unit(s) and/or one or more circuits including the same. In such an instance, once islanded, the power needs required to service the appliances serviced by the units and/or the islanded circuits containing such units will then be supplied by the actual units themselves and not from a connection with the larger grid network. Hence, in such an instances, energy supplied to the circuit will be from its associated and/or networked smart energy storage unit(s).

More particularly, there is a plurality of ways that a smart energy storage unit and/or a control unit thereof, e.g., a networked power coordination unit, may be configured to recognize a grid power failure and thereby initiate an automatic or directed circuit isolation. For example, information pertaining to a threat to the power supply, e.g., a power outage warning, may be transmitted, e.g., from the DSO or other party monitor, such as via the wireless cellular network, and/or such information may be sensed directly by the control unit of the smart energy storage unit. For instance, the control unit may include a sensor and/or monitor that is configured so as to be able to sense and/or monitor various of the characteristics of power transmission throughout the grid. Hence, in certain embodiments, automatic grid isolation may occur such as by the suitably configured sensor, sensing that grid power transmission is at its voltage and/or frequency limits. In such an instance, the control unit may initiate a protocol designed to isolate the storage unit(s) and/or one or more circuits including the same.

More specifically, as described in greater detail herein below, in various instances, the control unit may include or otherwise be coupled with a Grid-Flexible Inverter (GFI). In such an instance, the GFI may be configured to isolate the storage unit(s) and/or circuits including the same, in any suitable manner, such as by applying an output current, e.g., to the consumer side control panel, that is greater than the combined circuit load on the relevant circuit to be isolated, and/or above the circuit breaker rated current protection, such as for a duration longer than the circuit breaker time constant, so as to trip the circuit breaker and thereby island the circuit and/or the associated smart energy storage unit(s) associated therewith. In such an instance, the associated energy storage units may be de-coupled from the grid and activated to supply energy to the islanded circuit and/or devices, such as the devices associated with the relevant circuit, so as to meet the normal load supply from its contained energy storage cells thereby satisfying the existing load on the circuit.

Accordingly, in various instances, the smart energy storage units may include a Grid-Flexible Converter (GFC), or other form of converter, inverter, and/or rectifier. More particularly, a unique feature of direct current (DC) is that it does not typically travel efficiently over small to mid range distances, but may travel much more efficiently such as over long to very long range distances, such as through the transmission and/or distribution lines that connect the source of power generation with the ultimate location of energy use. Accordingly, in order to transmit electricity over short to mid range distances, the current is typically transmitted as alternating current (AC), and in order to transmit electricity over long to very long range distances, the current is typically transmitted as direct current (DC).

So being, the electricity to be stored by one or more of the energy storage units herein disclosed is often received as a form of alternating current, but in some instances may be received as direct current, such as if the transmission distance is long. However, in order to be stored by the energy storage cells of the energy storage units, it is necessary to convert the AC to DC, such as prior to storage in the storage cells as chemical energy. The BMS, therefore, may include or otherwise be operably coupled with a converter, such as a Grid-Flexible Converter (GFC), such as a converter that is configured for converting AC power to DC power (such as for storage), and further capable of converting DC power to AC power (such as for supply), and/or the BMS may further include or otherwise be operably coupled with a inverter and/or rectifier. However, in particular instances, the BMS may include or otherwise be operably coupled with a dual converter such as the GFC disclosed herein.

Accordingly, in certain embodiments, a GFC may be provided such as where the GFI is configured to provide bidirectional AC to DC and/or DC to AC conversions. In various instances, the converter, inverter and/or rectifier can be configured so as to operate just as efficiently and effectively regardless of whether it is grid-tied or non gird-tied, and/or remote. Where the GFC is configured so as to be remote, it may further be configured to coordinate with one or more of the other storage units of the network and/or systems, such as within the same grid network. In such an instance, the GFC may be configured so as to better coordinate and/or synchronize the charging and discharging of the smart grid assets, such as with respect to stabilizing the electricity being provided to the gird, e.g., as AC electricity, and/or stabilizing the electricity being removed from the grid and/or converted to DC electricity for storage.

Accordingly, in various instances, depending on the set up of the associated storage units and/or individual storage cells therein, and/or the architecture of the smart energy unit network and/or architecture of the plurality of energy cell circuits within the unit, the electricity being received from the grid for storage within the smart energy storage cells, and/or the energy being withdrawn therefrom and pushed thereby on to the grid for supply, may need to be changed in one way or another, such as to be inverted and/or converted from one form to another.

For instance, in certain particular embodiments, where the energy storage unit is configured for withdrawing electricity from the grid, such as for storage as energy, such as where the electricity being transmitted through the grid is in the form of an alternating current (AC), and where the energy to be stored within the energy cells of the energy storage unit needs to be received thereby in the form of direct current (DC), so as to more efficiently convert the electrical energy into chemical energy, e.g., via the contained chemical media; the AC electricity may need to first be inverted, such as by associated inverter circuitry, e.g., via an appropriately configured inverter device, into DC, and may further need to be stepped up or down, such as by associated converter circuitry, e.g., via an appropriately configured converter device, to a voltage suitable for converting the DC power into stored energy, such as stored chemical energy. Additionally, where the energy storage unit is configured for supplying energy to the grid, such as for enhancing the available energy supply for the serviced grid network, such as where the energy being stored is in the form of chemical energy that is to be converted to DC electricity prior to being supplied to the grid, the stored chemical energy may be converted into DC electricity.

Further, once the stored chemical energy is converted into DC electricity, a suitably configured converter, as described above, may be employed so as to step the DC electricity up or down, such as from a first voltage to a second voltage, whereby when at the second voltage, a suitably configured inverter can invert the direct current, at the stepped up or down voltage, to alternating current at a third voltage, such as for supply of AC electricity to the grid. Further, if necessary or even desirable, the resultant voltage of AC may further be stepped up or down to a fourth voltage, such as by an additional suitably configured converter mechanism. Once the AC is configured so as to be at a compatible voltage for transmission to and through the associated electric grid, the energy storage unit may push or otherwise release that electricity back on to the grid, such as upon the request or command of a user, e.g., grid operator, electricity service provider, electricity consumer, or a third party.

Accordingly, a smart energy storage unit, as herein disclosed, may include one or more of an inverter and/or a converter, as described herein, which inverter and/or converter may be part of the electronic control circuitry of the control mechanism of the smart energy storage unit, or may be one or more separate devices that are operably and/or electrically coupled therewith. Hence, an inverter and/or converter may be included within the energy storage unit system architecture, in any suitable configuration, so as to modulate the form of energy being received, stored, and or released from the energy storage units or networked systems comprising the same.

In such a manner as this, electricity may be drawn from the grid in one form having a first set of one or more different characteristics, such as having one or more particular voltages, and may be inverted and/or converted into a second form having another set of one or more different characteristics, such as having one or more different voltages, and may be stored, such as within one or more of the energy storage units presented herein, in a third form, e.g., in a chemical form, having a third set of different characteristics. Likewise, electricity may be supplied to the grid from the one or more energy storage units, such as where the energy has been stored in one form having a first set of one or more different characteristics, such as is due to being stored chemically, and may be converted into a second form having another set of one or more different characteristics, such by having one voltage that is being converted into another voltage, and may further be inverted to a third form, such as prior to being released or pushed onto the grid as electricity, where in the third form as electricity, the energy may have a third set of different characteristics.

For example, where AC electricity has been converted to DC, and DC electricity has been converted to chemical energy, e.g., for storage, and where the stored chemical energy has been converted back to DC electricity, such as for supply, the DC electricity thus produced may be in one form, having a particular voltage, and the grid to which the stored energy is to be supplied may be configured to transmit electricity in another form, e.g., AC, having a different particular voltage. In such an instance, the DC electricity so produced, at its particular voltage, may need to have that voltage modified prior or subsequent to being inverted into AC which can then be supplied to the grid at the appropriate voltage.

More particularly, in order to be operational with a local gird, e.g., a local portion of the macro grid (or a larger or smaller portion thereof), so as to supply energy thereto, the smart energy storage unit may need to include an inverter so as to invert the stored energy to a form capable of being supplied to the electric grid for use. Consequently, where the stored energy to be released to the grid is converted from a chemical form into DC electricity, and where the grid to where the stored energy is to be released operates for the transmission of AC electricity, the produced DC electricity may need to be converted to AC electricity, such as by operation of a suitably configured inverter.

However, where the AC to be supplied to the grid is required to be at a certain voltage so as to be compatible with the AC electricity being transmitted through the local grid, the produced DC may have to be stepped up or down so as to be able to be converted from the stored DC voltage to AC electricity having the grid operable voltage. As described above, this may take place by first stepping up the voltage of the DC electricity to a designated voltage, e.g., via suitably configured converter, and then inverting the DC electricity at the stepped up voltage to AC electricity having the appropriate voltage, e.g., via a suitably configured inverter. Consequently, prior to inverting the DC to AC, the voltage of the DC electricity should be modulated such that when inverted to AC electricity the resulting AC is at the appropriate voltage.

As such, as herein described, the devices and systems of the disclosure may include a DC to DC converter so as to convert the stored DC energy in to a particular voltage so as to then be converted into AC electricity of a particular voltage, such as the AC voltage operated by the grid in question. For example, where the output conversion is 240 VAC, for example, about 400 VDC input would be required so as to be inverted to AC at the appropriate 240 AC voltage. In such an instance, a DC to DC conversion step may be employed to perform the proper conversion and inversion, and hence, in various embodiments, the energy storage units herein provided may include one or more DC to DC converters and/or one or more AC to DC or DC to AC inverters.

More particularly, as illustrated herein with respect to FIGS. 1A and 1B, two exemplary battery bus architectures are provided that may be employed in a manner sufficient to maximize operational efficiency, ensure safe operation and maintenance, and to satisfy the energy needs of the grid. In these instances, both have been configured so as to be in parallel circuits, although in other instances they may be in series, and consequently have been configured so as to prevent a malfunction of one or more energy storage cells from degrading the overall performance and capacity of the entire unit.

As exemplified in FIG. 1A the first circuit configuration (e.g., integrated energy cell-converter configuration) integrates a plurality of DC to DC converters within the energy storage units, such as by being coupled within each individual energy storage cell; and with respect to FIG. 1B, the second circuit configuration (e.g., single, integrated converter configuration) uses a single DC to DC converter for the entirety of the energy storage cells of the storage unit, which DC to DC converter is integrated into the DC to AC converter.

Accordingly, as can be seen with respect to FIG. 1A (e.g., the integrated energy cell-converter configuration) each energy storage cell has an integrated DC to DC converter that enables it to increase the DC voltage to the required control unit bus voltage, which allows all energy storage cells to be continuously connected, but charged independently. It is to be noted that although as illustrated each and every energy storage cell has a DC to DC converter associated therewith, in various embodiments, any sub portion thereof may or may not have a DC to DC converter coupled to it.

However, as can be seen with respect to FIG. 1B, for the single integrated converter configuration, the DC to DC conversion stage is integrated with the DC to AC converter for improved conversion efficiency and reduced component cost. Since each independent energy storage cell may be at a different voltage from the others, the control unit, e.g., BMS, may be configured so as to monitor all voltage levels and selectively connect or disconnect storage cells to optimize charging and discharging.

In various embodiments, the inverter may be a two-way conversion device configured for converting grid-tied electricity, such as single phase 120/240 VAC, into DC, such as for storage; and further, configured for converting stored energy, e.g., in DC form, back into 120/240 VAC, such as for being supplied back to the grid. In various instances, the BMS may include a separate converter that is configured for converting the stored energy back into AC at a predetermined voltage, e.g., at 120/240 VAC, for being supplied back to the grid. Additionally, in certain instances, if the grid connection is disrupted or the unit is islanded, the storage unit may be capable of producing 120/240 VAC, single phase using its own frequency reference to maintain high quality electricity.

Accordingly, the energy storage unit may include one or more power inverters and/or converters, e.g., one or more of AC to DC, DC to AC, and/or DC to DC inverters/converters. For instance, in one instance, the energy storage unit may include a DC to DC converter, such as where the DC to DC converter is integrated within each of the energy control systems of the individual energy storage cells within the storage unit, such as by being directly coupled therewith. In such an instance, one or more, e.g., all, of the energy storage cells may be connected, e.g., continuously connected, to the SC/BMS bus such that disparities in the individual states of charge may be sensed and accounted for, such as through appropriately configuring the individual DC to DC converters. Alternatively, in another instance, a DC to DC converter may be provided, where the DC to DC converter is in a single integrated converter configuration. In such an instance, the SC/BMS may be selectively connected with or disconnected from the individual energy storage cells, such as via operation of a gating feature within the control circuit, so as to equalize their states of charge.

As can be seen with respect to the above, the energy storage units as herein presented may be deployed individually or collectively to supply energy to a local or far reaching grid and may be connected so as to operate collectively, such as in a network and/or a system of energy storage units. However, as each storage unit may have a plurality of energy storage cells coupled therewith, the energy storage units themselves and/or the individual energy storage cells therein may be interconnected in several different configurations, such as in series or in parallel, dependent on the desired configuration of the serviced grid architecture and/or the architecture of the individual storage unit. For instance, the energy storage unit and the individual cells thereof may have any suitable architecture, however, in particular embodiments, the plurality of energy storage units, in combination, and/or the plurality of individual energy storage cells within the energy storage units, may be connected with one another electrically in series, such as where speed of energy transmission is desired, or in parallel, such as to ensure operability even if one or more modules of the system becomes inoperative.

Accordingly, in view of the above, in one aspect, the apparatuses, systems, and methods of their use as herein described are directed to the formation of one or more smart grids, such as a smart macro grid. As described in detail herein, two or more smart macro grids can be synchronized and/or layered together to form a smart mega grid, such as a nationwide smart mega grid. Further, two or more smart mega grids can be synchronized and layered together, such as by crossing international boundaries, so as to form a smart super grid, such as an international smart super grid. In such instances, the smart control units and/or the smart energy storage units herein described can be distributed widely throughout the grid networks and employed so as to control the flow of electricity through the grid in an intelligent manner.

Additionally, as described herein, various portions of the local macro grid can be broken down into sub-portions, such as smart sub-grids of decreasing size. For instance, the smart control units and/or smart energy storage units herein described may be distributed throughout one or more communities and/or one or more facilities, and can be networked together so as to function and/or be controlled synchronously so as to form a smart micro grid, nano grid, pico grid, and/or fento grid, whereby the energy being supplied to the grid is controllable via the smart control units, and where if desired, the entire sub-grid network may be removed or islanded from the larger grid, and may be powered exclusively by the distributed energy storage units therein.

In a manner such as this, the smart grids herein introduced are capable of handling the demands of fluctuating usage, such as those caused by increased energy demand peaks, at the same time as lowering the risk of the destabilizations that would typically occur due to the archaic infrastructure of the legacy grid trying to handle such increased demand. For instance, due to its archaic transmission and distribution lines as well as its outdated transformers, the legacy grid is under constant threat of being overloaded during times of peak demand. This threat is made even more significant given the problems associated with quickly spinning up peaker plant generators to try and meet enlarged energy needs. These conditions if not controlled can easily lead to brownout and blackout conditions. However, by the wide spread distribution of the energy storage units into the smart grids disclosed herein, these destabilizing risks to the legacy grid can be minimized such as by shifting peak time supply to time periods of non-peak time use. Additionally, the problems associated with low demand valleys may also be curtailed, such as by lessening the need for energy substations that sit idle in anticipation of the next energy peak.

More specifically, the smart control and energy storage units provided herein alleviate these concerns on all different grid levels, such as by providing energy control and management systems compatible on the national and/or international level down to the level of building management and/or individual appliance control. For instance, the smart control and/or energy storage units can be deployed throughout the grid so as to provide intelligence therefore and thereby make the associated grid smart.

For example, the smart energy storage unit may be deployed throughout the grid so as to store energy that can be released onto the grid at times of need. Further, the smart control unit can be coupled with the smart energy storage unit so as to control when the energy storage units charge, and thereby store energy and when they discharge and thereby supply energy to the grid. In a particular embodiment, smart energy storage devices may be distributed throughout an electrical network, and/or in conjunction with one or more appliances, so as to control and/or modulate the flow and/or storage of electricity throughout the network. And in such a manner as this, the distributed energy storage units can supply backup energy to a wide area grid such as a micro or macro grid or larger, and/or supply back up energy on a small scale grid, e.g., a fento grid, such as by being incorporated into an appliance such that the appliance may draw energy from the grid, but where needed can draw energy from its coupled smart energy storage unit. For example, in certain embodiments, smart energy storing appliances having a remotely controllable control unit may be provided, such as in an easy to use and/or cost effective configuration.

In such instances, the smart appliances may further be configured to not only control how and when the appliance receives power, so as to store excess energy, but can also be configured to return unused power to the grid, such as at times of peak use and/or before the next charging cycle. For instance, if the system has stored power remaining before the next cycle to charge the energy storage unit(s), the system may return the power to grid so it can be used elsewhere. In some areas, the user may even receive credit for the returned power, thereby reducing the user utility costs. Further, in areas where the power grid suffers from blackouts and brownouts, or is generally unreliable, the system of the present disclosure ensures adequate energy is available to power one or more circuits of a grid so as to run the one or more appliances.

More particularly, in addition to reducing the costs associated with appliance operation, the systems presented herein provide intelligent capabilities in the appliance system thereby allowing the appliance to communicate with a central control system, so as to provide a local user the ability and an interface, e.g., a graphical user interface, for programming and controlling the appliance, and further to provide a system that monitors the appliance and reports the current status and power levels of the appliance and/or its energy storage capacity to a user, such as a grid operator and/or the electricity consumer, or the like. More specifically, in various embodiments, a system can be provided that can be used with existing appliances to make the system even more cost effective for the user. In such manners as these, the local user of electricity may be given the tools they need to maximize their conservation efforts and lower their consumption of electricity thereby helping to lower the overall consumption by the community. Any suitable appliance may be made smart, as herein described, such as a refrigerator, dishwasher, washing machine, dryer, TV set-top box, audio-video equipment, emergency power supplies, generators, pool pumps, well pumps, recirculation pumps, and HVAC systems, and the like. Additionally, other appliances may be made smart only limited by their ability to connect power storage and control systems such as the systems disclosed herein.

An additional benefit of the apparatuses, systems, and methods presented herein is that the complex and ineffective pricing models introduced by the utilities so as to modify or change the behavioral use patterns of the consumer can be done away with. For instance, over the past several years, electricity service providers, e.g., utilities, have tried incentivizing consumers to conserve, but most of these programs have generated weak results. For example, some utilities charge more for power used during peak times and less during off-peak times. Hence, the current trend is to increase rates during high usage periods or penalize consumers with escalating rates depending on their total monthly usage. It is suspected that these most recent tactics have cost the utilities significantly without any appreciable gain, while the increased program complexities have caused utilities to question if the conservation efforts are really what are necessary to help stabilize the electrical grid. However, in view of the devices, systems, and methods of the present disclosure such pricing concepts like "Time of Use" pricing, "Dynamic Pricing," and/or "Demand Response" pricing can be abandoned, which in turn relieves the consumer from having to suffer the consequences of higher energy pricing and/or increased temperatures in their homes and businesses when they failed to acquiesce to the required behavioral changes. More particularly, the devices, systems, and/or methods of the present disclosure allows for the shifting of grid power usage to off-peak times when the cost of power is cheaper, thereby obviating the need for these complex pricing structures.

Further, as the smart grid devices, as herein disclosed, may include a truly grid tied monitoring system and intelligent display, the largely unworkable and superfluous in home displays and/or demand response thermostats previously introduced to the market can be discarded as well. Such devices are hard to use as they offer complicated deployment options and have yet to offer any significant long-term value. In contrast to this, the smart grid monitoring and control solutions provided herein will more truly enable the utilities to monitor overall load shifting of micro loads while supporting advanced Demand Response capabilities. For instance, the control mechanisms, software, hardware, and/or computer processing servers, herein disclosed, will enable utilities to shift peak demand to off-peak times, without inconveniencing consumers. More particularly, addressing distributed micro-loads in addition to the providing controllable, centralized large-scale storage, utilities will be able to gain a very predictable and stable grid.

Hence, the present solutions offer relatively affordable implementations that may be directed at shifting residential and/or commercial energy demand, e.g., on the consumer side of the grid, from peak times to off peak times, without substantial, negative impact on the consumer's time of use and/or comfort, all at the same time as simplifying energy management for the consumer and helping to achieve the utilities goals for a more stabilized smart grid. Further, in areas where the main source of power is alternative energy, such as solar, wind, hydroelectric, or the like, power may not be available during nighttime or times of no wind or flow. The devices, systems, and methods presented herein allows for the charging of the smart energy storage units when power is present, e.g., it is sunny, windy, and/or water is flowing, and then allows the power to be used at a later time, regardless of the presence of utility provided power. In such instances, the system can charge the storage units by way of a trickle charge, a normal charge, or a fast charge, depending on the amount of power available during the charging cycle. For instance, if the batteries need to be charged during peak times, the system may use a trickle charge to help reduce energy costs. However, during off-peak times, or when power is available from a local source, such as solar or wind, the system may use a normal charge or a fast charge. Hence, the charging and discharging of the smart units essentially provides a time-shifting function for the use of grid power.

Figure 2:
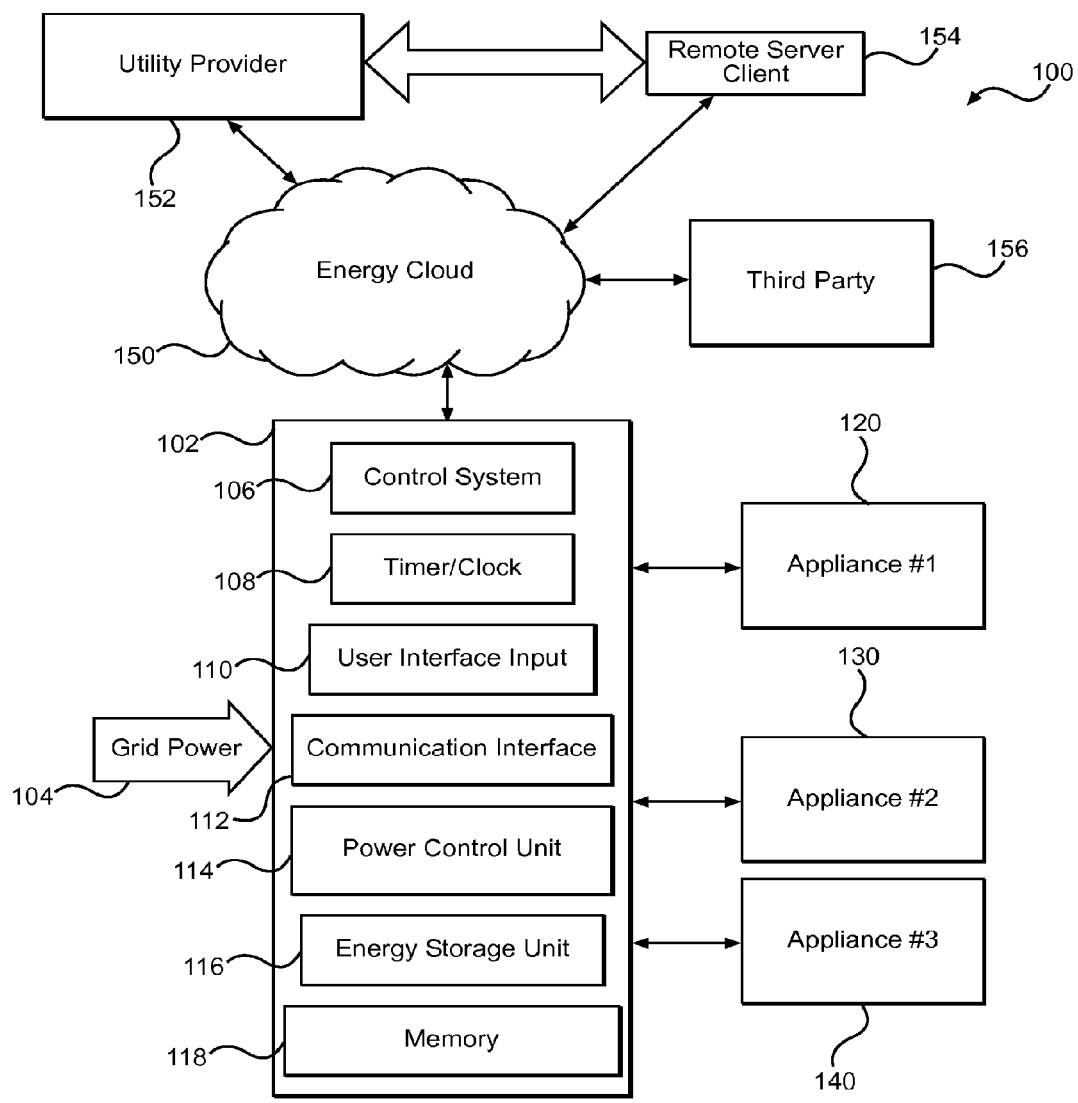
FIG. 2 is a block diagram of the system of the present invention showing the appliance control unit, appliances, the energy cloud, and other entities that may communicate with the energy cloud, such as a utility provider.

Referring now to FIG. 2, a system-level block diagram exemplifying an embodiment of the present disclosure is shown and generally designated 100. System 100 includes a smart energy storage unit 102 that receives grid power 104 from an electric grid. Grid power 104 can be supplied by traditional utilities, solar panels, wind turbines, hydro-electric generators, geothermal power, and any other suitable source of power generation.

The smart energy storage unit 102 is in communication with an energy cloud 150, which in turn is in communication with an electricity service provider 152, a remote server 154, and a third party 156.

The smart energy storage unit 102 may also be in communication with one or more electricity consumers, such as appliances 120, 130, and 140. Internally, smart energy storage unit 102 may include a smart energy control unit, where the smart energy control unit may include one or more of a control system, 106, a timer/clock 108, a user interface 110, such as a graphical user interface, a communications module having a communications interface 112, a power control unit 114, an energy storage cell 116, and a memory 118.

Control system 106 controls the overall operation of the smart energy storage unit 102, including the coordination of the other internal modules with each other.

Timer/clock 108 provides the timing for each module's interactions with each other as well as provides a system time that allows the smart energy storage unit 102 to control when electricity is received, stored, applied, and returned to the grid.

The user interface 110 may provide the user with the ability to interface with the control system 106 and/or the smart energy storage unit 102 to set the various parameters associated with the energy storage and supply management system 100. The user can interface through a keypad, a touchscreen, e.g., a capacitive sensing or resistive touch screen, a Bluetooth, Low Energy Bluetooth, an infra-red connected device, and an application that resides on an external computing device such as a home computer, a tablet, mobile computing device, e.g., a smartphone, and the like.

Communication interface 112 of the communications module allows the user to communicate with the energy storage and supply management system 100, with other smart grid assets, with other appliances, and/or with other energy storage and supply management systems. The communication methods incorporated into the communications module may include, but are not limited to, a transmitter and/or receiver such as a broadband wired communication, broadband wireless communication, and other wireless communication systems such as Bluetooth, Low Energy Bluetooth, and WiFi connectivity.

For instance, in one embodiment, the Zigbee communication standard is used. Zigbee is a specification for a suite of high level communication protocols using small, low power digital radios based on the IEEE 802.15.4-2003 standard. In addition, Zigbee coordinators can also be provided to facilitate communication within the Zigbee communication link, and to interface to a wired or wireless broadband communication system. While this communication protocol may be suited for the energy management and control system of the present embodiment, it is to be appreciated that other existing wireless, wired, and power line communication (PLC) protocols may be used alone or in combination, or a proprietary communication protocol may be incorporated herein without departing from the scope of the present invention.

Power control unit 114 controls the charge and discharge of the energy storage cell 116, such as based on the programming of the control system 106. The control system 106 may also provide alerts and status updates such as energy storage cell charge status, storage cell health, and power load.

Additionally, the power control unit 114 and/or the control system 106 may be configured to monitor the efficiency of the connected appliances 120, 130, 140, perform remote diagnostics, generate and transmit maintenance alerts, and may further be configured to report the information to the user and/or energy cloud 150. The alerts and status updates can be displayed on the user interface 110, on the power control unit 114, or they can be reported externally to the smart energy storage unit 102, which will display the information on the user interface 110 or send the information to the user via a portable web application, email, or text message.

The energy storage cell 116 may include of any power storage technology known in the industry, such as one or more chemical media including Zinc Manganese Oxide (ZMO), Lithium Ion, Nickel Metal Hydride, Lead Acid, and the like, and may be configured as one or more of ZMO batteries, lithium ion batteries, nickel metal hydride batteries, and lead-acid batteries.

The energy storage cell 116 can supply power back to the grid which may thereby be used as grid power 104, or may supply power to any of the appliances 120, 130, 140, and/or may be used to supplement available grid power 104 if it is not enough to operate the appliances 120, 130, 140.

Another advantage of the system of the present disclosure is power conditioning for extended appliance protection and operation. This concept works similar to an uninterruptible power supply (UPS) commonly used with computers and servers.

The power control unit 114 may provide instantaneous power to compensate for a reduced input voltage condition, e.g., brownout or blackout condition, by supplying power from the smart energy storage cell 116 to the appliance 120, 130, 140. Additionally, the power control unit 114 may minimize, if not eliminate, voltage surges, such as from lightning strikes and power return after a blackout or brownout, which could permanently damage a piece of equipment.

The energy storage control unit 102 also contains memory 118 that provides storage for programs, such as storage and release, and charge and discharge programs, status history, usage history, and maintenance history. The memory 118 can be any form a data storage known in the industry including, but not limited to, traditional hard drives, solid-state storage devices, and flash memory.

In some embodiments, appliances 120, 130, 140 may receive power and control signals from the smart energy storage unit 102. The appliances 120, 130, 140 may also return usage and power data to the control unit 106 of the energy storage unit 102, thereby allowing the control unit 106 to coordinate power usage of smart assets, other smart energy storage units, appliances, or even other storage and supply management systems.

The smart energy storage unit 102 may also interface with the energy cloud 150. For the purposes of the present embodiment, energy cloud 150 may include utility based information as well as information about any smart energy storage units 102 connected to the energy cloud 150. The information contained in energy cloud 150 may be brown out conditions, black out conditions, notifications from the electricity service provider 152 regarding current power conditions, power line status, metrics associated with power production and consumption, as well as requests for power from any connected and functioning appliance control unit.

The smart energy storage unit 102 may use this information from the energy cloud 150 to determine when and how fast to charge the energy storage cell 116 as well as the optimum time to operate any of the appliances 120, 130, 140. In other words, if grid power 104 is at a reduced level or a brown out or a black out condition is imminent, for instance, energy storage unit 102 may charge the energy storage cell 116 as fast as possible to ensure maximum power is available to run an appliance. If grid power is operating normally, for instance, energy storage unit 102 may trickle charge the energy storage cell 116, perform a normal charge, or wait to charge the energy storage cell 116 until a time when the cost of power is cheaper.

The energy cloud 150 communicates information with Electricity Service Providers 152, remote server clients 154, as well as third parties 156. Electricity Service Providers 152, e.g., Utilities, provide demand based data and control inputs. The utility providers also receive data from the energy cloud 150.

Remote server client 154 communicates with the energy cloud 150 as well as the Utility provider 152. Web services software of the remote server client 154 exchanges data between utility 152 back-end systems and home area networks via the energy cloud 150. Cloud servers work with Smart Grid communications, enterprise software, and metering solutions to deliver insight to both utility providers 152 and consumers.

The present embodiment, therefore, optimizes load management data by collecting granular customer usage data associated with each appliance 120, 130, 140. It quantifies usage and maintenance logs for reporting, feedback, and scheduling into the utility provider's 152 load management, demand response, or other back-end systems. The remote server client 154 is capable of scalable load management, which tracks and manages customer actions. It can update an entire network of HAN devices with over-the-air software upgrades.

The energy cloud 150 also communicates with third parties 156. These third parties 156 are typically the designers and manufacturers of power instrumentation and control systems, but can also be a third party regulator and/or monitor. Typical third parties 156 could be 0-Power®, Honeywell®, Metasys®, Schneider Electric®, NEST®, and the like. The information supplied allows the third parties 156 to continually monitor and update the performance of not only the energy cloud 150 and grid power 104, but also the individual smart energy storage units 102, other networked smart assets, and any connected appliances 120, 130, 140.

In operation, the appliance control unit 102 uses information supplied from the energy cloud 150 and the grid power 104 to determine the optimum time to charge and use any of the connected appliances 120, 130, 140. A user may input, via the user interface 110, the desired usage time and duration. The control system 106 then uses the user's input, as well as any information made available from the energy cloud 150, to determine when and how fast to charge the energy storage cell 116.

Figure 3:
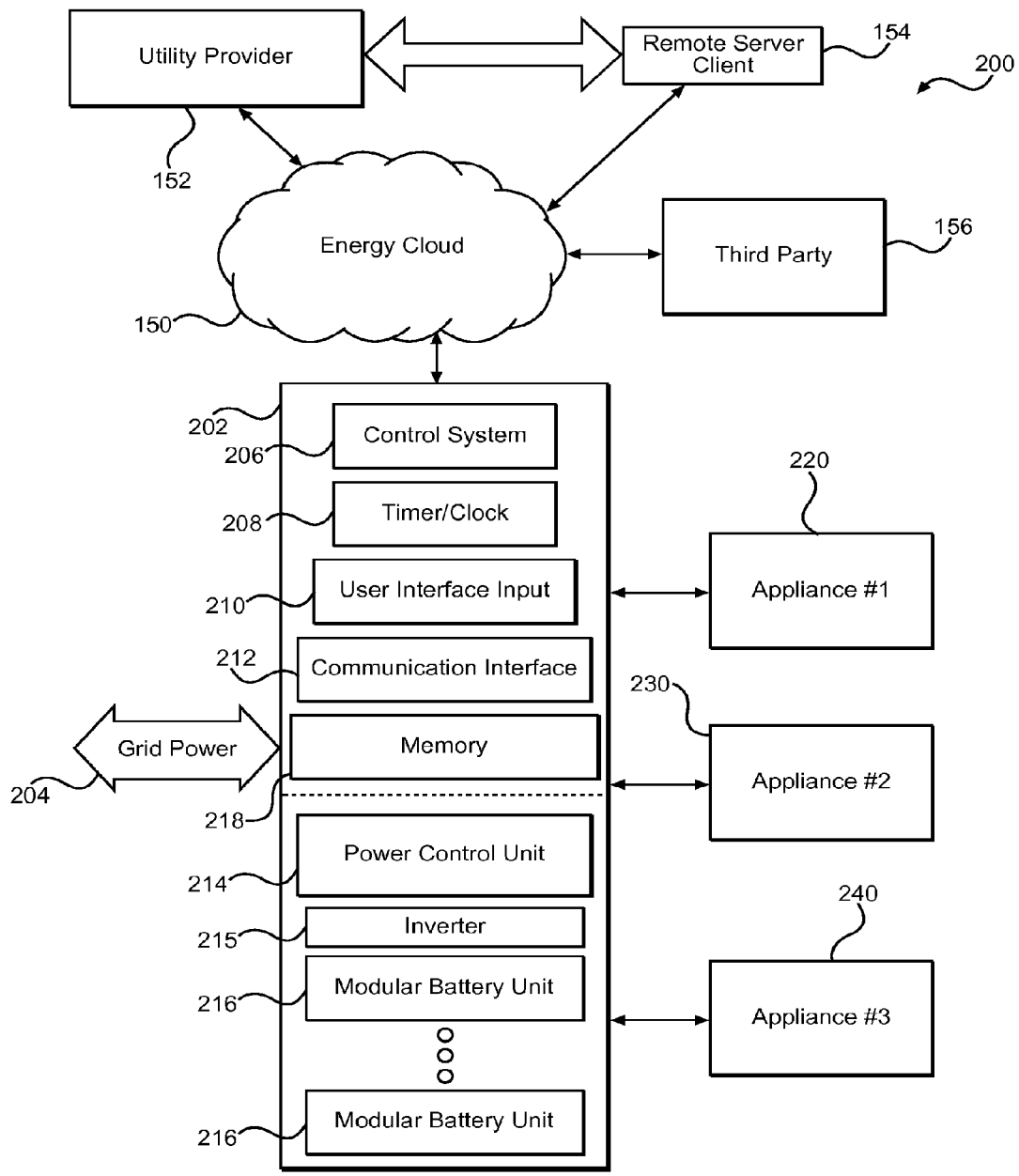
FIG. 3 is a block diagram of an alternative embodiment of the present invention showing the control system separated from the power system but still housed on the same chassis. In this embodiment, the system may return power to the grid through the use of an inverter.

Referring now to FIG. 3, a block diagram of another embodiment is shown and generally referred to as 200. Similar to the energy storage and supply management system shown in FIG. 2, this embodiment may include a smart energy storage unit 202, grid power 204 delivered from the electric grid, and appliances 220, 230, 240, in addition to energy cloud 150, Electricity Service Provider, e.g., Utility, 152, and third parties 156. Grid power 204 is shown as a bi-directional function since power may be withdrawn from and/or can be supplied back to the grid.

The appliance energy storage unit 202 may include of a control unit 206, which control unit may include or otherwise be operably connected with timer/clock 208, user interface 210, communication module 212, memory 218, power control unit 214, and one or more modular energy storage cells 216. The composition and function of these units is similar to the units described in FIG. 2.

In this embodiment, power control unit 214 may also include a converter 215, which may be a convert, inverter, rectifier, or a combination thereof, such as where the converter functions to convert electricity from the grid to a form that can be stored as chemical energy within the modular energy storage cell 216, and further functions to convert the chemical energy from the energy storage cells 216 to electivity, which electricity may be fed back to grid power 204 thereby allowing the retuned power to be used elsewhere. In certain instances, the returned power reduces the utility costs of the site operating the energy storage unit 202.

In this and other embodiments, the number of energy storage cells 216 is scalable, such as where the number, size, and dimensions of energy storage cells is determined 216 based on the number of appliances 220, 230, 240 connected, or to be connected to the smart energy storage unit 202. In other words, the more appliances 220, 230, 240 attached to the energy storage unit 202, the more energy storage cells 216 that may be included within the energy storage units 202 and/or connected to ensure adequate power to run the appliances 220, 230, 240.

Further, if grid power is not generally reliable or extended brown out or black out conditions are expected, additional energy storage cells 216 may be added to store power harvested from the grid power 204, or other source of renewable power generation, when that power is available.

Figure 4:
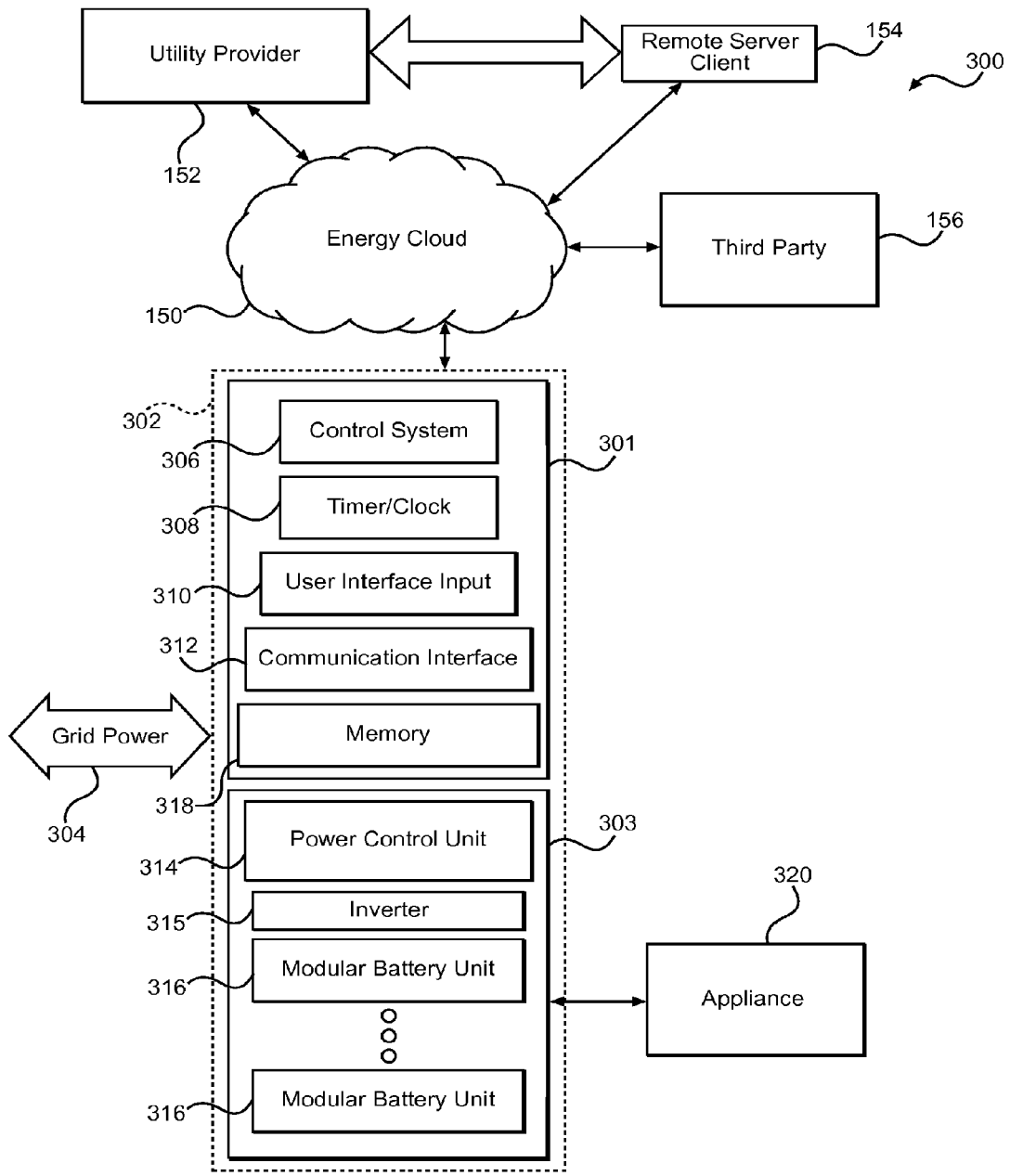
FIG. 4 is a block diagram of another alternative embodiment of the present invention showing control system housed in a separate chassis from the power unit.

Referring to FIG. 4, a block diagram of another embodiment of an energy storage and supply management system is shown and generally referred to as 300. Similar to the energy storage unit shown in FIG. 3, this alternative embodiment may include a smart energy storage unit 302, grid power 304, an appliance 320, energy cloud 150, a utility provider 152, a remote client server 154, and/or a third party 156. In this embodiment, energy storage unit 302 may include a control chassis 301 and a power chassis 303. The control chassis 301 may include a control system 306, timer/clock 308, user interface 310, communication interface 312, and memory 318. The power chassis 303 may include power control unit 314, a converter, e.g., grid flexible converter or inverter 315, and modular energy storage cells 316. The operation of these components is similar to the operation of like components in the earlier embodiments as discussed above.

In this embodiment, control chassis 301 and power chassis 303 are separate from each other yet may be housed within the same smart asset, e.g., smart energy storage unit 302. The separation of control chassis 301 and power chassis 303 allow for optimum placement of radios or antennas for communication. The operation of the energy storage and supply management system 300 is similar to that of system 200 as shown in FIG. 3. The smart energy storage unit 302 receives power from grid power 304. Energy storage unit unit 302 also communicates with energy cloud 150 to transmit and receive information associated with grid operator 152 and the grid power 304.

If the grid operator 152 transmits a request for power from the energy storage unit 302, and the energy storage unit 302 is configured to allow power return to the grid power 304, then control system 306 will signal the power control unit 314 to convert power from modular energy storage cell 316, via converter 315, to a form that can be fed back to grid power 304. If a user programs control system 306 to not return power to grid power 304, the energy storage unit 302 may send a signal, via energy cloud 150, to inform the grid operator 152, remote server client 154, and any third party 156 that energy storage unit 302 will not return power to power grid 304. Control system 306 may be programmed to automatically respond to a request for power by signaling an acknowledgement to energy cloud 150 then return power to grid power 304. Through programming of the smart energy storage unit 302, a user may set limits on the amount of power to be returned as well as specific times for power to be returned. This helps to ensure that energy storage unit 302 maintains sufficient stored energy to operate an appliance 320 at the user's desired time.

When energy storage unit 302 is programmed to limit power return to grid power 304, control system 306 may signal energy cloud 150 of the programmed limits thereby allowing the grid operator 152, remote server client 154, and third parties 156 to better predict and control the amount of power available on grid power 304.

Figure 5:
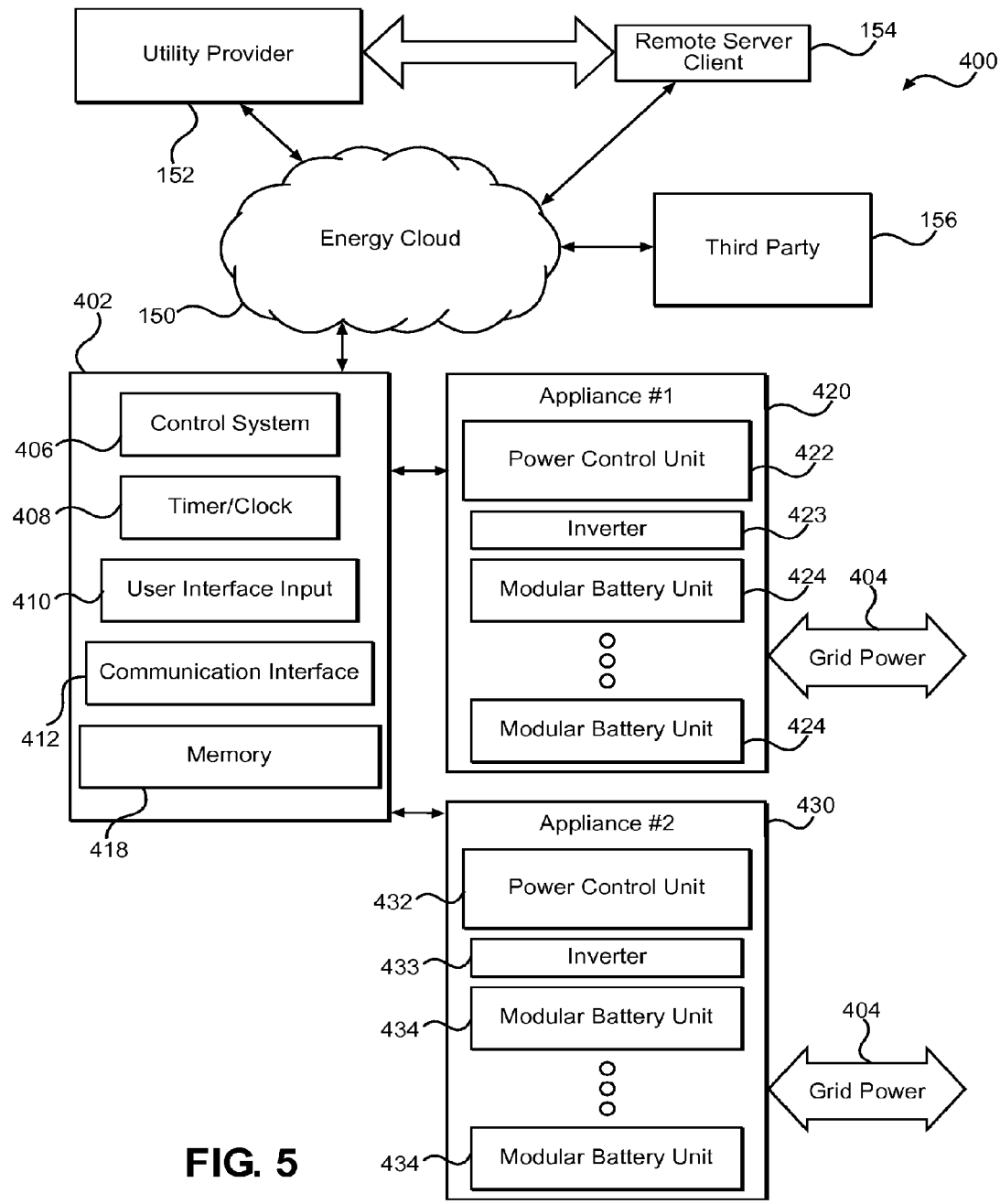
FIG. 5 is a block diagram of another alternative embodiment of the present invention showing the power units integrated into the appliances.

Now referring to FIG. 5, a block diagram of another alternative embodiment of the energy storage and supply management system is shown and generally referred to as 400. This embodiment includes the same individual components as other embodiments discussed above, but the power chassis 303 (from FIG. 4) is integrated into an appliance 420 and 430 instead of energy storage unit 402. Each appliance 420 and 430 receives power from grid power 404 individually. The appliances 420, 430 each communicate with the appliance control unit 402. As in previous embodiments, appliance control unit 402 is in communication with energy cloud 150. In this embodiment, appliance control unit 402 includes control system 406, which control system may include or be operably connected with one or more of: timer/clock 408, user interface 410, communication interface 412, and memory 418. Appliances 420, 430 may include power control unit 422, 432, inverters 423, 433, and modular energy storage cells 424, 434. The number of modular energy storage cells 424, 434 may be scalable. This allows a user to add or remove a energy storage cells depending on appliance 420, 430 demand or reliability of grid power 404.

In another embodiment, appliances 420, 430 may be interconnected, such as on a shared and islanded micro, nano, and/or pico circuit, to allow the sharing of power without the use of grid power 404. The appliance control unit 402 controls the sharing of power between appliances 420, 430. This provides the advantage of allowing a user to choose how many modular energy storage cells 424, 434 to install in each appliance 420, 430 yet ensuring that enough power is available to run any one particular appliance 424, 434.

While there have been shown what several different embodiments of the present disclosure, it will be apparent to those skilled in the art that various changes and modifications can be made herein without departing from the scope and spirit of the disclosure.

The invention claimed is:

1. A plug-in smart energy storage unit for receiving energy from and supplying energy to an electrical circuit of a local, nano-electric grid servicing a room of a facility, the room having at least one electrical outlet connected to the electrical circuit, the plug-in smart energy storage unit comprising;
   a housing defined by one or more walls, the housing containing within the one or more walls:
     an input associated with the smart energy storage unit, for receiving AC energy from the electrical circuit of the local, nano-electric grid via the at least one electrical outlet and the electrical circuit, the input comprising a plug for being plugged into the electrical outlet;
     a first inverter electrically coupled to the input for receiving a first amount of AC energy from the local, nano-electric grid and converting the first amount of AC energy to a first amount of DC energy suitable for storage;
     a plurality of energy storage cells electrically coupled to the first inverter for receiving the first amount of DC energy and converting the first amount of DC energy to chemical energy for storage so as to charge the smart energy storage unit, and for converting a second amount of chemical energy to a second amount of DC energy for release to the grid so as to discharge the smart energy storage unit;
     a second inverter electrically coupled to the plurality of energy cells for receiving the second amount of DC energy from the plurality of energy storage cells and for converting the second amount of DC energy in to a second amount of AC energy for supply to the grid;
     an output having an electrical plug for supplying AC energy to the electrical circuit of the local, nano-electric grid, when the electrical plug is coupled to the electrical outlet of the electrical circuit;
     a battery management system coupled to the one or more of the plurality of energy storage cells for monitoring the storing of energy in and the releasing of energy from the plurality of energy storage cells in accordance with energy management system instructions;
     a first control unit coupled to the battery management system for generating energy management system instructions for controlling the battery management system in accordance with a first set of received instructions;
     a second control unit coupled to the first and second inverters for controlling the inverters in accordance with a second set of received instructions;
     a smart asset monitoring sensor capable of being coupled to the local, nano-electric grid for sensing a condition of the local, nano-electric grid, for determining a load condition of the local, nano-electric grid, and to monitor the energy provided to the nano-electric grid from the battery management system to thereby produce monitored data;
     a master controller coupled to the smart asset monitoring sensor and the first and second control units for generating and communicating first and second instructions to the first and second control units so as to control the receiving of energy from and the supplying of energy to the electrical circuit of the local, nano-electric grid and thereby controlling the charging and discharging of the plug-in smart energy storage unit in accordance with the sensed local, nano-electrical grid condition; and
     a control mechanism that determines a peak energy time period and an off-peak energy time period, the control mechanism for controlling receiving of energy to the plurality of energy storage cells from the local, nano-electrical grid during the off-peak energy time period, and supply of energy from the plurality of energy storage cells to the local, nano-electrical grid during the peak energy time period;
   wherein the plug-in smart energy storage unit is integrated within an electrical appliance.

2. The smart energy storage unit according to claim 1, wherein the input comprises the output.

3. The smart energy storage unit according to claim 2, wherein the first inverter comprises the second inverter.

4. The smart energy storage unit according to claim 3, wherein the local, nano-electric grid comprises one or more of a pico-grid and a fento-grid.

5. The smart energy storage unit according to claim 3, wherein the inverter is further configured for converting the first DC energy to a second DC energy, and the output is configured for supplying DC energy.

6. The smart energy storage unit according to claim 1, wherein the master controller includes a memory for storing user use commands.

7. The smart energy storage unit according to claim 6, wherein the plug-in smart energy storage unit includes a communications module coupled to the master controller, and the communications module includes a communication interface for communicating with a remote server via a communications network.

8. A system for receiving energy from and supplying energy to an electrical circuit of a local, nano-electric grid, the electrical circuit having an electrical outlet, the system comprising;
   a smart asset monitor capable of being coupled to the local, nano-electric grid, for monitoring and/or sensing an electric grid condition, for determining a load condition of the local, nano-electric grid, and to monitor the energy provided to the local, nano-electric grid from a plug-in smart asset battery to thereby produce monitored data, and to communicate the monitored data to the plug-in smart asset battery;
   a plug-in smart asset battery communicably coupled to the smart asset monitor and further capable of being coupled to the local, nano-electric grid for receiving energy from and supplying energy to the local, nano-electric grid in response to one or more of the sensed conditions, the plug-in smart asset battery comprising:

an input and an output associated with the plug-in smart asset battery and operably capable of being coupled to the electrical circuit of the local, nano-electric grid, the input and output comprising a plug for being plugged into the electrical outlet of the electrical circuit for receiving energy from and supplying auxiliary energy to the local, nano-electric grid;

a housing defined by one or more walls, the housing containing:
  a plurality of energy storage cells coupled to the input and output for storing and supplying the energy from and to the local, nano-electric grid;
  a grid flexible converter (GFC) coupled to the input and output and the plurality of energy storage cells for performing a first converting operation for converting AC energy to DC energy prior to storage, and for performing a second converting operation for converting DC energy to AC energy prior to supplying energy to the local, nano-electric grid, the grid flexible converter including:
    a control unit, for controlling the converting operations of the grid flexible converter;
  a communications module communicably coupled to both the smart asset monitor and a master controller, the communications module for receiving sensed conditions from the smart asset monitor and communicating the same to the master controller;
  a master controller coupled to the grid flexible converter and the communications module for controlling the control unit of the grid flexible converter in response to communications received from the smart asset monitor conveyed to the master controller by the communications module, the master controller for controlling the receiving and supplying of energy to the electric grid;
  a control mechanism that determines a peak energy time period and an off-peak energy time period, the control mechanism for controlling receiving of energy to the plurality of energy storage cells from the local, nano-electrical grid during the off-peak energy time period, and supply of energy from the plurality of energy storage cells to the local, nano-electrical grid during the peak energy time period; and
  wherein the plug-in smart asset battery is integrated within an electrical appliance.

9. The system according to claim 8, wherein the local, nano-electric grid comprises one or more of a pico-grid and a fentogrid.

10. The system according to claim 8, wherein the GFC is further configured for converting a first DC energy to a second DC energy.

11. The system according to claim 8, wherein the master controller includes a memory for storing user use commands.

12. The system according to claim 11, wherein the communications module includes a communication interface for communicating with a remote server via a communications network.

13. The system according to claim 8, wherein the smart asset battery comprises the smart asset monitor.

* * * * *